US012481905B2

(12) United States Patent
Peterson et al.

(10) Patent No.: US 12,481,905 B2
(45) Date of Patent: Nov. 25, 2025

(54) SYNTHESIS OF QUANTUM CIRCUITS FROM NATIVE GATES

(71) Applicant: INTERNATIONAL BUSINESS MACHINES CORPORATION, Armonk, NY (US)

(72) Inventors: Eric Peterson, Yorktown Heights, NY (US); Lev Samuel Bishop, Dobbs Ferry, NY (US); Ali Javadiabhari, Sleepy Hollow, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 668 days.

(21) Appl. No.: 17/847,014

(22) Filed: Jun. 22, 2022

(65) Prior Publication Data

US 2023/0289638 A1    Sep. 14, 2023

Related U.S. Application Data

(60) Provisional application No. 63/271,212, filed on Oct. 24, 2021.

(51) Int. Cl.
*G06F 17/00*    (2019.01)
*G06N 10/20*    (2022.01)
*G06N 10/80*    (2022.01)

(52) U.S. Cl.
CPC ............. *G06N 10/20* (2022.01); *G06N 10/80* (2022.01)

(58) Field of Classification Search
CPC ................. G06N 10/20; G06N 10/80
See application file for complete search history.

(56) References Cited

U.S. PATENT DOCUMENTS 9,514,415 B2 * 12/2016 Bocharov ............. G06N 10/60
10,496,931 B2    12/2019 Schoennenbeck et al.
(Continued)

FOREIGN PATENT DOCUMENTS

CN    108334952 A    7/2018

OTHER PUBLICATIONS

A Quantum Computational Compiler and Design Tool for Technology-Specific Targets, Smith et al., ISCA 2019, Jun. 22-26, 10 pages (Year: 2019).*
Shende, Bullock, and Markov in "Minimal Universal Two-qubit Quantum Circuits" give an optimal synthesis method targeting the specific controlled gate CX.
(Continued)

*Primary Examiner* — Mohammed H Zuberi
(74) *Attorney, Agent, or Firm* — Amin, Turocy & Watson, LLP

(57) ABSTRACT

A method for a classical computer to synthesize a quantum circuit for use on a quantum computational device includes receiving information for a target operation to be implemented on said quantum computational device, and receiving information regarding native qubit gates that are available on said quantum computational device to be used to implement said quantum circuit; The method further includes determining each of a plurality of quantum circuits formed from said native qubit gates such that each of said plurality of quantum circuits will perform a function substantially equivalent to said target operation when implemented on the quantum computational device. The method further includes selecting one of said plurality of quantum circuits formed from said native qubit gates, based on a performance criterion of said quantum computational device.

20 Claims, 29 Drawing Sheets

(56) References Cited

U.S. PATENT DOCUMENTS

| | | |
|---|---|---|
| 10,565,514 B2 | 2/2020 | La Cour et al. |
| 12,204,991 B1* | 1/2025 | Ryan ................... G06F 16/2379 |
| 2018/0039903 A1* | 2/2018 | Mosca ................... B82Y 10/00 |
| 2021/0232960 A1* | 7/2021 | Scott N ................ H03K 19/195 |
| 2021/0390235 A1* | 12/2021 | Bravyi ................... G06N 10/20 |
| 2022/0035978 A1* | 2/2022 | Bravyi ................. G06F 30/327 |
| 2022/0138607 A1* | 5/2022 | Camps ................... G06N 10/20 706/62 |
| 2023/0080393 A1* | 3/2023 | Matsuura ............... G06N 10/60 708/400 |
| 2023/0186128 A1* | 6/2023 | Bravyi ................. G06F 30/327 716/104 |
| 2023/0237361 A1* | 7/2023 | Cowtan .................... G06N 5/01 706/62 |

OTHER PUBLICATIONS

Peterson, Smith, Crooks in "Two-qubit circuit depth and the monodromy polytope", Rigetti Quantum Computing 2919 Seventh St. Berkley, CA 94710.

Zhang, Vala, Sastry, and Whaley in "Optimal quantum circuit synthesis from Controlled-U gates" Physical Review A 69, 042309 (2004).

Wu, Xin-Chuan, " Design, Optimization, and Simulation of Scalable Quantum Computing Systems", A Disseertation Submitted to The Faculty of The Division of The Physical Sciences in Candidacy for The Degree of Doctor of Philosophy, Chicago, Illinois, Mar. 2021.

Borujeni, Sima E., et al., "Quantum Circuit Representation of Bayesian Networks,"—Expert Systems with Applications, vol. 176, Aug. 15, 2021, 114768.

* cited by examiner

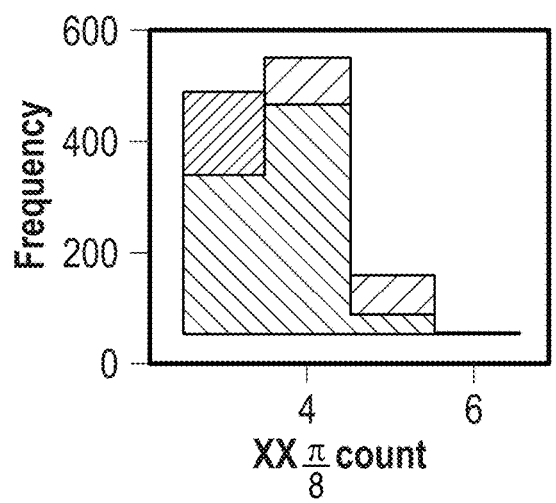
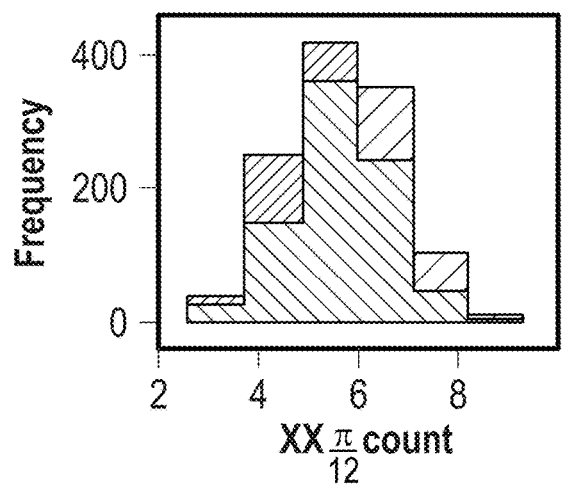
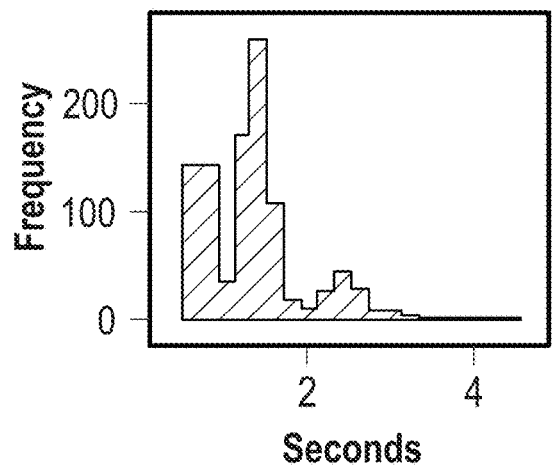
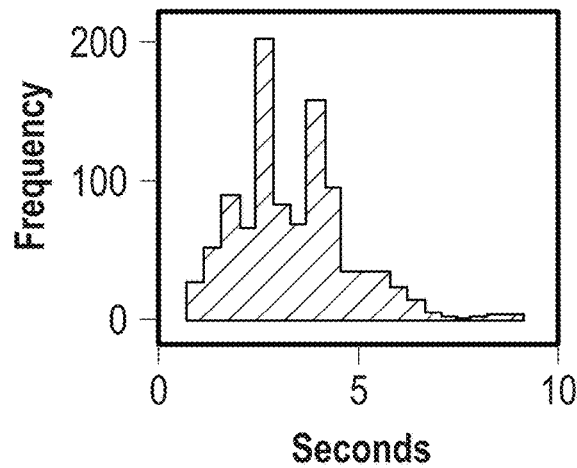
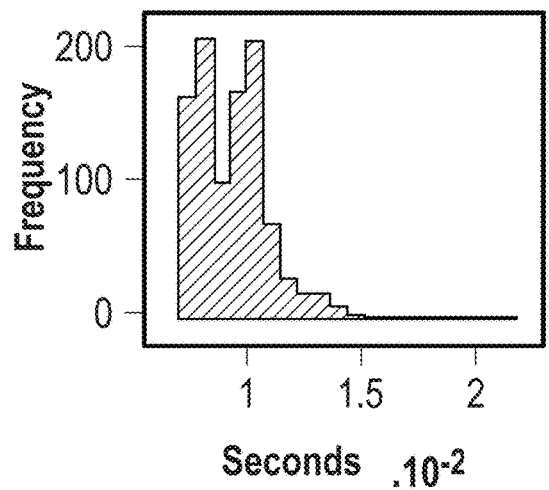
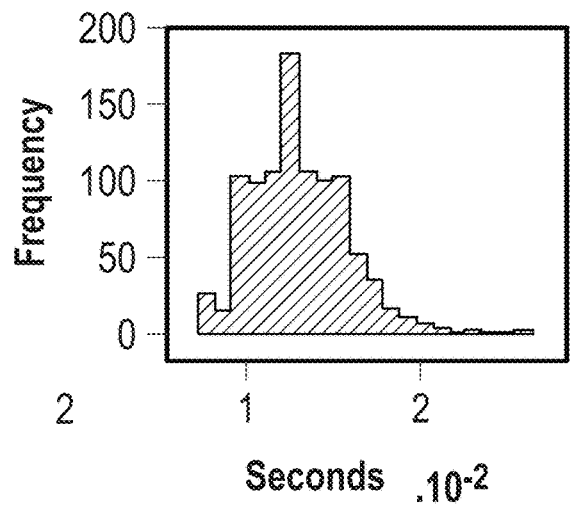
FIG. 9

$$1905 \longrightarrow \begin{cases} -b_3 + \alpha_+ & \leq a_h + a_e, \\ -b_3 + \alpha_+ - 2\alpha' & \leq -a_h + a_e, \\ \alpha_+ - \alpha' - \alpha'' & \leq a_e, \\ b_1 + b_2 + \beta & \leq a_h + a_e, \\ \pi - b_1 - b_2 - \beta & \leq a_h + a_e, \\ -b_1 - b_2 + \beta & \leq -a_h - a_e, \\ b_1 - b_2 + \beta & \leq a_h - a_e, \\ -b_2 + b_2 + \beta & \leq -a_h + a_e, \\ b_1 - b_2 - \beta & \leq -a_h + a_e, \end{cases}$$

b-coord's unreflected, $a_f = b_3$, slant inequality on $a_h$ $$1910 \longrightarrow \begin{cases} \frac{\pi}{2} - b_3 + \alpha_+ - 2\alpha' & \leq a_h + a_e, \\ \frac{\pi}{2} - b_3 + \alpha_+ & \leq -a_h + a_e, \\ \alpha_+ - \alpha' - \alpha'' & \leq a_e, \\ b_1 + b_2 + \beta & \leq a_h + a_e, \\ \pi - b_1 - b_2 - \beta & \leq a_h + a_e, \\ -b_1 - b_2 + \beta & \leq -a_h - a_e, \\ b_1 - b_2 + \beta & \leq a_h + a_e, \\ -b_1 - b_2 + \beta & \leq -a_h + a_e, \\ b_1 - b_2 - \beta & \leq -a_h + a_e, \end{cases}$$

b-coord's reflected, $a_f = b_3$, strength inequality on $a_h$

FIG. 19A $$\begin{aligned}
-b_1 + \alpha_+ &\le a_h + a_e, \\
b_1 + \alpha_+ + -2\alpha' &\le a_h + a_e, \\
\alpha_+ - \alpha' - \alpha'' &\le a_e, \\
b_2 + b_3 + \beta &\le a_h + a_e, \\
\pi - b_2 - \beta_3 - \beta &\le a_h + a_e, \\
-b_2 - b_3 + \beta &\le -a_h - a_e, \\
-b_2 - b_3 + \beta &\le a_h - a_e, \\
-b_2 + b_3 + \beta &\le -a_h + a_e, \\
b_2 - b_3 - \beta &\le -a_h + a_e,
\end{aligned}$$

$\underbrace{\phantom{xxxxxxxxxxxxxxxxxxxx}}$ $1915 \longrightarrow$ b-coord's unreflected, $a_f = b_1$, slant inequality on $a_f$ $$\begin{aligned}
\tfrac{\pi}{2} - b_1 + \alpha_+ + -2\alpha' &\le -a_h + a_e, \\
-\tfrac{\pi}{2} + b_1 + \alpha_+ &\le -a_h + a_e, \\
\alpha_+ - \alpha' - \alpha'' &\le a_e, \\
b_2 + b_3 + \beta &\le a_h + a_e, \\
\pi - b_2 - b_3 - \beta &\le a_h + a_e, \\
-b_2 - b_3 + \beta &\le -a_h - a_e, \\
-b_2 - b_3 + \beta &\le a_h - a_e, \\
-b_2 + b_3 + \beta &\le -a_h + a_e, \\
b_2 - b_3 - \beta &\le -a_h + a_e,
\end{aligned}$$

$\underbrace{\phantom{xxxxxxxxxxxxxxxxxxxx}}$ $1915 \longrightarrow$ b-coord's reflected, $a_f = b_1$, strength inequality on $a_f$

FIG. 19B

SYNTHESIS OF QUANTUM CIRCUITS FROM NATIVE GATES

BACKGROUND

The currently claimed embodiments of the present invention relate to quantum circuits, and more specifically, to methods and systems for synthesizing a quantum circuit using a sequence of gates available on a quantum computer.

Quantum circuits operate on one or more quantum states of a set of qubits. Quantum circuits can be represented by one or more unitary matrices (e.g., unitary operators), e.g., surjective bounded operators on a Hilbert space that preserve the respective inner product and/or norm of the Hilbert space. Each unitary matrix can represent the quantum function and/or computations that can be performed. For example, a quantum circuit operating on n qubits for any suitable positive integer n can be represented by a $2^n \times 2^n$ unitary matrix. The quantum state of a set of qubits can be represented by a quantum state vector (e.g., for n qubits, a quantum state vector can have $2^n$ elements), and quantum circuits can be applied to a quantum state vector via matrix multiplication. Quantum circuits can be combined in series via matrix multiplication and/or can be combined in parallel via tensor products (e.g., Kronecker products). Quantum circuits, for instance as part of a quantum program, can operate one or more physical operations on a set of qubits, such as implementing a sequence of pulses. A pulse is a time-dependent tone that can be applied to a qubit to change its state. The fewer pulses utilized, and/or the shorter the pulses are, for operation of a quantum circuit, the less error that potentially can be introduced into the operation and/or the less time it can take for the operation to be completed, thus further reducing the potential for introduced error(s).

On a larger scale, quantum computing cloud service providers can execute millions of quantum jobs for users during a year. Each quantum job can include the execution of one or more quantum programs. The aforementioned quantity of quantum jobs can create pressure to execute the respective quantum programs quickly. Increased speed of execution can directly and/or indirectly correlate to maximizing system usage, minimizing compiling time to compile quantum programs, minimizing users having to wait for the compiling to be completed, and minimizing undesirable consuming of classical computational resources. Pressure also can be created to execute these quantum jobs well, so that a most performance can be extracted from near-term error-prone systems and/or so that the quality of compiling into physical-level pulses can be improved.

Moreover, contemporary quantum compilers have two main tasks: synthesis, which is converting an input representation of a program into an equivalent sequence of hardware-native instructions; and optimization, which is measuring the performance of an amenable program and improving it against some metric. An optimal synthesis routine would accomplish both of these tasks at once: they consume flexible input and are guaranteed to emit instructions which cannot be improved upon by any means. Such results are rare—exceedingly few asymptotically optimal results are known, and still fewer exactly optimal results— but those which are known make an appearance in nearly every contemporary quantum compiler.

The success of a particular decomposition can be ascribed to the ubiquity of its target gate set: CNOT and single-qubit rotations are native operations on many devices. In contrast, widescale adoption has been stymied for results which are less hardware-ready. A commonly available gate is the fractional CNOT: over- or under-driving the same Hamiltonian which produces a CNOT may yield a parametric family $CNOT^\alpha$ of controlled X gates. It is intuitive that such "lighter touch" gates could be useful in decomposing two-qubit gates nearer to the identity. In practice, however, it can require Herculean effort to expose an entire parametric family for an end-user, and hence one is motivated to find a small set of particularly useful parameter values, include only those in a native gate set, and find (optimal) synthesis methods which employ them. Results for $CNOT^\alpha$ have been confined to a single fractional gate rather than a finite family, have applied to circuits of limited depth, have not explored the question of which fractional gates to include, and ultimately have not culminated in an optimal synthesis method.

Therefore, there remains a need for improved methods and systems for synthesizing quantum circuits using sequences of gates available on a quantum computer.

SUMMARY

An embodiment of the present invention is a method for synthesizing a quantum circuit for use on a quantum computational device. The method includes receiving, on a classical computer, information for a target operation to be implemented on the quantum computational device; receiving, on the classical computer, information regarding native qubit gates that are available on the quantum computational device to be used to implement the quantum circuit; determining, on the classical computer, each of a group of quantum circuits formed from the native qubit gates such that each of the group of quantum circuits will perform a function substantially equivalent to the target operation when implemented on the quantum computational device; and selecting, on the classical computer, one of the group of quantum circuits formed from the native qubit gates based on a performance criterion of the quantum computational device.

In some embodiments of the method, the target operation is a unitary operator comprising one-qubit and two-qubit operations, the native qubit gates are one-qubit and XX-type gates, and/or the performance criterion is based on operating parameters of the quantum computational device.

In an embodiment, the method further includes providing the selected one of the group of quantum circuits to the quantum computational device for implementation thereon.

In an embodiment of the method, selecting one of the group of quantum circuits based on the performance criterion includes optimizing a cost function associated with each of the group of quantum circuits.

In an embodiment of the method, the cost function is one of an average infidelity of each of the group of quantum circuits relative to the target operation, an operation count of native qubit gates in each of the group of quantum circuits, a diamond norm of each of the group of quantum circuits relative to the target operation, and a Hilbert-Schmidt distance of each of the group of quantum circuits relative to the target operation.

In an embodiment of the method, the cost function is separable, locally invariant, and monotonic.

In an embodiment of the method, determining the group of quantum circuits formed from the native qubit gates includes applying a projection formula.

In an embodiment of the method, the XX-type gates include an $XX_0$ gate, an $XX_{90}$ gate, and at least one of an $XX_{15}$ gate, an $XX_{22.5}$ gate, an $XX_{30}$ gate, and an $XX_{45}$ gate.

Another embodiment of the present invention is a computer program product for synthesizing a quantum circuit for use on a quantum computational device. The computer program product includes a computer readable medium having program instructions embodied therewith, the program instructions executable by a classical computer to cause the classical computer to receive, by the classical computer, information for a target operation to be implemented on the quantum computational device; receive, by the classical computer, information regarding native qubit gates that are available on the quantum computational device to be used to implement the quantum circuit; determine, by the classical computer, each of a group of quantum circuits formed from the native qubit gates such that each of the group of quantum circuits will perform a function substantially equivalent to the target operation when implemented on the quantum computational device; and select, by the classical computer, one of the group of quantum circuits formed from the native qubit gates based on a performance criterion of the quantum computational device.

In some embodiments of the computer program product, the target operation is a unitary operator comprising one-qubit and two-qubit operations, the native qubit gates are one-qubit and XX-type gates, and/or the performance criterion is based on operating parameters of the quantum computational device.

In an embodiment of the computer program product, the program instructions executable by a classical computer further cause the classical computer to provide the selected one of the group of quantum circuits to the quantum computational device for implementation thereon.

In an embodiment of the computer program product, the classical computer selects one of the group of quantum circuits based on the performance criterion by optimizing a cost function associated with each of the group of quantum circuits.

In an embodiment of the computer program product, the cost function is one of an average infidelity of each of the group of quantum circuits relative to the target operation, an operation count of native qubit gates in each of the group of quantum circuits, a diamond norm of each of the group of quantum circuits relative to the target operation, and a Hilbert-Schmidt distance of each of the group of quantum circuits relative to the target operation.

In an embodiment of the computer program product, the cost function is separable, locally invariant, and monotonic.

In an embodiment of the computer program product, the classical computer determines the group of quantum circuits formed from the native qubit gates by applying a projection formula.

In an embodiment of the computer program product, the XX-type gates comprise an $XX_0$ gate, an $XX_{90}$ gate, and at least one of an $XX_{15}$ gate, an $XX_{22.5}$ gate, an $XX_{30}$ gate, and an $XX_{45}$ gate.

Another aspect of the present invention is to provide a computer system for synthesizing a quantum circuit. The computer system includes a quantum computational device, having a group of native qubit gates that are used to implement quantum circuits, and includes a classical computer communicatively coupled to the quantum computational device. The classical computer includes a processor configured to receive information for a target operation to be implemented on said quantum computational device, and configured to receive information regarding the group of native qubit gates that are available on the quantum computational device. The classical computer further includes a synthesis component configured to determine each of a group of quantum circuits formed from the group of native qubit gates such that each of the group of quantum circuits will perform a function substantially equivalent to the target operation when implemented on the quantum computational device, and select one of the group of quantum circuits formed from the group of native qubit gates based on a performance criterion of said quantum computational device. The classical computer also includes an output component configured to provide the selected one of the group of quantum circuits to the quantum computational device for implementation thereon. The target operation is a unitary operator comprising one-qubit and two-qubit operations, the group of native qubit gates are one-qubit and XX-type gates, and the performance criterion is based on operating parameters of said quantum computational device.

In some embodiments of the computer system, the synthesis component is further configured to select one of the group of quantum circuits by optimizing a cost function associated with each of the group of quantum circuits.

In some embodiments of the computer system, the cost function is one of an average infidelity of each of the plurality of quantum circuits relative to the target operation, an operation count of native qubit gates in each of the plurality of quantum circuits, a diamond norm of each of the plurality of quantum circuits relative to the target operation, and a Hilbert-Schmidt distance of each of the plurality of quantum circuits relative to the target operation.

In some embodiments of the computer system, the cost function is separable, locally invariant, and monotonic.

In some embodiments of the computer system, the synthesis component is further configured to determine the group of quantum circuits by applying a projection formula.

In some embodiments of the computer system, the XX-type gates include an $XX_0$ gate, an $XX_{90}$ gate, and at least one of an $XX_{15}$ gate, an $XX_{22.5}$ gate, an $XX_{30}$ gate, and an $XX_{45}$ gate.

BRIEF DESCRIPTION OF THE DRAWINGS

Some embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 9 shows a comparison of the output and wall-time characteristics of the proposed algorithm of some embodiments and that of a numerical search.

FIG. 19A and FIG. 19B show four tables of inequalities describing the relationship between the a-coordinates and the b-coordinates in the four regions of Remark 5.6.

DETAILED DESCRIPTION

Figure 1A:
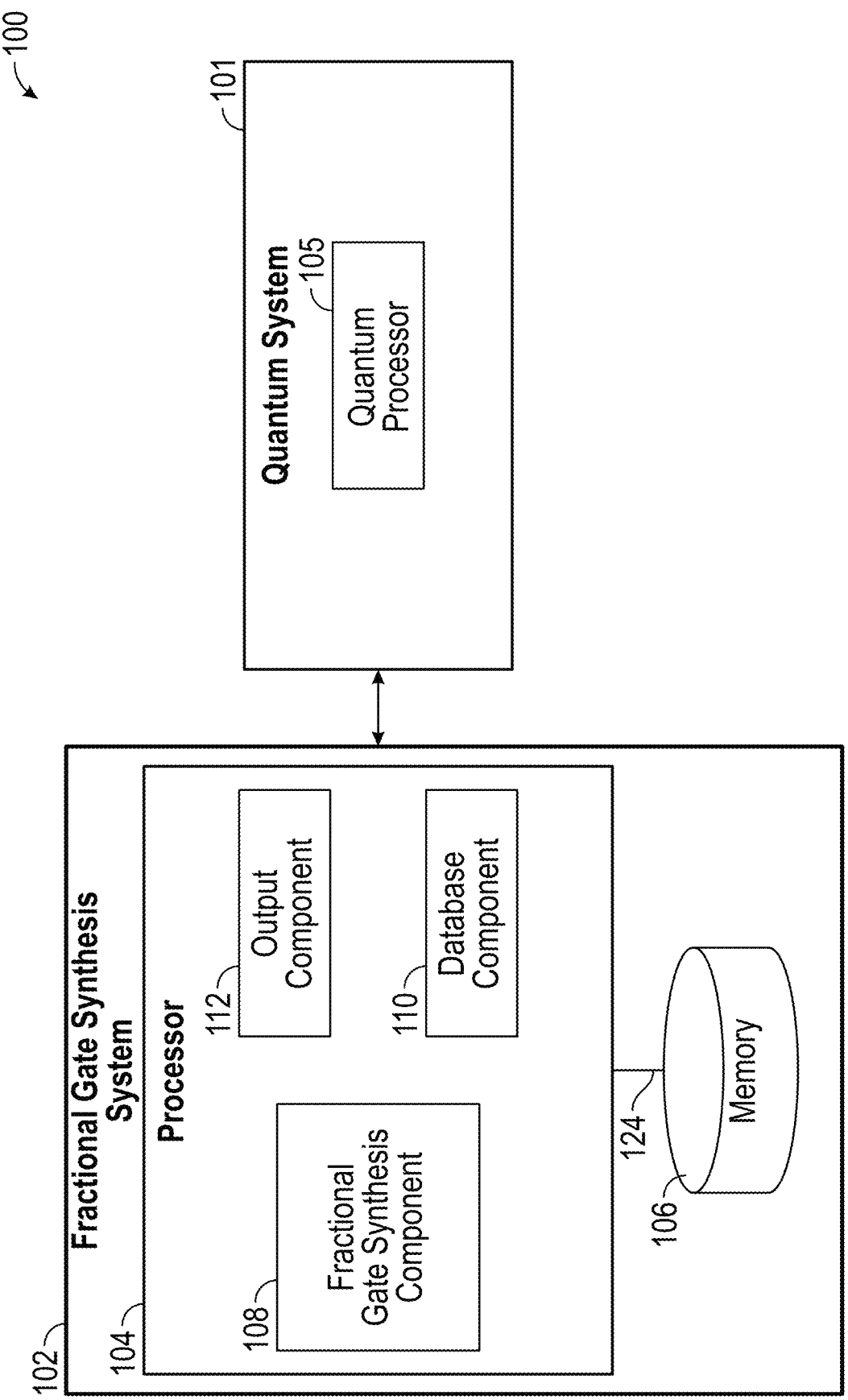
FIG. 1A illustrates a block diagram of an example, non-limiting system of some embodiments that can facilitate operation of a quantum circuit on a set of qubits via providing and implementing a synthesis of fractional gates.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the current invention.

Some embodiments of the current invention are now described with reference to the figures, where like referenced numerals are used to refer to like elements throughout. The general concepts of the current invention are not intended to be limited to the particular embodiments. In the following description, for purposes of explanation, numerous specific details are set forth in order to provide a more thorough understanding of the described embodiments.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in some embodiments, the computer system 100 illustrated at FIG. 1 can further comprise one or more computer and/or computing-based elements, such as described herein with reference to an operating environment 2000 illustrated at FIG. 20. In several described embodiments, computer and/or computing-based elements can be used in connection with implementing at least one of the systems, devices, components and/or computer-implemented operations shown and/or described in connection with FIG. 1 and/or with other figures described herein.

Improving the execution time for executing quantum jobs, and/or quality of execution of the quantum jobs, is generally desirable. Some embodiments of the invention described herein relate to techniques for enhancing quantum circuit execution in a quantum service, and in some cases, allowing for increased scaling of execution of quantum programs implementing the quantum circuits. Some embodiments described herein can include various techniques that can improve (e.g., enhance, optimize and/or reduce) the execution time for executing quantum program jobs and/or improve (e.g., enhance, optimize and/or increase) the quality of execution of such jobs.

The following non-limiting definitions are provided for various terms used throughout the specification.

As used herein, the term qubit gate refers to an operator that performs a quantum operation on quantum data (e.g., a qubit).

As used herein, the term quantum circuit refers to computational routine consisting of coherent quantum operations on quantum data, such as qubits. A quantum circuit may be an ordered sequence of quantum gates, measurements and resets, which may be conditioned on real-time classical computation.

As used herein, the term CNOT refers to a controlled NOT gate, that is a quantum logic gate used in the construction of a gate-based quantum computer. Any quantum circuit can be simulated to an arbitrary degree of accuracy using a combination of CNOT gates and single qubit rotations.

As used herein, the terms XX gates, XX interactions, XX-type gates, and XX-type interactions are used interchangeably, and refer to a specific family of two-qubit gates.

As used herein, the term target operation (also referred to as a target circuit) refers to a desired sequence of operations to be implemented on a quantum computer.

As used herein, the terms unitary (plural: unitaries) and unitary matrix are used interchangeably, and refer to a matrix that represents a quantum gate. The action performed by the quantum gate is defined by multiplication of the unitary matrix (representing the quantum gate) with a vector (representing the quantum state).

One aspect of the present invention is to provide a computer system for synthesizing a quantum circuit. In some embodiments, the computer system includes a quantum system and a classical system. For example, the quantum system may include a quantum processor or a quantum computational device, and the classical system may be a classical computer.

The classical system may include a synthesis system. For example, the synthesis system may be a fractional gate synthesis system, and/or may have multiple components. These components may include a processor and a memory. In some embodiments, the processor may include one or more sub-components, including but not limited to one or more of a synthesis component, an output component, and a database component. For example, in some embodiments, the synthesis component is a fractional gate synthesis component. In other embodiments, one or more of the synthesis component, the output component, and the database component may be separate from the processor, and/or may be combined into one or more other components of the classical system.

In some embodiments, the classical system (e.g., a classical computer, or a component thereof, for example, a processor) is configured to receive information for a target operation to be implemented on the quantum computational device, and to receive information regarding native qubit gates that are available on the quantum computational device to be used to implement the quantum circuit. The classical system (e.g., a classical computer, or a component thereof, for example, a synthesis component) is further configured to determine each of a group of quantum circuits formed from the native qubit gates such that each of the group of quantum circuits will perform a function substantially equivalent to the target operation when implemented on the quantum computational device. The classical system (e.g., a classical computer, or a component thereof, for example, the synthesis component) is further configured to select one of the group of quantum circuits formed from the native qubit gates based on a performance criterion of the quantum computational device. The classical system (e.g., a classical computer, or a component thereof, for example, an output component) is further configured to provide the selected one of the group of quantum circuits to the quantum system for implementation thereon.

In some embodiments of the computer system, the target operation is a unitary operator comprising one-qubit and two-qubit operations, the native qubit gates are one-qubit and XX-type gates, and/or the performance criterion is based on operating parameters of the quantum system (e.g., a quantum computational device, or a quantum computer).

In some embodiments of the computer system, the classical system selects one of the group of quantum circuits based on the performance criterion by optimizing a cost function associated with each of the group of quantum circuits. In some embodiments, the cost function is separable, locally invariant, and monotonic. In some embodiments, the cost function is one of an average infidelity of each of the group of quantum circuits relative to the target operation, an operation count of native qubit gates in each of the group of quantum circuits, a diamond norm of each of the group of quantum circuits relative to the target operation, and a Hilbert-Schmidt distance of each of the group of quantum circuits relative to the target operation.

In some embodiments of the computer system, the classical system determines the group of quantum circuits formed from the native qubit gates by applying a projection formula.

In some embodiments of the computer system, the XX-type gates include an $XX_0$ gate, an $XX_{90}$ gate, and further include at least one of an $XX_{15}$ gate, an $XX_{22.5}$ gate, an $XX_{30}$ gate, and an $XX_{45}$ gate.

FIG. 1A illustrates a block diagram of a non-limiting example of an embodiment of a computer system 100 that can facilitate operation of a quantum circuit on a set of qubits via providing and implementing a synthesis of the quantum circuit, in accordance with one or more embodiments described herein. In some embodiments, the computer system 100 provides and implements a synthesis of fractional gates.

In some embodiments, the computer system 100 can comprise a quantum system 101 (e.g., a quantum computer system, a superconducting quantum computer system and/or the like) that can employ quantum algorithms and/or quantum circuitry, including computing components and/or devices, to perform quantum operations and/or functions on input data to produce results that can be output to an entity, for example a machine, device, component, hardware, software and/or human. The quantum circuitry can comprise quantum bits (qubits), such as multi-qubit quantum circuits, physical circuit level components, high level components and/or functions. The quantum circuitry can be structured (e.g., arranged and/or designed) to perform desired quantum functions and/or computations on data (e.g., input data and/or intermediate data derived from input data) to produce results as an output. The results can be responsive to the quantum job request and associated input data and can be based at least in part on the input data, quantum functions and/or quantum computations.

That is, the illustrated computer system 100 can include both a quantum portion (e.g., the quantum system 101) and a classical portion (e.g., including a fractional gate synthesis system 102). The computer system 100 thus can be a hybrid system. In one or more other embodiments, the quantum system 101 can be separate from, but function in combination with, the computer system 100 and/or the fractional gate synthesis system 102. Quantum system 101 can receive input from fractional gate synthesis system 102, proceed with executions, and return output to fractional gate synthesis system 102.

The quantum system 101 can comprise one or more quantum components, such as a quantum processor 105 and suitable additional circuitry for input and output. The quantum system 101 can perform one or more quantum processes, calculations and/or measurements for operating one or more quantum circuits on one or more qubits. For example, the quantum system 101 can operate one or more qubit effectors, such as qubit oscillators, harmonic oscillators, pulse generators and/or the like to cause one or more pulses to stimulate and/or manipulate the state(s) of one or more qubits existing in the quantum system 101.

The fractional gate synthesis system 102 can comprise a component, machine, device, facility, apparatus and/or instrument that comprises a processor and/or can be capable of effective and/or operative communication with a wired and/or wireless network. All such embodiments are envisioned. For example, fractional gate synthesis system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

Generally, the fractional gate synthesis system 102 can implement a fractional gate synthesis as described further herein to facilitate operation of and/or operate a quantum circuit on a set of qubits.

In one or more embodiments, the fractional gate synthesis system 102 can comprise a processor 104 (e.g., computer processing unit, microprocessor, classical processor, quantum processor and/or like processor). In one or more embodiments, any component associated with fractional gate synthesis system 102, as described herein with or without reference to the one or more figures of the one or more embodiments, can comprise one or more computer and/or machine readable, writable and/or executable components and/or instructions that can be executed by processor 104 to facilitate performance of one or more processes defined by such component(s) and/or instruction(s).

In one or more embodiments, the fractional gate synthesis system 102 can comprise a computer-readable memory 106 that is operably connected to the processor 104. The memory 106 can store computer-executable instructions that, upon execution by the processor 104, can cause the processor 104 and/or other components of the fractional gate synthesis system 102 (e.g., fractional gate synthesis component 108, database component 110, and/or output component 112) to perform one or more acts. In one or more embodiments, the memory 106 can store computer-executable components.

In some embodiments, the fractional gate synthesis system 102 and/or a component thereof as described herein can be communicatively, electrically, operatively, optically and/or otherwise coupled to one another via a bus 124 to perform functions of computer system 100, fractional gate synthesis system 102 and/or any components thereof and/or coupled therewith. Bus 124 can comprise one or more of a memory bus, memory controller, peripheral bus, external bus, local bus, quantum bus and/or another type of bus that can employ one or more bus architectures. One or more of these examples of bus 124 can be employed to implement any one or more embodiments described herein.

In some embodiments, fractional gate synthesis system 102 can be coupled (e.g., communicatively, electrically, operatively, optically and/or like function) to one or more external systems, sources and/or devices (e.g., classical and/or quantum computing devices, communication devices and/or like devices), such as via a network. In some embodiments, one or more of the components of the computer system 100 can reside in the cloud, and/or can reside locally in a local computing environment (e.g., at a desired location (s)).

In addition to the processor 104 and/or memory 106 described above, fractional gate synthesis system 102 can comprise one or more computer and/or machine readable, writable and/or executable components and/or instructions that, when executed by processor 104, can facilitate performance of one or more operations defined by such component (s) and/or instruction(s).

For example, the fractional gate synthesis system 102 can comprise a database component 110 that can store compiled unitary matrices and/or information (e.g., metadata) relating thereto. Suitable matrices can be stored by the database component 110 at the database component 110, at the memory 106, in the cloud and/or at any other memory internal and/or external to the computer system 100.

Figure 1B:
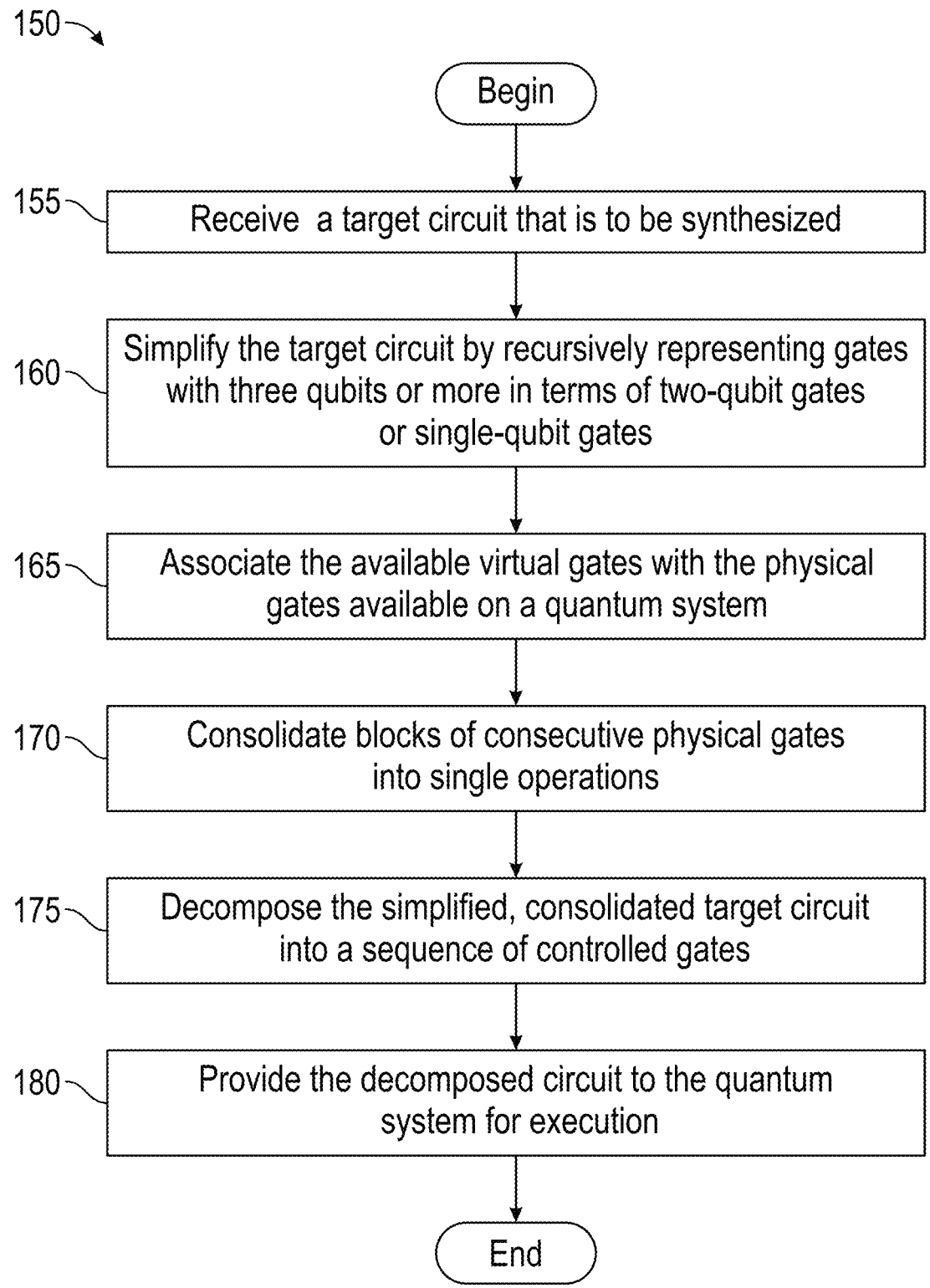
FIG. 1B shows a process of some embodiments for synthesizing a quantum circuit for implementation on a quantum system.

FIG. 1B shows a process 150 of some embodiments, for synthesis of quantum circuits for two-qubit operations into controlled gates, and implementation on the quantum system 101. The process 150 may be performed, for example, by the fractional gate synthesis system 102, which includes processor 104 and memory 106. As an example, the processor 104 may be configured to execute some or all of the operations of the process 150 described below. As another example, the memory 106 may store instructions which when executed by the processor 104, cause the processor 104 to execute some or all of the operations of the process 150 described below. In some embodiments, some of the operations of process 150 described below may be omitted, or may be performed in a different order than described.

The process 150 begins at 155 by receiving a target circuit that is to be synthesized. The target circuit may be made up of virtual gates that are available on the fractional gate synthesis system 102. As an example, the target circuit may be a unitary operator that includes one-qubit and two-qubit gates (also referred to as operations). The target circuit may also be referred to as a target operation.

In some embodiments, the unitary operator may also include gates with three qubits or more. At 160, the process 150 simplifies the target circuit by recursively representing gates with three qubits or more in terms of two-qubit gates or single-qubit gates.

The quantum system 101 may have a set of native (physical) gates, e.g., a basis set, that may not be identical to the virtual gates available on the fractional gate synthesis system 102. At 165, the process 150 associates the virtual gates available on the fractional gate synthesis system 102 with the physical gates available on the quantum system 101.

At 170, the process 150 consolidates blocks of consecutive physical gates into single operations.

The result of the operations 160-170, e.g., the result after the process 150 performs one or more of the simplifying, associating, and consolidation operations upon the target operation, may be referred to as a nonlocal signature for the target circuit. At 175, the process 150 decomposes the nonlocal signature into the available physical gates (e.g., the basis set) that are available on the quantum system 101. For example, in some embodiments, the process 150 decomposes the consolidated single operations into fixed XX-type interactions that are available on the quantum system 101.

In some embodiments, at 175 the process 150 decomposes the nonlocal signature into a sequence of controlled gates, also referred to as an approximating signature. The controlled gates may be, for example, the available basis set on the quantum system 101, or a subset thereof. At 175, the process 150 uses the nonlocal signature to determine one or more approximating signatures that are accessible using the sequence of controlled gates.

In some embodiments, the process 150 applies a projection formula using the nonlocal signature to determine the one or more approximating signatures that are accessible using the sequence of controlled gates. For example, the process 150 may apply the projection formula by taking a sequence of controlled gates and a target nonlocal signature as input, extracting the nonlocal signature(s) of the sequence (s) of controlled gates, extracting from the nonlocal signature(s) a family of polygons and weights, projecting the target nonlocal signature(s) onto the polygons, calculating an average infidelity between the target nonlocal signature (s) and the projections, adding to each such calculation a corresponding weight, and returning as a selected approximating signature the projection with lowest total value.

In some embodiments, if the process 150 determines at 175 that there are more than one approximating signatures, then at 175, the process 150 additionally selects a preferred approximating signature corresponding to the given sequence of controlled gates from the one or more approximating signatures. In some such embodiments, the process 150 selects the preferred approximating signature based on a performance criterion, such as for example, optimizing a cost function associated with the approximating signatures.

At 180, the process 150 provides the decomposed circuit to the quantum system 101 for implementation. For example, in some embodiments, the process 150 determines angles for single-qubit rotations, that convert the approximating signature (e.g., the selected approximating signature) into a quantum circuit, and generates the quantum circuit using those determined angles.

In some embodiments, the process 150 uses a projection formula to determine the angles for single-qubit rotations that convert the approximating signature (e.g., the selected approximating signature) into the quantum circuit. For example, the process 150 may apply the projection formula by taking a sequence of controlled gates and a target nonlocal signature as input, extracting the nonlocal signature(s) of the sequence of controlled gates, extracting from the nonlocal signatures and the target nonlocal signature two equally-sized families of polygons, finding a polygon in the first family in which the target nonlocal signature is a member, determining a corresponding polygon in the second family, producing a point in the second polygon (e.g., by calculating a vertex), and calculating desired angles using trigonometric formulae relating the second point to the target nonlocal signature.

After generating the quantum circuit, the process 150 then provides the generated quantum circuit to the quantum system 101 for implementation. The process then ends.

An embodiment of the fractional gate synthesis component 108 of system 102 will now be described, in which the fractional gate synthesis component 108 may be configured to perform a method for the synthesis of quantum circuits for two-qubit operations into controlled gates. The method may comprise, e.g.: extracting a nonlocal signature for a target operation; for a sequence(s) of controlled gates; using the nonlocal signature to determine one or more approximating signatures accessible using the sequence(s); selecting a preferred approximating signature corresponding to a given sequence based on the one or more approximating signatures; determining angles for single-qubit rotations that convert the given sequence into a quantum circuit; and generating the quantum circuit. The method may also comprise executing the quantum circuit with a quantum computer.

Another embodiment of the fractional gate synthesis component 108 of system 102 will now be described, in which the fractional gate synthesis component 108 may be configured to perform a method for the synthesis of quantum circuits for two-qubit operations into controlled gates. The method may comprise, e.g.: extracting a nonlocal signature for a target operation; for a sequence(s) of controlled gates; applying a first projection formula using the nonlocal signature to determine one or more approximating signatures accessible using the sequence(s); selecting a preferred approximating signature corresponding to a given sequence based on the one or more approximating signatures; using a second projection formula to determine angles for single-qubit rotations that convert the given sequence into a quantum circuit; and generating the quantum circuit. The method may also comprise executing the quantum circuit with a quantum computer.

In an embodiment, applying the first projection formula may comprise: taking a sequence of controlled gates and a target nonlocal signature as input; extracting the nonlocal signature(s) of the sequence(s) of controlled gates; extracting from the nonlocal signature(s) a family of polygons and weights; projecting the target nonlocal signature(s) onto the polygons; calculating an average infidelity between the target nonlocal signature(s) and the projections; adding to each such calculation a corresponding weight; and returning as a selected approximating signature the projection with lowest total value.

In an embodiment, applying the second projection formula may comprise: taking a sequence of controlled gates and a target nonlocal signature as input; extracting the nonlocal signature(s) of the sequence of controlled gates; extracting from the nonlocal signatures and the target nonlocal signature two equally-sized families of polygons; finding a polygon in the first family in which the target nonlocal signature is a member; determining a corresponding polygon in the second family; producing a point in the second polygon (e.g., by calculating a vertex); calculating desired angles using trigonometric formulas relating the second point to the target nonlocal signature.

In some embodiments, a system comprising a processor and memory coupled to the processor is described, wherein the processor is configured to execute steps of the methods described above.

In some embodiments, a tangible memory may have embodied therein program instructions, which when executed by a processor cause the processor to execute the steps of the methods described above.

In some embodiments of the present invention, symplectic geometry is used to find an optimal synthesis method for fractional CNOT gates as well as optimal finite gate sets. Some of these embodiments will now be described in detail. Any of the various features discussed with any one of the embodiments discussed herein may also apply to and be used with any other embodiments.

More precisely, the approach of some embodiments is intended to answer the following questions:

(1) Given a fixed target set of fractional CNOT interactions and error models, how does one synthesize optimal circuits which simulate two-qubit unitary operators, either exactly or approximately?

(2) Given a parametric error model and a calibration budget, what set of fractional CNOT gates should be requested so as to maximize the expected performance of a synthesized circuit?

Practical effects. The effects of the synthesis method of some embodiments were explored, targeting CNOT, $CNOT^{1/2}$, and $CNOT^{1/3}$, on two classes of input quantum circuits, one chosen to be "unstructured" and the other so as to be "structured". In the unstructured setting, the synthesis of 1,000 quantum volume circuits were compared and found that the synthesis method of some embodiments lowered the overall circuit duration by 10%. This is substantial: at the current tier of quantum volume and on coherence-limited devices, this parlays into the bulk of an increase to the next tier. For a structured example, these synthesis methods of some embodiments were applied to the quantum Fourier transform. There is a standard circuit embodiment of n-qubit QFT operators using a recursive decomposition and CPHASE gates whose rotation angle is halved on each recursive step. The synthesis method of some embodiments produces circuits which enjoy a >66% improvement over a strictly CNOT-based decomposition, owing to the synthesizer emitting pair-$CNOT^{1/3}$ decompositions for each of these small-angle CPHASE gates—an optimization which it discovers "automatically".

Figure 2A:
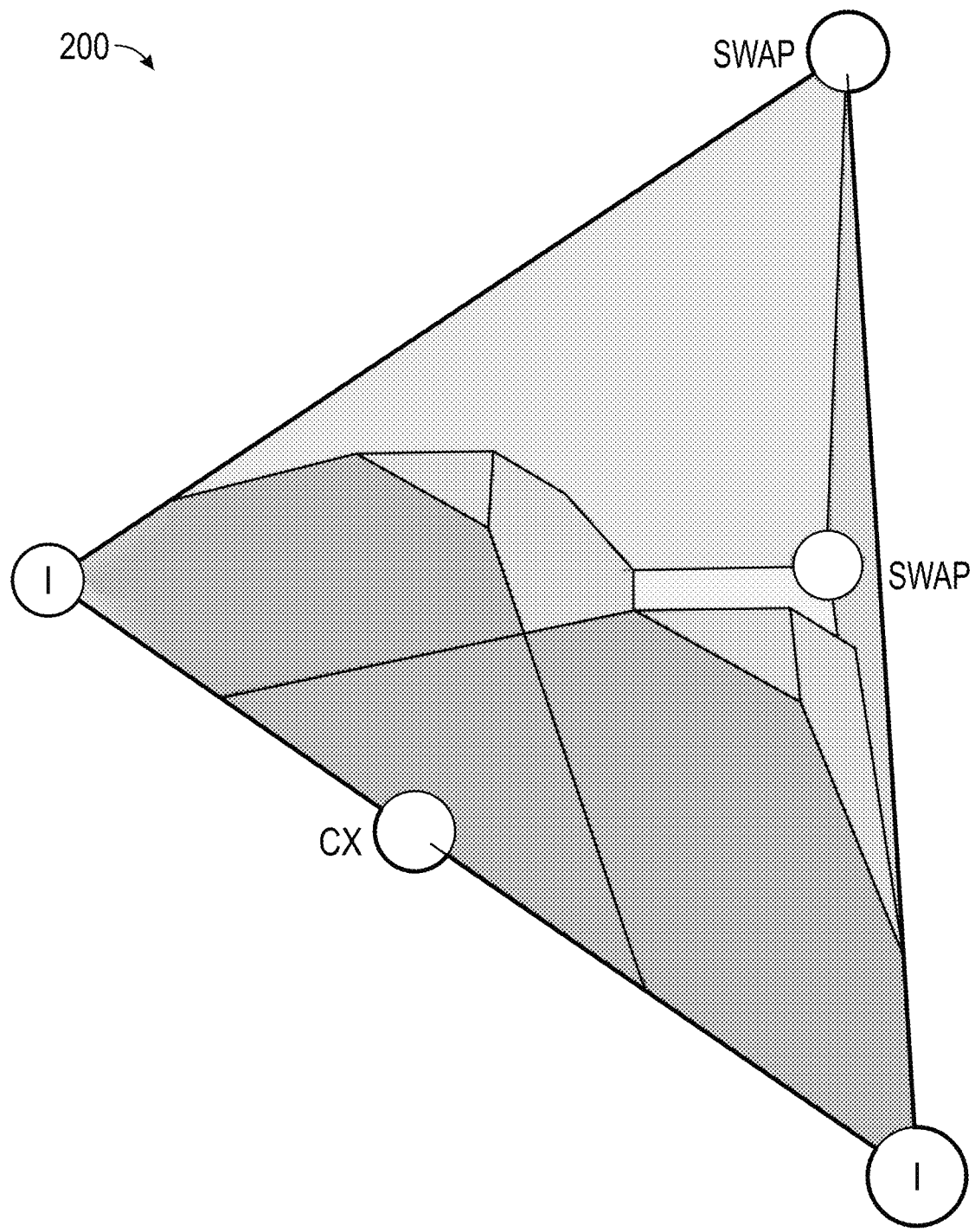
FIG. 2A shows a first perspective of an accessible region for the exponents (⅔, ¼, ⅓) in some embodiments.
Figure 2B:
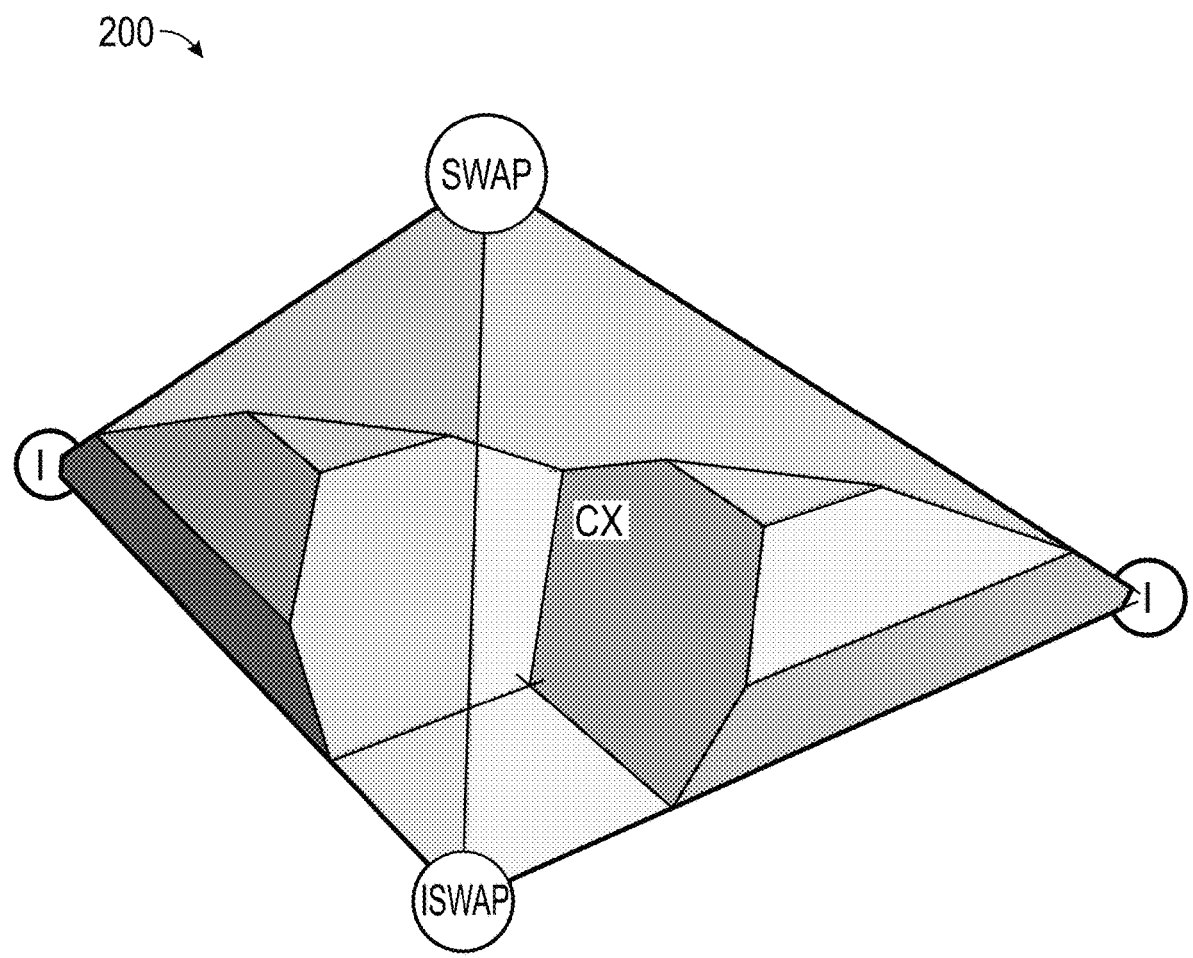
FIG. 2B shows another perspective of the accessible region shown in FIG. 2A, where the SWAP gate is near the eyepoint.

FIGS. 2A and 2B show perspectives of some embodiments on the example XX-circuit polytope for the interaction strength sequence $$\left(\frac{\pi}{6}, \frac{\pi}{8}, \frac{\pi}{12}\right).$$

FIG. 2A shows a first perspective of the accessible region for the exponents (⅔, ¼, ⅓). FIG. 2B shows another perspective of the accessible region, where the SWAP gate is near the eyepoint. From that perspective, the strength faces are the pair facing inwards, the slant faces are the pair facing outwards, and the frustrum face is colored tan.

The method of some embodiments has multiple stages, each of which provides a result. The first stage of some embodiments is to identify and recognize which regions can be accessed via an available gateset. The result of this stage is the identified regions. Note that there is no explicit synthesis recipe provided by this stage. The second stage of some embodiments is to use the result of the first stage, and perform the actual synthesis in a recursive manner, which is done by parametrization of the circuit.

Synthesis. The first result of some embodiments applies the analytic approach of some embodiments to the specific case of fractional CNOTs, where a bounded description is found, of which two-qubit unitaries can be realized as circuits using a given sequence of fractional CNOTs. This recognition tool makes no additional assumptions on its input and permits, e.g., a mixed set of fractional exponents.

The second result of some embodiments forms the recursive step in an inductive procedure for synthesizing circuits. The method mentioned above may not lend itself to circuit synthesis in some embodiments, because local operations have a rather elaborate parametrization, from which it may be difficult to solve for angle values which realize a given circuit identity, much less to produce closed-form formulas for them. To ameliorate this problem, the method of some embodiments selects a constrained set of local gates and a particularly simple parametrization of them, analyzes the set of unitaries which can be accessed from this restricted set, and applies the first result to conclude that nothing has been missed. This can then be inverted to solve for the parametrization coordinates, ultimately resulting in the analytic synthesis method of some embodiments.

In some embodiments, the specific sequence of fractional CNOTs are also selected, from which a circuit embodiment of the target two-qubit unitary will be synthesized. Not only is it possible to perform this search efficiently, but its separation also gives an opportunity to instead perform approximate synthesis. The third result of some embodiments is an analytic formula for a substitute two-qubit unitary which is realizable by a given sequence of fractional CNOTs and which is the best approximation to the original target according to average gate infidelity. Altogether, this gives quite a lot of flexibility in how the synthesis procedure of some embodiments selects circuits and in what optimality metric it aims to optimize.

Fidelity is defined in some embodiments as a distance measure between quantum states. The gate fidelity uses fidelity to decide how noisy a quantum gate is. The difference between an ideal gate (a logical gate) and the corresponding physical gate offered by quantum hardware is defined as gate infidelity.

With all this in hand, the performance of the proposed method of some embodiments is compared with a different, brute-force numerical approach to the problem. Implementing each technique with only light optimizations, it is found that when targeting either of $CNOT^{1/2}$ or $CNOT^{1/3}$ alone, the analytic method of some embodiments runs 200-500 faster than a brute numerical search and only 2-3 slower than the original decomposition into full CNOTs.

The method of some embodiments is not limited to interacting gates of a single kind.

Additionally, with the optimal synthesis output to compare against, it is found that in some embodiments brute numerical search often yields nonoptimal results. For Haar-random targets this happens ~25-30% of the time, resulting in ~7% deeper circuits overall.

Gateset design. With the synthesis results of some embodiments in hand, it is possible to explore which fractional CNOTs are particularly profitable to include as native gates. Posing this question relies on a quantitative notion of "profitability", which is motivated by two avenues.

First, the physical experiment of some embodiments is considered: the $CNOT^\alpha$ available on quantum devices of some embodiments enjoy average gate fidelity well-modeled by $I(\alpha)=m\alpha+b$ for some experimentally determined parameters m and b. Some further observations are now made about these parameters and their effect on I:

This value $I(\alpha)$ is small in an absolute sense, so that average gate infidelity of a sequence of gate applications can be taken to be approximately the sum of their individual average gate infidelities.

The ratio m/b is approximately 5, so that neither m nor b can be wholly neglected.

Figure 3:
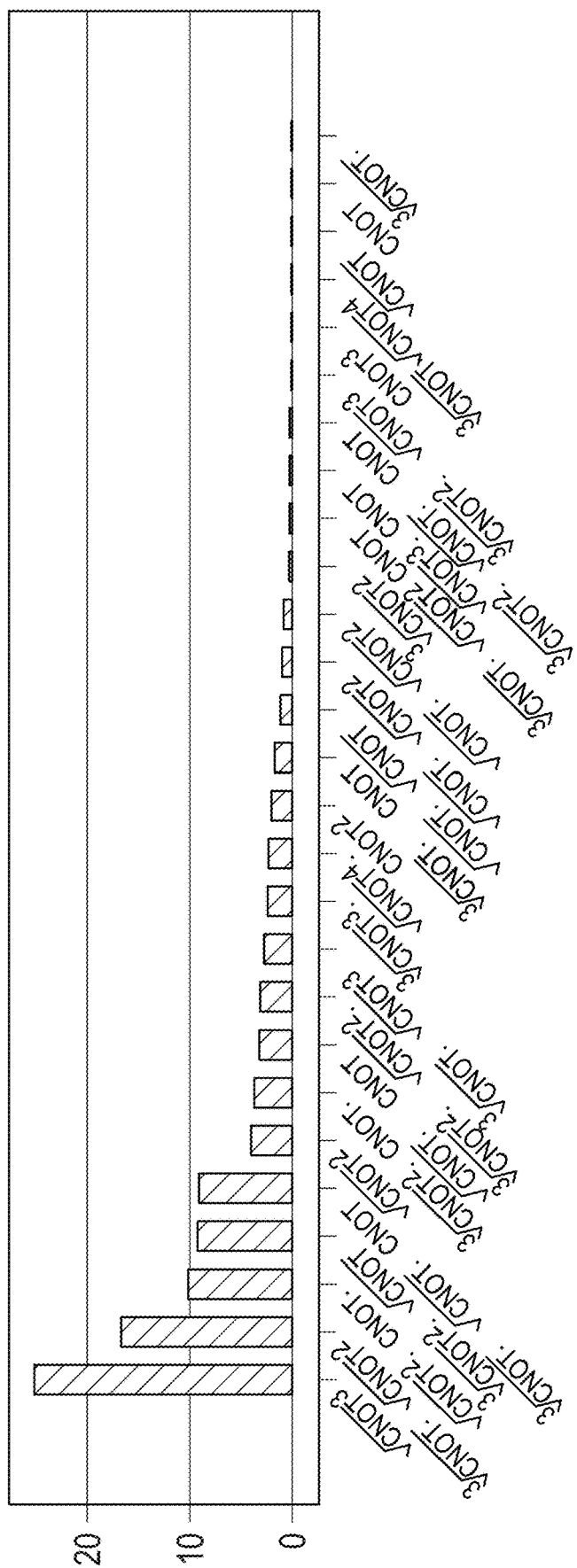
FIG. 3 shows a distribution of circuit types when approximately synthesizing 31,800 Haar-random two-qubit unitaries in some embodiments.

FIG. 3 shows a distribution of circuit types of some embodiments when approximately synthesizing 31,800 Haar-random two-qubit unitaries into CNOT, $CNOT^{1/2}$, and $CNOT^{1/3}$. Note that the second, third, and fourth most common circuit templates use mixed exponents.

Optimizing average gate infidelity, which bears directly on the on-device performance of programs, thus translates in some embodiments into minimizing a weighted combination of circuit depth as well as the total CNOT exponent.

As a second form of motivation, the kinds of two-qubit unitaries which appear as input to the synthesis routines may already be present in some compilers (e.g., Qiskit). These come from a variety of sources, not all of which follow the same distribution, so there is an opportunity to preference one distribution over another and tailor a gateset to a specific source. However, the opposite approach is instead taken in some embodiments: the mixture of the distributions is approximately Haar-uniform, and so the "ignorant" hypothesis is taken of synthesizing random gates. (A considerable point-mass at the SWAP gate is neglected). Combining this choice of distribution with the circuit region description from the previous subsection, the expected on-device cost of circuit synthesis can be computed. Letting the exponents of the fractional CNOTs range as inputs, this yields a "average cost function" to be minimized in some embodiments.

While the precise shape of this cost function may depend on the values of m and b, in the regime of interest this is very mild, there is a unique local minimum, and the basin in which this global minimum lies is wide. Hence, in some embodiments, one need not calculate the error parameters carefully, nor worry that they drift over time or space. For the determined values of m and b, extending a gateset already containing CNOT is well-approximated by the square-root $CNOT^{1/2}$ gate, and adding after that is well-approximated by the cube-root $CNOT^{1/3}$ gate. Including the square root improves the expected average gate fidelity of a synthesized circuit by 29%, and including the cube root as well brings this value to 31%. (The more muted 10% improvement in quantum volume circuit duration is largely due to the layers of permutation gates, which the method of some embodiments typically does not improve upon.). This is to be compared with calibrating the entire parametric family of fractional CNOTs and applying the same error model to optimal synthesis into this set, which yields an improvement over CNOT alone of 37%. Thus, only a very small number of gates are already responsible in some embodiments for the vast majority of the improvement of the continuous limit.

The savings enjoyed when using other synthesis objectives were also explored, including approximate and "mirrored" synthesis. These expected savings calculations are not lent to analytic solution, but from numerical sampling, it is found that these optimization landscapes largely mimic that of exact synthesis: the bulk of the savings is still captured by the square- and cube-roots of CNOT, and the overall savings grows as the synthesis routine is permitted more flexibility (approximate: ~35%; mirrored: ~41%; both: ~43%).

In other embodiments of the present invention, analysis and manipulation of certain polyhedral subsets of the space of canonical gates is used to provide an optimal procedure, as well as an efficient software implementation, for exact and approximate synthesis of two-qubit unitary operations into any prescribed discrete family of XX-type interactions and local gates. These embodiments will now be described in detail. Any of the various features discussed with any one of the embodiments discussed herein may also apply to and be used with any other embodiments.

Using the analysis and manipulation of certain polyhedral subsets of the space of canonical gates, an analysis of some embodiments of which small sets of XX-type interactions cause the greatest improvement in expected infidelity under experimentally-motivated error models is provided. For the exact circuit synthesis of Haar-randomly selected two-qubit operations, an improvement is found in estimated infidelity by ≈31.4% when including $CX^{1/2}$ and $CX^{1/3}$ alongside the standard gate CX, near to the optimal limit of ≈36.9% obtained by including all fractional applications $CX^\alpha$, $\alpha \in [0, 1]$.

Section 1: Introduction

Some embodiments of the present invention describe an optimal synthesis routine for two-qubit unitary operations which targets a discrete family of XX-type interactions (e.g., a finite set of controlled unitaries). Such two-qubit unitary operations are common on contemporary platforms: the gate CX is such an example, and synthesis routines for it have long been known to give rise to algorithmic schemes for universal quantum computation, making it an attractive target for device engineers. The physical processes which give rise to the operation CX can typically be truncated to produce "fractional applications" $CX^\alpha$ for $0 \leq \alpha \leq 1$, each of which is also of XX-type, giving rise to an infinite family of further examples. Though not required for universal computation, the availability of these "overcomplete" basis gates has the potential to yield more efficient synthesized circuits, particularly if the error magnitude of $CX^\alpha$ correlates with α: while the universally programmable CX circuit invokes CX three times, the universally programmable fractional CX circuit invokes $CX^\alpha$, $CX^\beta$, and $CX^\gamma$ with $\langle \alpha+\beta+\gamma \rangle = 3/2$.

In practice, however, these parametric families are difficult to operate. The relationship between the degree of truncation and the value a is often nonlinear and prone to imperfect measurement, and constraints in the steering electronics (e.g., waveform sample rate) can make truncations unavailable below some threshold. Hence, when extreme precision is required, wholesale use of these parametric families may be impractical.

For a specific alpha (gate parameter), that gate can be calibrated to a desired precision. But for a continuum of alphas, this becomes impractical as the calibration time can go to infinity. In other words, calibration cannot guarantee precision for a continuum of alphas, only a discrete few. This gives rise to the following question:

Question.

Given a fixed "calibration budget" which permits the tuning of n fractional operations, which set of values $\alpha_1, \ldots, \alpha_n$ maximizes (average-case) device performance? How does one efficiently find expressions for generic two-qubit unitaries in terms of these operations? How does one simultaneously guarantee the optimality of such expressions, as measured against device performance?

This question is answered fully with some embodiments of the present invention. The results are an efficient test for when a two-qubit unitary operation is expressed as a circuit using any particular sequence of XX-interaction strengths $(\alpha_1, \ldots, \alpha_n)$ with local gates interleaved, an efficient synthesis routine for manufacturing such circuits, and an efficient routine for producing the best approximation (in average gate fidelity) within the set of such circuits. Some embodiments of the present invention are the first optimal synthesis algorithm which targets a discrete "heterogeneous" set of multiqubit interactions.

These tools combine to give a synthesis scheme for reasonably behaved cost functions (e.g., average gate infidelity), an example of which can be implemented in some embodiments using Qiskit's quantum_info subpackage as the class XXDecomposer. These results are leveraged to explore the design space of gate set extensions where $\alpha_1, \ldots, \alpha_n$ are constrained to be drawn from some small, fixed set of pretuned angles. For experimentally realistic error models, the main findings are that in some embodiments, including first $CX^{1/2}$ and then $CX^{1/3}$ give significant improvement over CX alone at several common tasks (e.g., synthesis of random unitaries, as reported in Table 5; and synthesis of certain structured operators like QFT, as reported in Table 2), and that these two gates capture almost all of the benefit of allowing $\alpha_1, \ldots, \alpha_n$ to be drawn without constraint (cf. Table 3).

Figure 4:
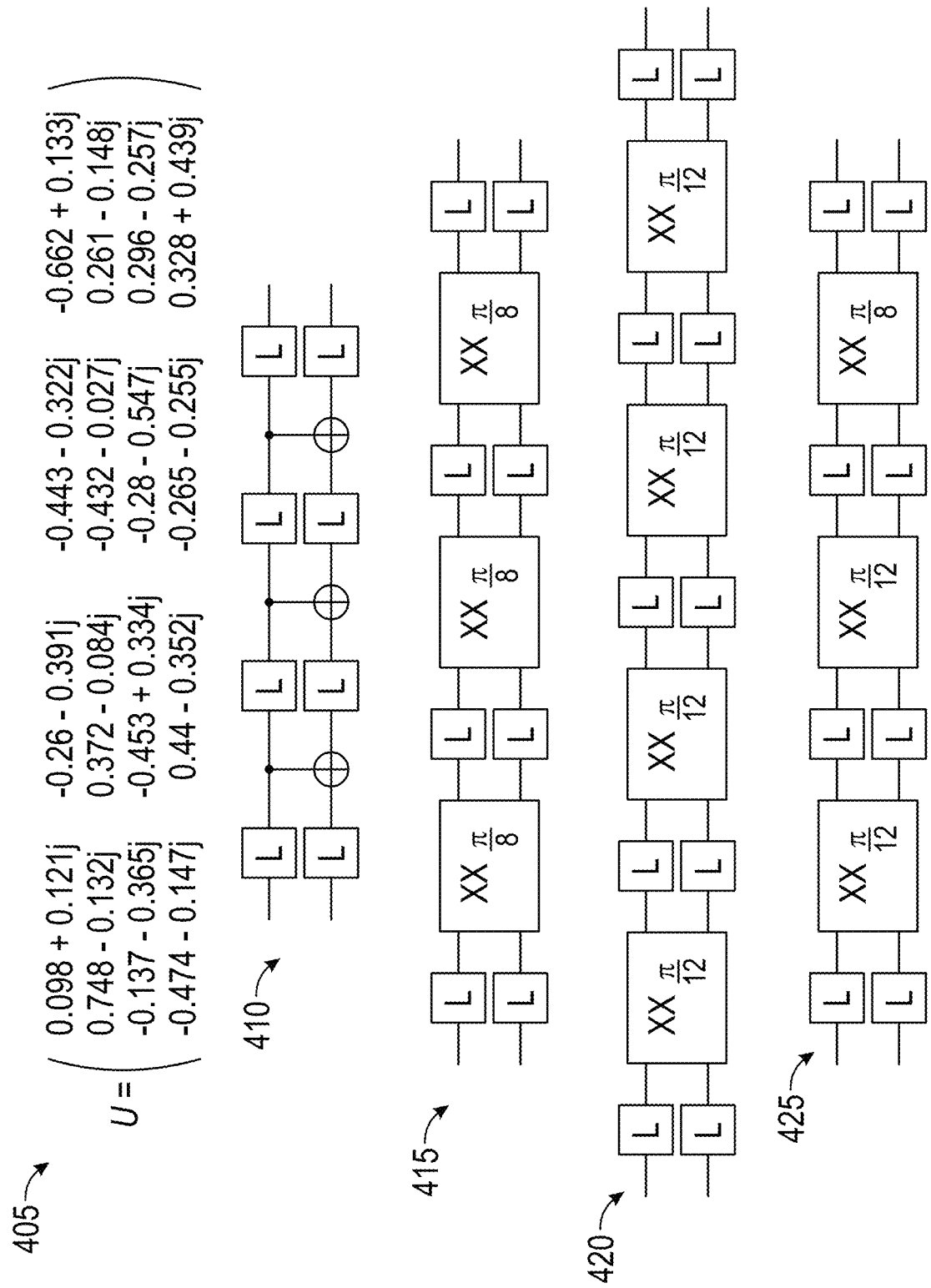
FIG. 4 shows four syntheses of a two-qubit operator of some embodiments.

FIG. 4 shows an example of four syntheses (also referred to as signatures) of a two-qubit operator $U \in SU(4)$ 405 with canonical coordinate (0.968, 0.273, 0.038). The first synthesis 410 is a synthesis into a triple of CX gates. Hereafter, the infidelity of this circuit is referred to as the "baseline". The second synthesis 415 is an exact, optimal synthesis into a triple of XX π/8 gates. The third synthesis 420 is an exact, optimal synthesis into four XX π/12 gates. The fourth synthesis 425 is an exact, optimal synthesis into a mixed set of gates. Table 1 describes the relative infidelity costs of these example syntheses in an error model where XX gate infidelity is linearly related to the parameter with a small affine offset.

TABLE 1

| Gateset description | Synthesized infidelity | | |
|---|---|---|---|
| | Zhang et al. [12] | Lao et al. [8] | Ours |
| $\{XX_{\frac{\pi}{4}}\}$(baseline) | 133% | 100% | 100% |

TABLE 1-continued

| | Synthesized infidelity | | |
|---|---|---|---|
| Gateset description | Zhang et al. [12] | Lao et al. [8] | Ours |
| $\{XX_{\frac{\pi}{8}}\}$ | 67% | 67% | 50% |
| $\{XX_{\frac{\pi}{12}}\}$ | 56% | 56% | 44% |
| $\{XX_{\frac{\pi}{4}}, XX_{\frac{\pi}{8}}, XX_{\frac{\pi}{12}}\}$ | n/a | n/a | 39% |

Table 2 describes an example of Qiskit syntheses of QFT circuits, targeting a family of qubits supporting either $\mathcal{S}=\{CX\}$ or $\mathcal{S}=\{XX \frac{\pi}{4}, XX \frac{\pi}{8}, XX \frac{\pi}{12}\}$ and with all-to-all connectivity. At right, the expected reduction in circuit infidelity is included, under the assumption that XX gate infidelity is linearly related to the parameter with a small affine offset. In the limit of a large qubit count, the expected infidelity of a QFT circuit synthesized to the fractional gate set drops by two-thirds that of the standard CX-based gate set.

TABLE 2

| | Gates emitted | | |
|---|---|---|---|
| QFT size | CX | $\{XX_{\frac{\pi}{4}}, XX_{\frac{\pi}{8}}, XX_{\frac{\pi}{12}}\}$ | Synthesized infidelity |
| 3 | $CY^6$ | $XX_{\pi/12}^2 \cdot XX_{\pi/8}^2$ | 27.8% |
| 4 | $CX^{12}$ | $XX_{\pi/12}^6 \cdot XX_{\pi/8}^3$ | 29.2% |
| 5 | $CX^{20}$ | $XX_{\pi/12}^{12} \cdot XX_{\pi/8}^4$ | 30.0% |
| 6 | $CX^{30}$ | $XX_{\pi/12}^{20} \cdot XX_{\pi/8}^5$ | 30.6% |
| 7 | $CX^{42}$ | $XX_{\pi/12}^{30} \cdot XX_{\pi/8}^6$ | 31.0% |

The Case of One Qubit

To give a sense of the methods and results of some embodiments, the analogous problem is now analyzed for one-qubit unitaries: decomposition into a fixed set of fractional X-rotations and unconstrained Z-rotations. The fixed X-rotation most typically available is $$X_{\frac{\pi}{2}},$$

and $$X_{\frac{\pi}{2}}$$

-based circuit can be synthesized for a unitary U through "Euler ZYZ decomposition". Namely, there are angle values $\theta$, $\phi$, and $\lambda$ which satisfy $$U = Z_\phi \cdot Y_\theta \cdot Z_\lambda = Z_{\phi+\pi} \cdot X_{\frac{\pi}{2}} \cdot Z_{\theta+\pi} \cdot X_{\frac{\pi}{2}} \cdot Z_\lambda,$$

easily calculable by diagonalizing $UU^T$. Since U can freely range, the right-hand side of this equation gives a universally programmable quantum circuit. A downside to this circuit is that the operational cost of U is always that of a pair of $$X_{\frac{\pi}{2}}$$

gates, even if U itself is a small rotation of the Bloch sphere. One can set aside special cases when $\theta$ is zero or $$\frac{\pi}{2},$$

but these are probability-zero events in common measures.

For circuits based on other choices of choices of X-rotation angles, such as $$Z_\iota^{-1} \cdot X_\psi \cdot Z_\Lambda \cdot X_{\psi'} \cdot Z_{\iota'}^{-1},$$

one must perform some mathematical analysis to discern the limited set of synthesizable operations $Y_\theta$. Varying $\iota$, $\iota'$, and $\iota''$, the equation $$X_\psi \cdot Z_\Lambda \cdot X_{\psi'} = Z_\iota \cdot Y_\theta \cdot Z_{\iota''}$$

can be seen to admit a solution precisely when $\theta$ satisfies $$|\psi - \psi'| \leq \theta \leq \pi - |\pi - (\psi + \psi')|.$$

This interval can be referred to as $I_{\psi,\psi'}$. In the same manner, a longer sequence of interactions $X_{\psi_1}, \ldots, X_{\psi_n}$ interleaved with Z-rotations gives rise to a corresponding interval $I_{\psi_1, \ldots, \psi_n}$ of achievable values of $\theta$. Additionally, for any particular value of $\theta \in I_{\psi,\psi'}$, one can synthesize a circuit which models $Y\theta$ by taking t as in $$\cos \theta = \cos \psi \cdot \cos \psi' - \cos \iota \cdot \sin \psi \cdot \sin \psi',$$

and $\iota'$, $\iota''$ can be explicitly determined by inspecting the complex phases of a pair of matrix entries.

Now suppose that any given gate $X_\psi$, with $\psi \in [0, \pi]$, can be made available in an experimental setting with infidelity $$m \cdot \left(\frac{\pi}{2}\right)^{-1} \cdot \psi + b$$

for some error model parameters m and b, and at a fixed calibration cost per gate. We seek a small set of gates $\{X_{\psi_1}, \ldots, X_{\psi_n}\}$ so that the intervals constructed above cover the possible values of $\theta$ so as to minimize the expected infidelity cost of a given operation. For instance, FIG. 5 shows the relevant intervals for the gate set $$\{X_{\frac{\pi}{2}}, X_{\frac{\pi}{3}}\}.$$

Figure 5:
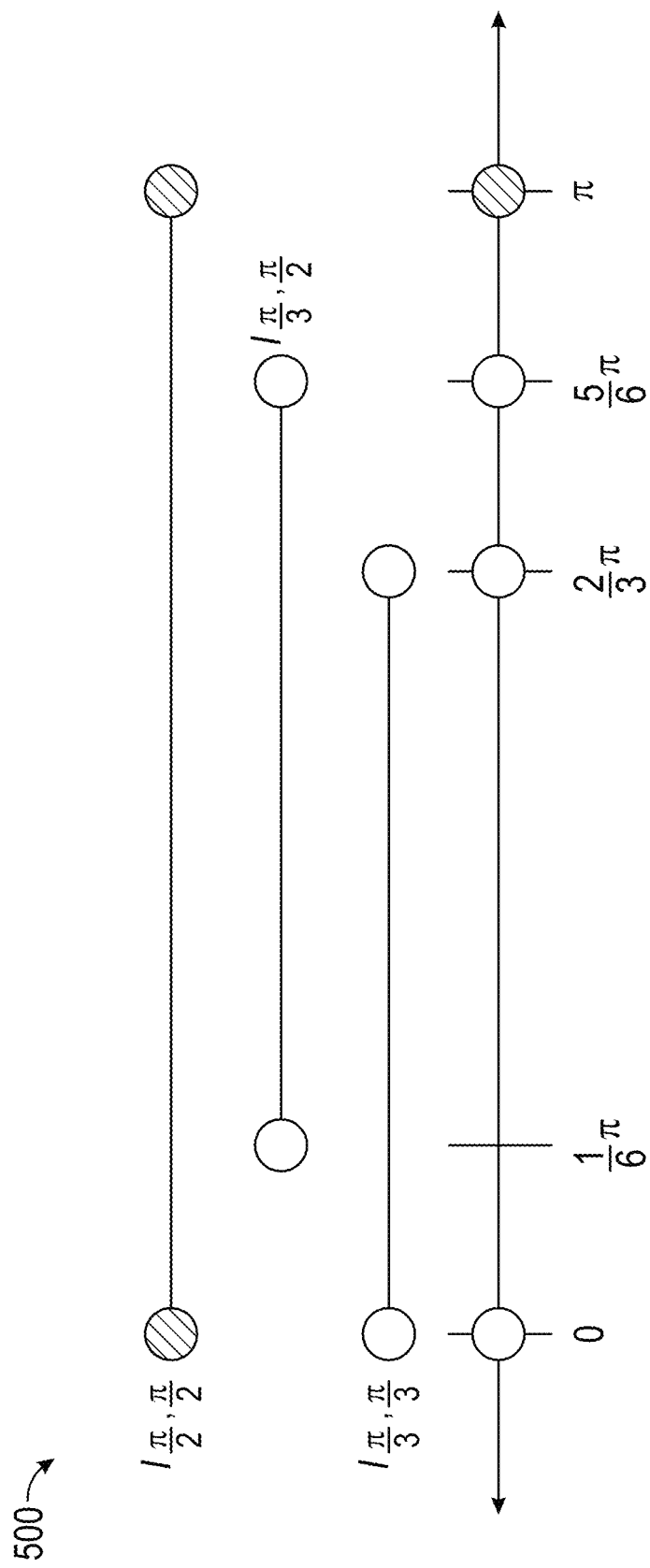
FIG. 5 shows optimal synthesis regions for a one-qubit gate set of some embodiments.

Specifically, FIG. 5 shows optimal synthesis regions in some embodiments for the one-qubit gate set $$\{X_{\frac{\pi}{2}}, X_{\frac{\pi}{3}}, Z_{cts}\}.$$

The interval being covered is the set of angles [0, π] appearing as the middle parameter in a ZYZ—decomposition of a generic $U \in PU(2)$.

Several aspects of this goal can also be understood with additional nuance in some embodiments:

"Expected": The distribution of operations U to be synthesized may affect the relative importance of the various choices of $\psi$. A safe assumption is that U is drawn according to the Haar distribution, in which case the distribution of angle values θ is given by p(θ)=½ sin(θ)

"Cost": In addition to the operational cost of a synthesized circuit (e.g., the cost from gate applications), one can also incorporate a cost stemming from synthesizing some θ' rather than the requested θ. There are then some circumstances where it is profitable to deliberately mis-synthesize $Y_\theta$ as $Y_{\theta'}$, provided the difference between θ and θ' is small and the difference in operational cost between the two circuits is large. Average gate infidelity gives a popular embodiment of this idea, where the fidelity of two one-qubit operations is given by the formula $$F_{avg}(Y_\theta, Y_{\theta'}) = \frac{2 + \cos(\theta - \theta')}{3}.$$

Against this yardstick, the $\theta' \in I_{\psi,\psi'}$ top which gives the best approximation to a $\theta \notin I_{\psi,\psi'}$ top occurs at one of the interval endpoints.

"Given operation": Rather than synthesizing the operation U requested, in some embodiments the compiler can choose to inject a reversible logic operation R and its inverse $R^{-1}$ into the program, synthesizing the composite U·R and either commuting $R^{-1}$ forward through the circuit or absorbing its effect into software. This option can be used to further shape the expected distribution of inputs. For single-qubit operations, a typical choice of R is the classical logic gate $X_\pi$, which has the effect of trading $X_\theta$ for $X_{\pi-\theta}$. For two-qubit operations, a common choice of R is the classical logic gate SWAP.

Considering only exact synthesis for now, the following expected (e.g., Haar-averaged) average gate infidelities are computed for various gate sets in some embodiments:

$X_{\frac{\pi}{2}}$:

2m+2b, the standard decomposition, used as a baseline.

$X_{\frac{\pi}{3}}: \frac{3}{2}m + \frac{9}{4}b$, an improvement of ≈25% over the baseline, provided b<<m.

$\{X_{\frac{\pi}{2}}, X_{\frac{\pi}{3}}\}: \frac{19-\sqrt{3}}{12}m + 2b$, an improvement of ≈28% over the baseline, provided b<<m.

$\{X_{cts}\}$: In the continuous limit with all gates $X_\theta$ available, the cost becomes m+b, an improvement of 50% over the baseline.

These values can be further improved in some embodiments by considering approximate and mirrored synthesis, either separately or in tandem.

Outline of the Two-Qubit Case

The analysis of the two-qubit case of some embodiments follows along roughly the same lines as above, and in the same order.

Section 2: Generalizing Euler decomposition, a lightning review of KAK decomposition is provided, as specialized to two-qubit unitary operations.

Section 3: A more detailed plan of attack on the two-qubit problem is provided, outlining the steps in the proofs to come.

Section 4: Generalizing the interval $I_{\psi,\psi'}$, a compact description is given of which two-qubit gates are accessible to a circuit built out of a fixed sequence of XX-type interactions with one-qubit operations interleaved (Theorem 4.1). This detects when a two-qubit operation admits synthesis as a circuit of a certain type, but it does not indicate how to produce the circuit.

Section 5: Generalizing the formula relating cos θ and cos ι, a method is singled out for choosing local circuit parameters which are simple to analyze (Theorem 5.3). This is compared with the previous section and a proof is provided that each of these restricted circuits nonetheless exhaust the space of possibilities (Theorem 5.5).

Section 6: Generalizing the discussion around cost, an efficient method is provided to find the best approximation within a given circuit family (Theorem 6.10), and is coupled to the preceding results to produce the promised efficient synthesis method (Procedure 6.1, Procedure 6.8).

Section 7: Generalizing the calculations of expected cost for various gate sets, experimental data is used to justify the use of a particular error model as a cost function (Definition 7.3), study the effect of choice of gate set (Example 7.6), and describe what is left to gain in the large limit of fractional gate count (Remark 7.8).

A small example of the effectiveness of these techniques in some embodiments is provided, as applied to a random operator in and to a family of structured operators in Table 2, reserving further analysis for Section 7.

Conventions

The following abbreviations are used throughout:

$$c_\theta = \cos(\theta),$$

$$s_\theta = \sin(\theta),$$

$$x_+ = \sum_j x_j.$$

Section 2: Résumé on Two-Qubit Unitaries and the Monodromy Map

The theory of Cartan decompositions is briefly recalled, as it applies to two-qubit unitary operations and its role in circuit synthesis.

Lemma 2.1. Let CAN denote the following two-qubit gate:

$$CAN = (a_1, a_2, a_3) = \exp(-i(a_1 XX + a_2 YY + a_3 ZZ)) =$$

$$\begin{pmatrix} e^{ia_3}c_{a_1-a_2} & 0 & 0 & -ie^{ia_3}s_{a_1-a_2} \\ 0 & e^{-ia_3}c_{a_1+a_2} & -ie^{-ia_3}s_{a_1+a_2} & 0 \\ 0 & -ie^{-ia_3}s_{a_1+a_2} & e^{-ia_3}c_{a_1+a_2} & 0 \\ -ie^{ia_3}s_{a_1-a_2} & 0 & 0 & e^{ia_3}c_{a_1-a_2} \end{pmatrix}.$$

Any two-qubit unitary operation $U \in PU(4)$ can be written as $$U = L \cdot CAN(a_1, a_2, a_3) \cdot L',$$

where L, $L' \in PU(2)^{\times 2}$ are local gates and $a_1$, $a_2$, $a_3$ are (underdetermined) real parameters.

Definition 2.2 ("Canonical decomposition"). In Lemma 2.1, there is a unique triple $(a_1, a_2, a_3)$ satisfying $a_1 \geq a_2 \geq a_3 \geq 0$, $$\frac{\pi}{2} \geq a_1 + a_2,$$

and one of either $a_3 > 0$ or $$a_1 \leq \frac{\pi}{4}.$$

Such a triple is called a positive canonical coordinate, and we denote the space of such as $\mathfrak{A}_{c_2}$. This unicity determines a function $\Pi$: $PU(4) \to \mathfrak{A}_{c_2}$, called the monodromy map. Away from the plane $a_3 = 0$, this function is continuous. Near the plane $a_3 = 0$, the function $\Pi$ becomes continuous after imposing the identification $$(a_1, a_2, 0) \sim \left(\frac{\pi}{2} - a_1, a_2, 0\right).$$

Example 2.3. Here are the positive canonical triples for some familiar gates:

$$\Pi(I) = (0, 0, 0),$$

$$\Pi(SWAP) = \left(\frac{\pi}{4}, \frac{\pi}{4}, \frac{\pi}{4}\right),$$

$$\Pi(CX) = \left(\frac{\pi}{4}, 0, 0\right).$$

Generalizing the last example, the positive canonical triple for any controlled unitary gate has the form $(a_1, 0, 0)$; such an operation is said to be of XX-type. Specifically, the fractional gate $CX^\alpha$ is of XX-type, with coordinate $$\Pi(CX^\alpha) = \left(\alpha \cdot \frac{\pi}{4}, 0, 0\right).$$

From this perspective, the final coordinate measures interaction duration, so that smaller values give rise to less entanglement.

In some embodiments, this apparatus has two main uses, captured in the following pair of results:

Lemma 2.4. A pair of two-qubit operations U and V are said to be locally equivalent when there exist local gates L, L'∈ PU $(2)^{\times 2}$ with U=L·V·L'. This condition holds if and only if $\Pi(U) = \Pi(V)$.

Theorem 2.5. Let $\mathcal{S}$, $\mathcal{S}' \subseteq PU(4)$ be two sets of two-qubit operations whose images $\Pi(\mathcal{S})$, $\Pi(\mathcal{S}') \mathfrak{A}_{c_2}$ through $\Pi$ are polytopes (e.g., a set of isolated points). Then the image of the set $$\mathcal{S} \cdot PU(2)^{\times 2} \cdot \mathcal{S}' = \left\{ S \cdot (L \otimes L') \cdot S' \;\middle|\; \begin{array}{l} S \in \mathcal{S}, S' \in \mathcal{S}', \\ L, L' \in PU(2) \end{array} \right\}$$

through $\Pi$ is also a polytope. Given explicit descriptions of the input polytopes as families of linear inequalities, the output polytope can also be so described.

The work of some embodiments leads directly into considering families of two-qubit gates and their parametrizations, so some attendant language is introduced.

Definition 2.6. A gate set is any collection of two-qubit unitaries; typically gate sets will be considered which are made up of finitely many controlled unitaries. For a gate set $\mathcal{S}$, an $\mathcal{S}$-circuit is a finite sequence of members of $\mathcal{S}$ and local gates. The operation which it enacts is given by the product of the sequence elements. A circuit shape (also commonly called a circuit template or a template) is a circuit-valued function $$C: \theta \mapsto (L_0(\theta), S_1, \ldots, L_{n-1}(\theta), S_n, L_n(\theta)),$$

where each $L_j$ is a parametrized local operator and each $S_j \in \mathcal{S}$ is fixed.

It can be convenient in some embodiments to place further restrictions on the $L_j$ (e.g., that they consist only of Z-rotations), but absent explicit mention each $L_j$ is taken to surject onto $PU(2)^{\times 2}$. In this surjective case, the sequence $(S_1, \ldots, S_n)$ determines the image of C, and it follows from Theorem 2.5 that the image of $\Pi \circ C$ in $\mathfrak{A}_{c_2}$ is a polytope, called the circuit polytope of C (or of $(S_1, \ldots, S_n)$). In the case that $\mathcal{S}$ consists of gates of XX-type, locally surjective circuits can be further identified with the underlying sequence of interaction strengths $(\alpha_1, \ldots, \alpha_n)$ with $S_j = XX_{\alpha_j}$.

Remark 2.7. The coordinate system given in Definition 2.2 is not unique: a similar theorem holds for any choice of "Weyl alcove" in $\mathfrak{pu}_4$. When $\mathfrak{g}$ is the Lie algebra of a simply connected Lie group (e.g., $\mathfrak{su}_4$), each Weyl alcove is related to every other by a discrete set of linear transformations including reflections and shears. Without the simply-connected hypothesis (e.g., $\mathfrak{pu}_4$), they are related by linear transformations and "scissors congruence". The choice of coordinate system in some embodiments differs from previous approaches by a nontrivial scissors congruence, effectively replacing the condition stated there, (Log Spec$U$)$_3$+½>(Log Spec$U$)$_1$, by the alternative (Log Spec$U$)$_2$+(Log Spec$U$)$_3$>0.

Remark 2.8 (cf. Remark 4.5). Later, it will be convenient to consider a variant of positive canonical triples which are not required to be sorted. Unsorted triples $(a_1, a_2, a_3)$ which become positive canonical triples upon sorting are those which satisfy $0 \leq a_j$ and $$a_j + a_k \leq \frac{\pi}{2}$$

for all choices of j and k. The set of such triples still gives a convex polytope.

Section 3: XX-Based Circuit Synthesis: Strategy

The task is now required of synthesizing for any two-qubit unitary operator U and gate set $\mathcal{S}$ consisting of XX interactions an $\mathcal{S}$-circuit C modeling U. To set the stage for this strategy, suppose instead that C is given. A sequence of truncations $C_j$ can be produced in some embodiments from C that retain steps 1 through j. Each $C_j$ is also a circuit modeling some other unitary operator $U_j$, and if C is optimal (as defined by some metric) for circuits modeling U against some well-behaved cost function, then each $C_j$ will be so optimal (by the same metric) for $U_j$. The images $p_j = \Pi(U_j) \in \mathfrak{A}_{c_2}$ of these intermediate operators then describe a path through the Weyl alcove, where the $j^{th}$ step in the path belongs to the region $P_j$ of operations whose optimal circuits take the form of $C_j$.

Since the goal is to construct C, one might instead begin in some embodiments by constructing the path $(p_j)_j$, subject to the two constraints:

1. $p_j$ lies in $P_j$.
2. The hop from $p_j$ to $p_{j+1}$ is given by some "nice" circuit.

In order to understand the first constraint, a compact description is given of $P_j$ by way of describing the circuit polytope associated to an arbitrary sequence of XX-type interactions. This is referred to as the global theorem (Theorem 4.1) since it describes the large-scale structure of the problem and does not reference the individual point $p_j$. Though the main tool here is Theorem 2.5, for a generic sequence of interactions it can only guarantee an exponential-sized family of convex bodies, themselves each of increasing facet complexity. It is a special feature of interactions of XX-type that the associated circuit polytopes have a fixed number of convex bodies, each of fixed complexity, independent of the sequence length.

To understand the second constraint, a particular "nice" circuit is chosen, and the effect analyzed under Π of appending such a circuit to a canonical gate (Lemma 5.1), resulting in a family of constraints referred to as "interference inequalities" (Theorem 5.3). This, too, is specific to the case of some embodiments: even for interactions of XX-type, not all choices of unit circuit have a discernable image under Π, nevermind a polytope.

The program is completed by linking these two together in the local theorem (Theorem 5.5): it is shown that in some embodiments, for any $p_{j+1} \in P_{j+1}$, one can always find a $p_j \in P_j$ linked to $p_{j+1}$ by one of these simple circuits. This argument can then be reorganized in some embodiments into a constructive, efficient synthesis routine (Procedure 6.1). Additionally, it can be shown how to select a point $p' \in P_j$ which is the best approximation in some embodiments by average gate infidelity to $p=\Pi(U)$ (Theorem 6.10).

Section 4: The Global Theorem

One of the overall goals in some embodiments is to describe the set of positive canonical triples whose optimal circuit implementation uses a sequence of interaction strengths $(\alpha_1, \ldots, \alpha_n)$. This can be accomplished in some embodiments by describing those positive canonical triples which admit any such circuit implementation, even if suboptimal. Optimality can then be enforced by taking a complement against positive canonical triples which admit superior circuit implementations. In this section, this goal is accomplished, summarized in the following Theorem:

Theorem 4.1. Let $(\alpha_j)_j$ be a sequence of interaction strengths satisfying $$\alpha_j \in \left[0, \frac{\pi}{4}\right],$$

and let $(a_1, a_2, a_3)$ be a positive canonical coordinate. The canonical operator $CAN(a_1, a_2, a_3)$ admits a presentation as a circuit of the form $$L_0 \cdot XX_{\alpha_1} \cdot L_1 \cdot \ldots \cdot L_{n-1} \cdot XX_{\alpha_n} \cdot L_n,$$

where $L_j$ are local operators, if and only if either of the following two families of linear inequalities is satisfied:

$$\begin{cases} \alpha_+ \geq a_1 + a_2 + a_3, \\ \min_k \alpha_+ - 2\alpha_k \geq -a_1 + a_2 + a_3, \\ \min_{k \neq \ell} \alpha_+ - \alpha_k - \alpha_\ell \geq a_3; \end{cases}$$

$$\begin{cases} -\frac{\pi}{2} + \alpha_+ \geq -a_1 + a_2 + a_3, \\ \frac{\pi}{2} + \min_k \alpha_+ - 2\alpha_k \geq a_1 + a_2 + a_3, \\ \min_{k \neq \ell} \alpha_+ - \alpha_k - \alpha_\ell \geq a_3. \end{cases}$$

The first, second, and third inequalities in each family are respectively referred to as the strength, slant, and frustrum bounds.

Remark. From a physical perspective, the circuit polytope ought to be invariant under injecting extra zero-strength interactions into the defining sequence of interaction strengths. Accordingly, expressions like "$\min n_{k \neq \ell} \alpha_+ - \alpha_k - \alpha_\ell$" may be treated as if the sequence were padded by arbitrarily many zero entries.

Proof of Theorem 4.1. For the base case, note that the empty list of interaction strengths yields the polytope $a1 = a2 = a3 = 0,$ which agrees with the set of circuits locally equivalent to the identity interaction.

Suppose then that one has established the claim for a sequence of interaction strengths $(\alpha 1, \ldots, \alpha_n)$, and one would like to establish the claim for $(\alpha 1, \ldots, \alpha_n, \beta)$ for some new interaction strength $\beta$. By allowing the (n+1) different strengths to range, the region in the claim is naturally expressed as a polytope in (n+1)+3 dimensions. In fact, it can be reduced to a certain 6-dimensional polytope as follows: writing $\alpha'$ and $\alpha''$ respectively for the largest and second-largest elements in the hypothesized sequence of interaction strengths, the inequality families above may be rewritten as $$\begin{cases} \alpha_+ \geq a_1 + a_2 + a_3, \\ \alpha_+ - 2\alpha' \geq -a_1 + a_2 + a_3, \\ \alpha_+ - \alpha' - \alpha'' \geq a_3; \end{cases}$$

$$\begin{cases} -\frac{\pi}{2} + \alpha_+ \geq -a_1 + a_2 + a_3, \\ \frac{\pi}{2} + \alpha_+ - 2\alpha' \geq a_1 + a_2 + a_3, \\ \alpha_+ - \alpha' - \alpha'' \geq a_3. \end{cases}$$

with the additional constraints $$n \cdot \frac{\pi}{4} \geq \alpha_+,$$

$$\alpha_+ \geq \alpha' + \alpha'',$$

$$\frac{\pi}{4} \geq \alpha' \geq \alpha'' \geq 0.$$

Altogether, these statements over $a_1$, $a_2$, $a_3$, $\alpha_+$, $\alpha'$, $\alpha''$ describe a pair of convex polytopes in 6-dimensional space.

Theorem 2.5 gives an explicit, finite family of linear inequalities (the "monodromy polytope") so that $a_1$, $a_2$, $a_3$, $a_1'$, $a_2'$, $a_3'$, $b_1$, $b_2$, $b_3$ satisfies the constraints if and only if there is a local gate $L$ and a local equivalence $$CAN(a_1, a_2, a_3) \cdot L \cdot CAN(a'_1, a'_2, a'_3) \equiv CAN(b_1, b_2, b_3).$$

This is combined with the polytope from the inductive hypothesis so that its coordinates are shared with $(a_1, a_2, a_3)$ and the coordinates $(a'_1, a'_2, a'_3)$ are set to $(\beta, 0, 0)$. This produces a union of convex polytopes in 10-dimensional space, a point of which simultaneously captures:

($\alpha_+$, $\alpha'$, $\alpha''$): Values extracted from the prefix of interaction strengths.

($a_1$, $a_2$, $a_3$): A positive canonical coordinate which admits expression as an XX-circuit as in the inductive hypothesis.

$\beta$: A new interaction strength.

($b_1$, $b_2$, $b_3$): A canonical coordinate which admits expression as a concatenation of the aforementioned circuit, a local gate, and $XX_\beta$.

The goal of some embodiments is to describe a certain projection of this polytope. Projection has the effect of introducing an existential quantifier into the above description: a point belongs to the projection of a polytope exactly when it is possible to extend the projected point by the discarded coordinates so that it satisfies the original constraints. This trades the actual data housed in the lost coordinates—which may be complicated to the point of distraction—for the mere predicate that such data exists. In the case of some embodiments, it is sought to project away the coordinates ($a_1$, $a_2$, $a_3$), which leaves only constraints on ($b_1$, $b_2$, $b_3$), given in terms of ($\alpha_+$, $\alpha'$, $\alpha''$, $\beta$), ensuring that a prefix circuit of the indicated type exists, without actually naming it.

To compute this projection, in some embodiments Fourier-Motzkin elimination is applied to project away the remaining coordinates and eliminate redundancies in the resulting inequality set (using, e.g., the software package lrs). These reduced inequality sets have the following form:

$$\begin{cases} \alpha_+ + \beta \geq b_1 + b_2 + b_3, & \text{(strength)} \\ \min\begin{Bmatrix} \alpha_+ + \beta - 2\alpha' \\ \alpha_+ + \beta - 2\beta \end{Bmatrix} \geq -b_1 + b_2 + b_3, & \text{(slant)} \\ \min\begin{Bmatrix} \alpha_+ + \beta - \alpha' - \alpha'' \\ \alpha_+ + \beta - \alpha' - \beta \\ \alpha_+ + \beta - \beta - \alpha'' \end{Bmatrix} \geq b_3, & \text{(frustrum)} \end{cases}$$

$$\begin{cases} -\frac{\pi}{2} + \alpha_+ + \beta \geq -b_1 + b_2 + b_3; & \text{(strength)} \\ \min\begin{Bmatrix} \frac{\pi}{2} + \alpha_+ + \beta - 2\alpha' \\ \frac{\pi}{2} + \alpha_+ + \beta - 2\beta \end{Bmatrix} \geq b_1 + b_2 + b_3, & \text{(slant)} \\ \min\begin{Bmatrix} \alpha_+ + \beta - \alpha' - \alpha'' \\ \alpha_+ + \beta - \alpha' - \beta \\ \alpha_+ + \beta - \beta - \alpha'' \end{Bmatrix} \geq b_3, & \text{(frustrum)} \end{cases}$$

where the inequalities have been collected which give communal upper bounds into single expressions using "min". Notationally absorbing $\beta$ into the sequence of interaction strengths completes the proof.

Example 4.2. A visualization of an example XX-circuit polytope is shown in FIGS. 2A and 2B.

Remark 4.3. The two convex bodies in the statement of Theorem 4.1 are related by the linear transformation $$(a_1, a_2, a_3) \mapsto \left(\frac{\pi}{2} - a_1, a_2, a_3\right).$$

Remark 4.4. Theorem 4.1 is manifestly invariant under permutation of the interaction strengths.

Remark 4.5. By dropping the assumption that the entries of positive canonical triples are ordered descending (as in Remark 2.8), the above inequality families can be rewritten in a manner that is more pleasingly symmetric. For example, the first family is rewritten as:

$$\alpha_+ \geq a_+, \qquad \text{(strength)}$$
$$\min_k \alpha_+ - 2\alpha_k \geq \min_k a_+ - 2a_k, \qquad \text{(slant)}$$
$$\min_{k \neq \ell} \alpha_+ - \alpha_k - \alpha_\ell \geq \min_{k \neq \ell} a_+ - a_k - a_\ell. \quad \text{(frustrum)}$$

The second is similar, but less pleasing to the eye. These pleasing formulas have been won by losing convexity: the "min"s appearing in the lower bounds encode disjunctions of linear sentences rather than conjunctions, so one sees merely a non-convex union of these convex polytopes.

Remark 4.6. In the case of a uniform interaction strength $\alpha$, the quantities appearing in the upper bounds are computed to be $$\alpha_+ = n\alpha,$$
$$\min_k \alpha_+ - 2\alpha_k = (n-2)\alpha,$$
$$\min_{k \neq \ell} \alpha_+ - \alpha_k - \alpha_\ell = (n-2)\alpha.$$

This causes the slant and frustrum inequalities to degenerate, which recovers a theorem of Zhang et al. as a special case.

Section 5: The Local Theorem

In this section, the problem of appending a single new XX interaction strength $\beta$ to a specific circuit formed from a sequence of strengths ($\alpha_1, \ldots, \alpha_n$) is studied. Note that Theorem 4.1 gives an understanding of the "global" effect of appending $XX_\beta$, where the interaction strengths are fixed but the circuit is allowed to range. Note also that if such a local understanding can be achieved, then it would be desirable to use it in reverse: given a point $p_{n+1}$ which guarantees to be model-able using a circuit with strengths ($\alpha_1, \ldots, \alpha_n, \beta$), one would like to guarantee the existence of, and algorithmically identify, a point $p_n$ which is model-able by ($\alpha_1, \ldots, \alpha_n$) and for which $p_{n+1}$ is reachable by appending $XX_\beta$.

Excepting the caveat about constructive, algorithmic identification, this can be accomplished directly in some embodiments using the methods of the monodromy polytope. However, because the objective is circuit construction, one must restrict what sorts of circuits one is willing to append to those of the particularly simple form given in Lemma 5.1. In trade, the method of the monodromy polytope no longer directly applies.

It is shown in Theorem 5.3 the "forward" direction of the strategy described above, then in Theorem 5.5 the "reverse" direction, culminating in the recursive step in a synthesis procedure whose full description deferred to Section 6. First, however, the simplified circuit is introduced for consideration.

Lemma 5.1. For any choice of $a_1$, $a_2$, $\beta$, d, and e in $$U := \text{CAN}(a_1, a_2, 0) \cdot (Z_d \otimes Z_e) \cdot (XX_\beta),$$

there exist values r, s, t, u, $b_1$, and $b_2$ so that the operator U may be equivalently expressed as $$(Z_r \otimes Z_s) \cdot \text{CAN}(b_1, b_2, 0) \cdot (Z_t \otimes Z_u).$$

Proof. The vector subspace $\mathfrak{g} = \text{span}\{XX, YY, XY, YX, ZI, IZ\}$ forms a Lie subalgebra of $\mathfrak{pu}_4$. The subspaces $$\mathfrak{a} = \text{span}\{XX, YY\}, \mathfrak{k} = \text{span}\{IZ, ZI\}$$

give rise to a KAK decomposition yielding the desired result.

Next, it is noted that this choice of simple local gates gives rise to the desired explicit expressions for the gate parameters.

Lemma 5.2. Except for the outer parameters r, s, t, and u, the parameters in Lemma 5.1 are related by the equations $$\frac{c_{a_1-a_2}^2 c_\beta^2 + s_{a_1-a_2}^2 s_\beta^2 - c_{b_1-b_2}^2}{2c_{a_1-a_2} c_\beta s_{a_1-a_2} s_\beta} = c_{2(d+e)},$$

$$\frac{c_{a_1+a_2}^2 c_\beta^2 + s_{a_1+a_2}^2 s_\beta^2 - c_{b_1+b_2}^2}{2c_{a_1+a_2} c_\beta s_{a_1+a_2} s_\beta} = c_{2(d-e)}.$$

The outer parameters r, s, t, and u can then be deduced from a linear system with input the phases of the top half of the left-hand matrix.

Proof. The trigonometric equalities follow by equating the square-norms of the matrix entries in Lemma 5.1. The (1,1) and (3,3) entries respectively yield $$|c_{b_1-b_2}|^2 = |C_\beta c_{a_1-a_2} - e^{2i(d+e)} s_\beta s_{a_1-a_2}|^2,$$

$$|c_{b_1+b_2}|^2 = |C_\beta c_{a_1+a_2} - e^{-2i(d-e)} s_\beta s_{a_1+a_2}|^2,$$

where the absolute values have been used to suppress some of the phases. Then, the identity $$|x+re^{i\theta}|^2 = x^2 + r^2 + 2xr \cos \theta$$

is applied, and d and e isolated, to deduce the statement.

The linear system then arises by inspecting the phases of any nondegenerate quadruple of entries. For example, the nonzero entries in the top half, read left-to-right, have respective phases $\exp(-i(r+s+t+u))$, $\exp(-i(r-s+t+u))$, $-i \exp(-i(-r+s-t+u))$, $-i \exp(-i(r+s-t-u))$.

This collection of linear combinations is of full rank.

The constraints imposed by these expressions on the positive canonical triples can be interpreted in terms of $\beta$.

Theorem 5.3 ("Interference inequalities"). For positive canonical triples $(a_1, a_2, 0)$ and $(b_1, b_2, 0)$ and for $\beta$ an interaction strength, there exist parameters d and e satisfying $$\text{CAN}(a_1,a_2,0)\cdot(Z_d \otimes Z_e)\cdot XX_\beta = \text{CAN}(b_1,b_2,0)$$

if and only if the following inequalities hold:

$$a_1 + a_2 - \beta \le b_1 + b_2 \le \frac{\pi}{2} - \left|\frac{\pi}{2} - (a_1 + a_2 + \beta)\right|,$$

$$|a_1 - a_2 - \beta| \le b_1 - b_2 \le a_1 - a_2 + \beta.$$

Moreover, the local gates witnessing the equivalence can be taken to be Z-rotations.

Note, that it is extremely unusual that image under Π of a circuit with constrained local gates is again a polytope.

Proof. Starting from Lemma 5.2, there exist solutions to d and e exactly when the following inequalities are met:

$$|c_{a_1-a_2}^2 c_\beta^2 + s_{a_1-a_2}^2 s_\beta^2 - c_{b_1-b_2}^2| \le |2c_{a_1-a_2} c_\beta s_{a_1-a_2} s_\beta|,$$

$$|c_{a_1+a_2}^2 c_\beta^2 + s_{a_1+a_2}^2 s_\beta^2 - c_{b_1+b_2}^2| \le |2c_{a_1+a_2} c_\beta s_{a_1+a_2} s_\beta|.$$

Using the inequalities $a_1+a_2 \le \pi/2$, $a_1 \ge a_2$, and $$0 \le \beta \le \frac{\pi}{4},$$

it is seen that both the right-hand quantities are always positive, hence the right-hand absolute value can be suppressed. The left-hand absolute value can be equivalently expressed as a pair of inequalities, giving $$-2c_{a_1-a_2} c_\beta s_{a_1-a_2} s_\beta \le c_{a_1-a_2}^2 c_\beta^2 + s_{a_1-a_2}^2 s_\beta^2 - c_{b_1-b_2}^2,$$

$$|c_{a_1-a_2}^2 c_\beta^2 + s_{a_1-a_2}^2 s_\beta^2 - c_{b_1-b_2}^2| \le 2c_{a_1-a_2} c_\beta s_{a_1-a_2} s_\beta,$$

$$-2c_{a_1+a_2} c_\beta s_{a_1+a_2} s_\beta \le c_{a_1+a_2}^2 c_\beta^2 + s_{a_1+a_2}^2 s_\beta^2 - c_{b_1+b_2}^2,$$

$$|c_{a_1+a_2}^2 c_\beta^2 + s_{a_1+a_2}^2 s_\beta^2 - c_{b_1+b_2}^2| \le 2c_{a_1+a_2} c_\beta s_{a_1+a_2} s_\beta.$$

Factoring the quadratics then yields $$(c_{a_1-a_2} c_\beta - s_{a_1-a_2} s_\beta)^2 \le c_{b_1-b_2}^2,$$

$$c_{b_1-b_2}^2 \le (c_{a_1-a_2} c_\beta + s_{a_1-a_2} s_\beta)^2,$$

$$(c_{a_1+a_2} c_\beta - s_{a_1+a_2} s_\beta)^2 \le c_{b_1+b_2}^2,$$

$$c_{b_1+b_2}^2 \le (c_{a_1+a_2} c_\beta + s_{a_1+a_2} s_\beta)^2,$$

Rewriting the binomials as cosines of differences/sums and then converting square cosines to double-angle cosines yields $$c_{2(a_1-a_2+\beta)} \le c_{2(b_1-b_2)} \le c_{2(a_1-a_2-\beta)},$$

$$c_{2(a_1+a_2+\beta)} \le c_{2(b_1+b_2)} \le c_{2(a_1+a_2-\beta)}.$$

Finally, the piecewise monotonicity and reflection invariance of cosine are used, as well as the bounds on the inputs, to deduce inequalities on the angles:

$$2(a_1-a_2+\beta) \ge 2(b_1-b_2)$$

$$2(b_1-b_2) \ge \max\{2(a_1-a_2-\beta), -2(a_1-a_2-\beta)\},$$

$$\min\{2(a_1+a_2+\beta), 2\pi-2(a_1+a_2+\beta)\} \ge 2(b_1+b_2)$$

$$2(b_1+b_2) \ge 2(a_1+b_2-\beta).$$

Linear rearrangement yields the claimed inequality family.

Figure 6A:
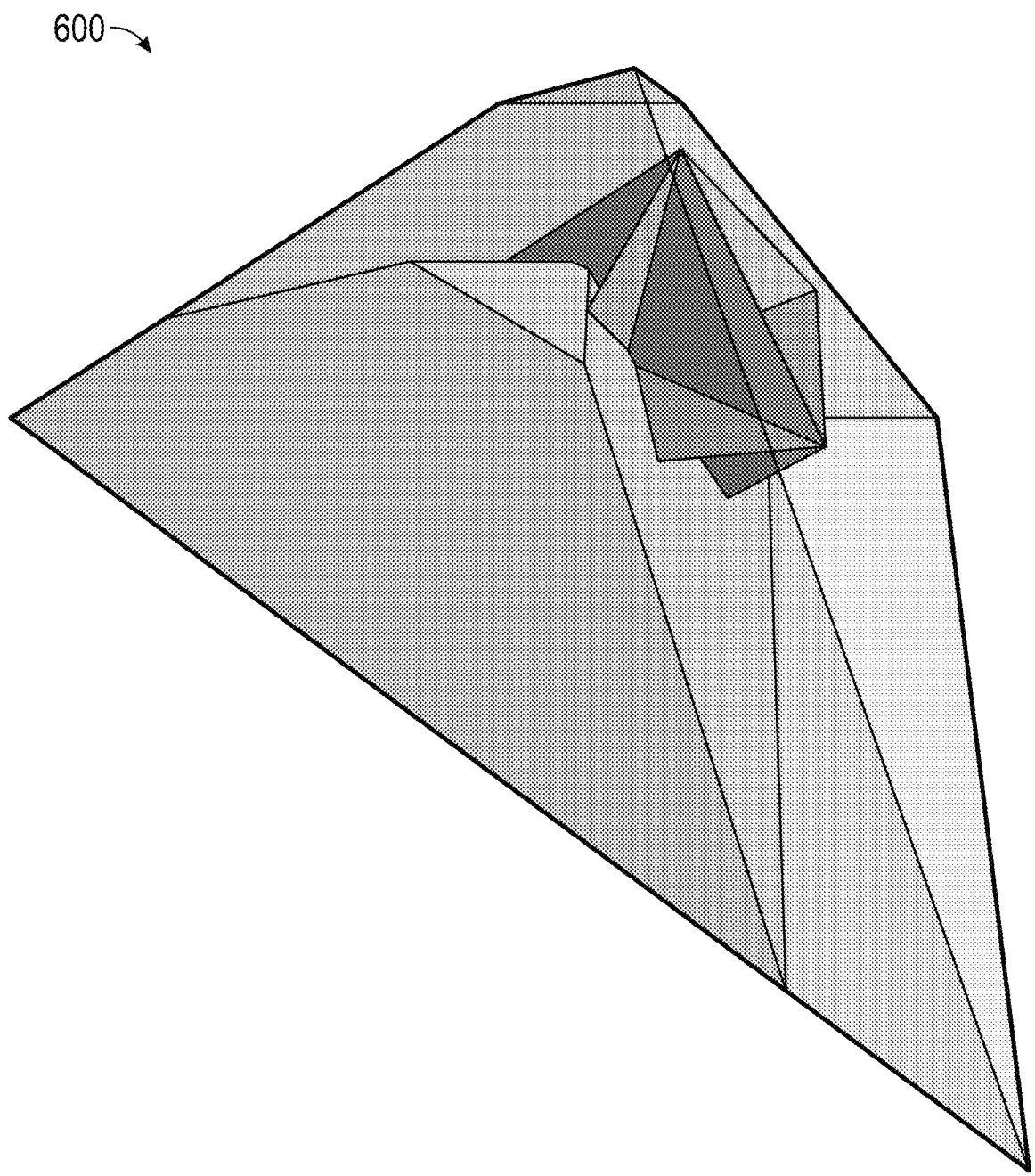
FIG. 6A shows a perspective on the configuration of polytopes in some embodiments.
Figure 6B:
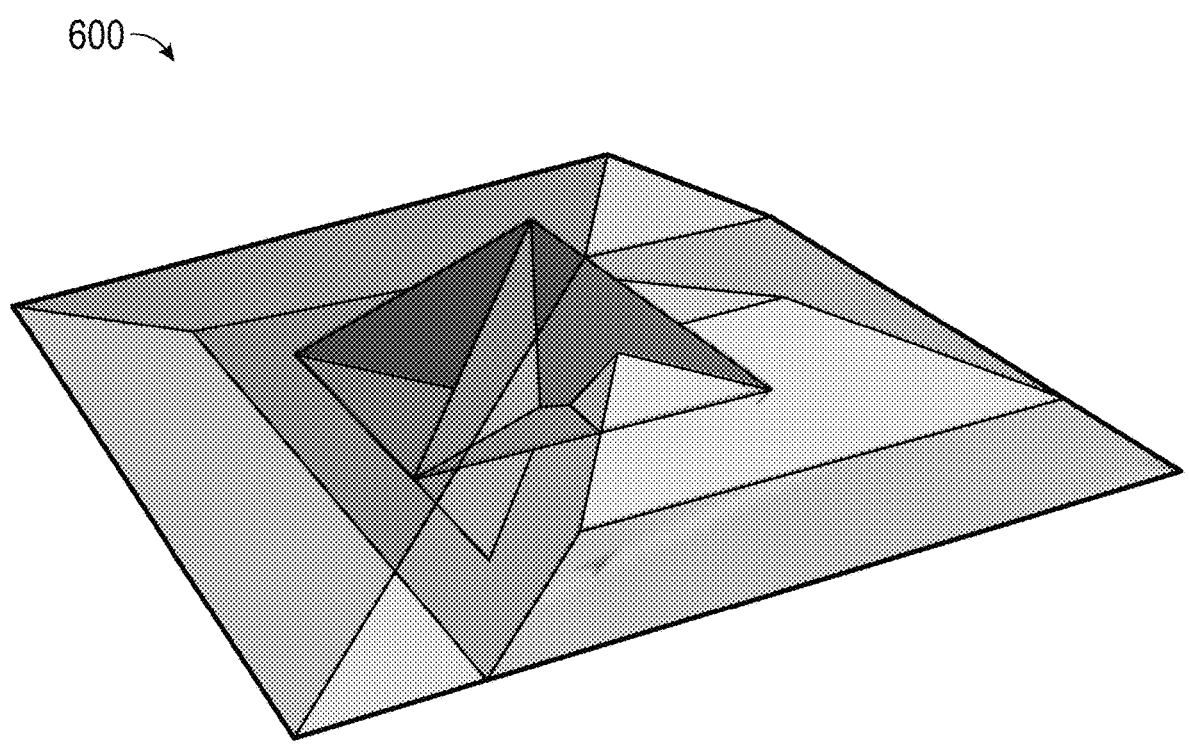
FIG. 6B shows another perspective on the configuration of polytopes shown in FIG. 6A.

In FIGS. 6A and 6B, a visualization is shown of the regions accessible via Theorem 5.3.

FIGS. 6A and 6B show two perspectives on the configuration of polytopes in Theorem 5.3. The solid, inner polytope is the XX-circuit polytope for a sequence of interaction strengths $(\alpha_1, \ldots, \alpha_n)$, and the translucent outer polytope is the XX-circuit polytope for the sequence $(\alpha_1, \ldots, \alpha_n, \beta)$. A particular point on the edge of the inner figure has been chosen and the regions accessible from it drawn by applying Theorem 5.3 for the interaction strength to any pair of coordinates (red: XX and YY; green: YY and ZZ; blue: XX and ZZ). These appear as a triple of flat polygons. Theorem 5.5 states that when the point on the inner body is permitted to range, the union of the corresponding translates of the red, green, and blue polygons sweeps out the entirety of the outer body.

Figure 7:
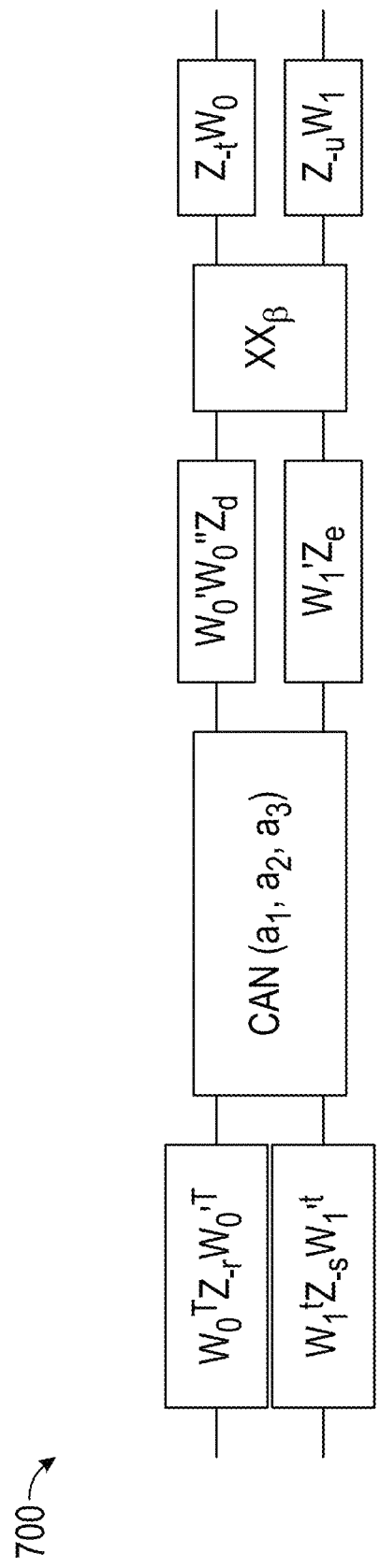
FIG. 7 shows a circuit emitted by a typical single step of the synthesis procedure of some embodiments.

Theorem 5.5 (cf. FIG. 7). Given a positive canonical triple $(b_1, b_2, b_3)$ satisfying the conditions of Theorem 4.1 for a sequence of interaction strengths $(\alpha_1, \ldots, \alpha_n, \beta)$, there exists a positive canonical triple $(a_1, a_2, a_3)$ satisfying the conditions of for the sequence $(\alpha_1, \ldots, \alpha_n)$ and for which there are Weyl reflections w, w' so that the following is solvable:

$$\text{CAN}(a_1,a_2,a_3)^w \cdot (Z_d \otimes Z_e) \cdot \text{CAN}(\beta) \equiv \text{CAN}(b_1,b_2,b_3)_{w'}.$$

The outer gates witnessing the local equivalence can be taken to be Z-rotations.

Proof. Any canonical gate $\text{CAN}(b_1, b_2, b_3)$ can be written as $$\text{CAN}(b_1,b_2,b_3) = \text{CAN}(0,0,b_3) \cdot \text{CAN}(b_1,b_2,0).$$

Applying Theorem 5.3 to the right factor gives $$\text{CAN}(b_1,b_2,b_3) = \text{CAN}(0,0,b_3) \cdot (Z_{-r} \otimes Z_{-s}) \cdot \text{CAN}(a_1,a_2,0) \cdot (Z_d \otimes Z_e) \cdot \text{CAN}(\beta) \cdot (Z_{-t} \otimes Z_{-u}),$$

under certain conditions on $a_1$, $a_2$, $b_1$, $b_2$, and $\beta$. Since local Z-rotations commute with canonical gates of the form CAN $(0,0, b_3)$, this can be abbreviated to $$\text{CAN}(b_1,b_2,b_3) = (Z_{-r} \otimes Z_{-s}) \text{CAN}(a_1,a_2,b_3) \cdot (Z_d \otimes Z_e) \cdot \text{CAN}(\beta)(Z_{-t} \otimes Z_{-u}).$$

Additionally, the choice to factor out $b_3$ is immaterial: there are Weyl reflections which permute the coordinates within a canonical triple, so by conjugating CAN $(b_1, b_2, b_3)$ any of the three values can be placed in the final slot. In other words, Theorem 5.3 may be appealed to, provided one coordinate is fixed and the positive canonical triples are potentially disordered.

FIG. 7 shows the circuit emitted by a typical single step of Procedure 6.1 (e.g., by Theorem 5.5), modeling $\text{CAN}(b_1, b_2, b_3)$ in terms of $\text{CAN}(a_1, a_2, a_3)$, $XX_\beta$, and local gates. The gates W, W', W" are quarter-turns which realize the action of Weyl group elements on a, $b \in \mathfrak{A}_{c_2}$.

From here, the proof strategy is similar to that of Theorem 4.1. Theorem 4.1 itself provides linear constraints on the spaces of triples $(b_1, b_2, b_3)$ so that a triple satisfies the constraints if and only it can be realized as the positive canonical coordinate of an XX-circuit with interaction strengths $(\alpha_1, \ldots, \alpha_n, \beta)$. Rather than working with ordered triples $(a_1, a_2, a_3)$, unordered triples $(a_h, a_\ell, a_f)$ are instead considered, to be referred to as the "high", "low", and "fixed" coordinates as in Remark 4.5. Then, the a- and b-coordinates are interrelated:

One coordinate $b_f$ is selected from $(b_1, b_2, b_3)$ to serve as the "fixed" coordinate (and take the union over such choices), and set of $a_f = b_f$.

On $a_h$ and $a_\ell$, the constraint $a_h \geq a_\ell$ is imposed. Similarly, of the remaining coordinates in $(b_1, b_2, b_3)$, $b_h$ is picked to be the larger and $b_\ell$ to be the smaller.

The constraints from Theorem 5.3 are imposed on $(a_h, a_\ell, 0)$, $(b_h, b_\ell, 0)$, and $\beta$.

The resulting (nonconvex) polytope is referred to as P. Points in P capture the following interrelated pieces of data:

A canonical coordinate $(b_1, b_2, b_3)$ which admits expression as an XX-circuit with interaction strengths $(\alpha_1, \ldots, \alpha_n, \beta)$.

A canonical coordinate $(a_1, a_2, a_3)$ which admits expression as an XX-circuit with interaction strengths $(\alpha_1, \ldots, \alpha_n)$.

A choice of value to share among the a— and b—coordinates.

The condition that, among the unshared coordinates, there exists a circuit of the form in Lemma 5.1 relating them. (As in the first two bullets, the polytope does not record the literal data of such a circuit, only the predicate that one exists.)

By projecting away $(a_h, a_\ell, a_f)$ from P, the polytope of positive canonical triples $(b_1, b_2, b_3)$ is produced, which can be expressed as XX-circuits with the specified interaction strengths, together with the predicate constraint that the last step in the circuit decomposition can be written in the form of the Theorem statement. This is a subpolytope of that of Theorem 4.1, which merely tracks positive canonical triples which can be expressed as XX-circuits with the specified interaction strengths, without the constraint on the final local operator. Appealing again to a computer algebra system (e.g., lrs), these two polytopes are found to be equal.

Remark 5.6. Naively specified, the polytope P in the proof of Theorem 5.5 has many convex components: the two convex regions of a— and b—coordinates each contribute factors of 2, the choice of which coordinate to fix contributes a factor of 3, and the choice of which slant and frustrum bounds apply to the disordered a—coordinates contribute factors of 2 and 3. However, the projection of P onto the b—coordinates, which were used to conclude the theorem, can be shown to have only four regions:

The choice of convex region of b—coordinates is free, but one then uses the same choice for a—coordinates.

The fixed coordinate $a_f$ is taken to be either $b_1$ or $b_3$.

For the unreflected (resp., reflected) convex region of b—coordinates, the slant (resp., strength) inequality is imposed either on $a_f$ or $a_h$ depending on whether $a_f = b_1$ or of $a_f = b_3$.

The frustrum bound is always imposed on $a_\ell$.

Figure 18:
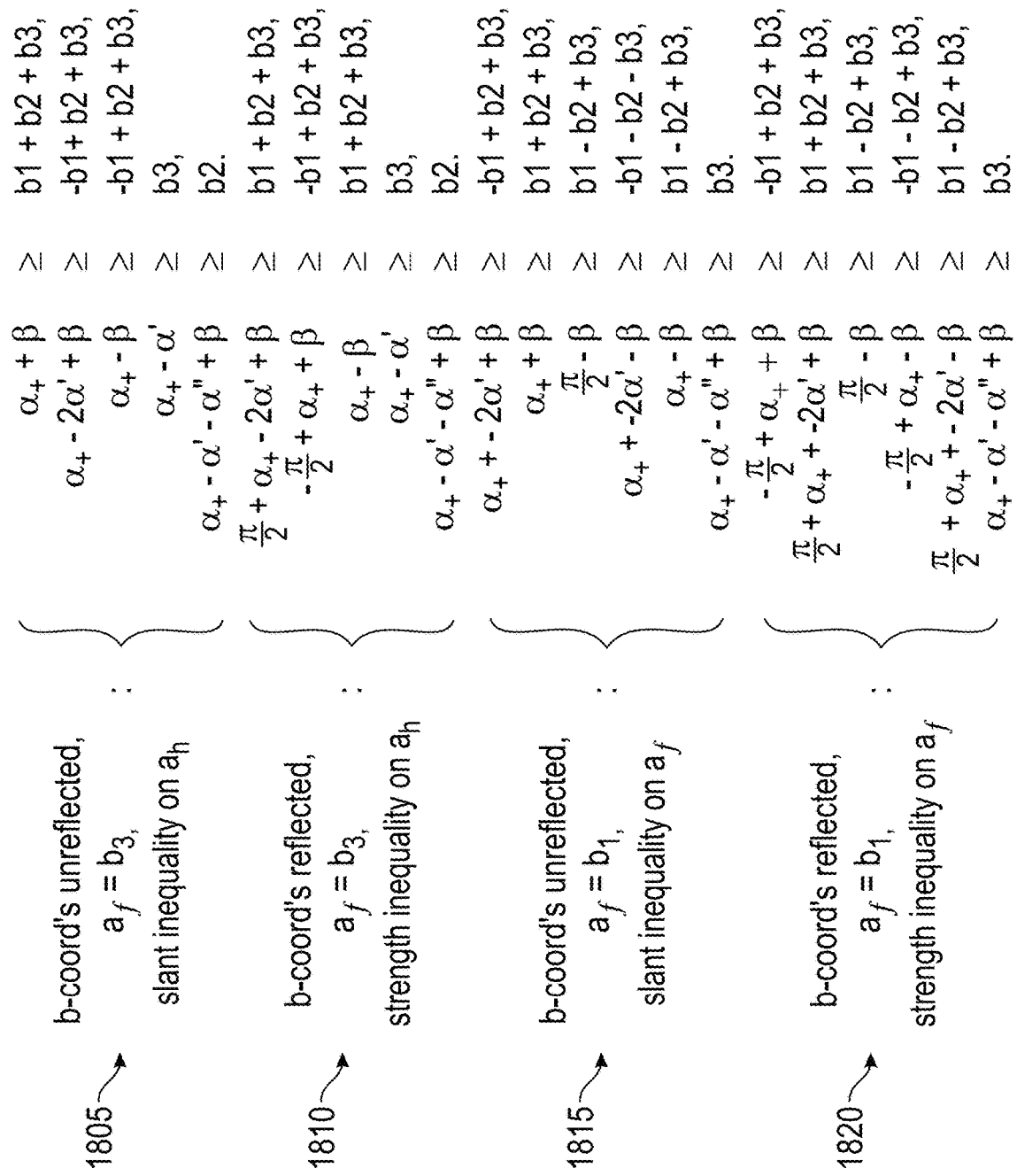
FIG. 18 shows four tables of inequalities describing the four regions of b-coordinates from Remark 5.6.

The inequalities describing these regions are given in FIG. 18.

FIG. 18 shows four tables of inequalities describing the four regions of b—coordinates from Remark 5.6.

FIGS. 19A and 19B show four tables of inequalities describing the relationship between the a—coordinates and the b—coordinates in the four regions of Remark 5.6.

Remark 5.7. It is possible in some embodiments to rearrange the proofs of Theorem 4.1 and Theorem 5.5 so as to avoid computer algebra systems. First, break Theorem 4.1 into a forward implication, that the positive canonical triple associated to an XX-circuit satisfies the indicated inequality set, and the reverse implication. The forward implication can be checked by hand, using a judiciously chosen subset of inequalities from the monodromy polytope; the reverse implication is much harder from this point of view, so it is set aside for a moment.

Now consider Theorem 5.5. Its proof also relies on a computer algebra system, but the amount of work may be severely limited by inspecting only the convex summands described in Remark 5.6, which is then small enough to accomplish manually. With only the forward implication of Theorem 4.1 established, the proof of Theorem 5.5 instead shows that if the b— coordinate belongs to the polytope named by Theorem 4.1 for $(\alpha 1, \ldots, \alpha_n, \beta)$, then there exists an a—coordinate in the polytope named by Theorem 4.1 for $(\alpha 1, \ldots, \alpha_n)$ which is related to the b— coordinate by a particular single-step XX-circuit. Following the induction described in Procedure 6.1 then yields the missing reverse implication of Theorem 4.1, which in turn yields the full strength of Theorem 5.5.

Section 6: Synthesis

The above pieces can now be put together to form a synthesis routine of some embodiments. The actual synthesis process is given in Procedure 6.1, but it is trickier to pin down exactly what is meant by "optimal". For instance, the notion of optimality considered by Zhang et al. is to minimize two-qubit operation count, but in a larger gateset, where different gates may have uneven performance impact, optimizing count alone may not optimize performance. Relatedly, if performance is the true goal and the performance penalty incurred for using gates is high, it may be preferable in some embodiments to synthesize a circuit modeling some canonical triple a'≠a which requires fewer gates, trading the performance hit due to the mismatch for performance gain of dropping some of the gates.

Procedure 6.1 (cf. FIG. 7). The existence claim of Theorem 5.5 can be promoted into an algorithmically effective synthesis routine. Given a sequence of interaction strengths ($\alpha 1, \ldots, \alpha_n, \beta$) and a positive canonical triple ($b_1, b_2, b_3$) which belongs to the associated circuit polytope, the polytope P from the proof of Theorem 5.5 can then be specialized so that only $a_h$ and $a_\ell$ are free variables. (These inequality sets are reported in FIGS. 19A and 19B) The content of Theorem 5.5 is that this specialization is always nonempty, so a point ($a_h, a_\ell, a_f$) may be found in it (e.g., by calculating line-line intersections until a vertex is produced). This pair of points can then be fed to Lemma 5.2, which produces the angle values for the Z-rotations. This proceeds recursively until the sequence of interaction strengths is exhausted.

Figure 8A:
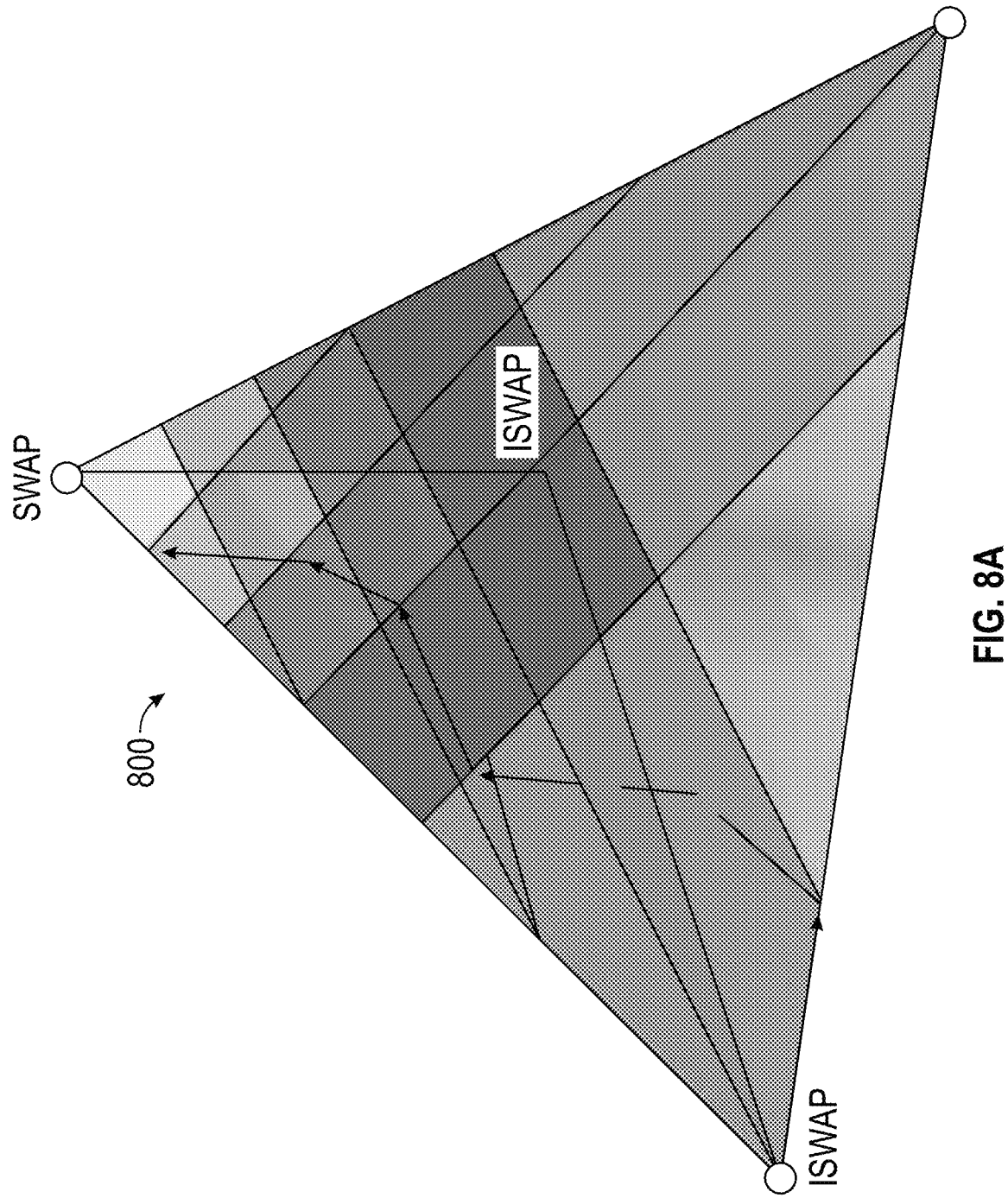
FIG. 8A shows a visualization of the intermediate steps produced in some embodiments when using to synthesize an XX-circuit for a certain canonical point against a particular sequence of interaction strengths.
Figure 8B:
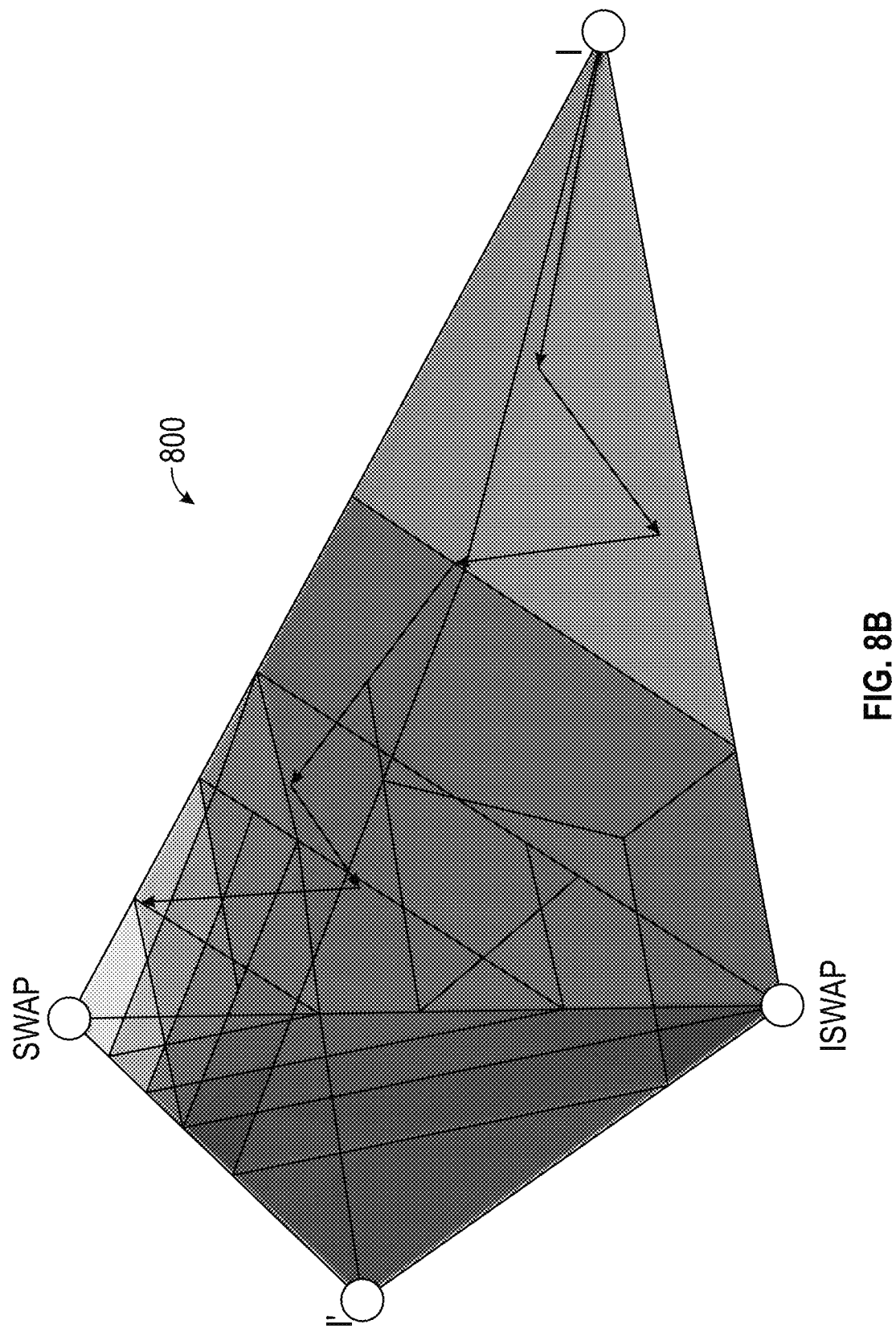
FIG. 8B shows another perspective of the visualization shown in FIG. 8B.

Example 6.2. FIGS. 8A and 8B show a visualization of the intermediate steps produced in some embodiments when using Procedure 6.1 to synthesize an XX-circuit for a certain canonical point against a particular sequence of interaction strengths.

FIG. 8A shows a path of intermediate points in $\mathfrak{A}_{c_2}$ produced by Procedure 6.1 synthesizing CAN(0.707, 0.687, 0.687) into an XX-circuit with strength sequence $$\left(\frac{\pi}{8}, \frac{\pi}{8}, \frac{\pi}{12}, \frac{\pi}{12}, \frac{\pi}{12}, \frac{\pi}{12}\right).$$

The various colored regions are the circuit polyhedra for truncations of this sequence of interaction strengths.

To progress, a quantitative definition of optimality is needed in some embodiments.

Definition 6.3. Given a target unitary U, a gate set $\mathcal{S}$, and a cost function $\mathcal{C}_S$ which consumes U and an $\mathcal{S}$-circuit C, the approximate synthesis task is to produce an $\mathcal{S}$-circuit C maximizing $\mathcal{C}_S$ (U,C). Cost functions can enjoy a variety of pleasant properties:

Separable: For a circuit template C($\theta$), $\mathcal{C}_S$(U, C) can be written as a sum $\mathcal{C}'$ (U, C($\theta$))+$\mathcal{C}''_S$ (C, $\theta$) where $\mathcal{C}'$ depends only on the unitary which the circuit models and $\mathcal{C}''$ depends only on the circuit and parameters, but not its relationship to U.

Locally invariant: $\mathcal{C}''_S$ (C, $\theta$)=$\mathcal{C}''_S$ (C) is invariant under choice of parameters $\theta$ for local gates in the circuit C.

Monotonic: Suppose that C is a separable cost function. If C is contained as a subcircuit in D, then $\mathcal{C}''_S$ (C, $\theta$)≤$\mathcal{C}''_S$ (D, ($\theta$, $\phi$)).

Non-approximating: The separable cost function $\mathcal{C}$ has $\mathcal{C}'$ given by $$\mathcal{C}'(U, V) = \begin{cases} 0 & \text{when } U = V, \\ \infty & \text{otherwise.} \end{cases}$$

Examples of cost functions in some embodiments, that meet some or all of these criteria, include an average infidelity of the quantum circuit relative to the target unitary U, an operation count of native qubit gates the quantum circuit, a diamond norm of the quantum circuit relative to the target unitary U, and a Hilbert-Schmidt distance of the quantum circuit relative to the target unitary U. These features are chosen in some embodiments, both because they feed into an efficient algorithm for optimal synthesis, and because they are satisfied in the following embodiment using average infidelity as the cost function:

Example 6.4. The average infidelity of two gates U and V is $$I(U, V) = 1 - \int_{\psi \in \mathbb{P}(\mathbb{C}^4)} \langle \psi | U^\dagger V | \psi \rangle^2$$

$$= \frac{16 - |trU^\dagger V|^2}{4 \cdot 5} \in [0, 4/5].$$

For $\mathcal{S}$ a finite collection of XX-interactions with costs c: $\mathcal{S} \to \mathbb{R}$ a separable, locally invariant, monotonic cost function is defined by $$C_S(U, C) = I(U, C) + \sum_{s \in C} c(s).$$

Average gate infidelity satisfies a few pleasant generic properties, but it is also tightly connected to the theory of KAK decompositions. These properties are recorded below.

Remark 6.5. Average infidelity detects gate equivalence, in the sense that I(U, V)=0 if and only if U=V. It is also symmetric: I(U, V)=I(V, U). However, it fails to satisfy the triangle inequality, even when U and V belong to the canonical family, hence does not give a metric. It satisfies compositionality only to first order:

$$16 - 20 \cdot I(UU', (U + \varepsilon E)(V + \zeta F))$$

$$= |trV^\dagger U^\dagger (U + \varepsilon E)(V + \zeta F)|^2$$

$$= |1 + \varepsilon trU^\dagger E + \zeta trV^\dagger F + \varepsilon \zeta trV^\dagger U^\dagger EF|^2.$$

Lemma 6.6. Let U=CAN($a_1, a_2, a_3$) and V=CAN($b_1, b_2, b_3$) be two canonical gates with parameter differences $\delta_j = (a_j - b_j)$. Their average gate infidelity is given by $$20 \cdot I(U, V) = 16 - 16\left(\prod_j \cos^2 \frac{\delta_j}{2} + \prod_j \sin^2 \frac{\delta_j}{2}\right).$$

Lemma 6.7. Suppose that $C_1, C_2$ are fixed canonical gates and that $L_1, L_1'$ are fixed local gates. Letting $L_2$ and $L_2'$ range over all local gates, the value $I(L_1 C_1 L_1', L_2 C_2 L_2')$ is minimized when taking $L_2 = L_1$ and $L_2' = L_1'$.

An optimal synthesis procedure of some embodiments for a "nice" cost function is now described:

Procedure 6.8. Let $\mathcal{C}$ be a separable, locally invariant, and monotonic cost function. Let $\mathcal{S}$ be a finite gate set of XX-type interactions, and consider the set of circuit templates given by interleaving unconstrained local gates into the words formed from $\mathcal{S}$. Traverse these available circuit templates (e.g., the words in $\mathcal{S}$) by ascending order of $\mathcal{C}''_S$. Using a priority queue, one can perform this traversal without enumerating all possible words beforehand. For each such circuit template C, use Theorem 4.1 to calculate the circuit polytope $\Pi$(C). Calculate the point p∈$\Pi$(C)

which optimizes $C'$ (U, CAN(p)). If the total cost $C_S$ is the best seen so far, retain C and p. Continue to traverse circuit templates until $\Pi(U) \in \Pi(C)$, at which point $C'$ vanishes and the ordering of circuit templates guarantees that all future circuit templates will yield a worse cost. This termination condition will eventually be met provided $S$ contains any interaction $XX_\beta$ with $$\beta \in \left(0, \frac{\pi}{2}\right).$$

Finally, apply Procedure 6.1 to synthesize a C-circuit for CAN(p), then apply Lemma 6.7 to produce U itself.

In some embodiments, the cost function depends on the quantum system. Not only might the cost function change when used on a different device, but it might change when used on the same device at a different time, after recalibration, or when used on different literal qubits on the same device. The fidelities of the XX-type operations may be incorporated into the cost function, and those values might change across time, qubit choice, and device choice. In addition, the availability of XX-type operations may be incorporated into the search across circuit types, and operations may appear and/or disappear on unstable systems, may be available on some qubit pairs but not others, and may be available on some devices but not others.

Remark 6.9. In FIG. 9, the execution characteristics of Procedure 6.8 are compared to those of blind numerical search in some embodiments. Given a Haar-randomly chosen two-qubit unitary operator U, the numerical search procedure is to let numpy's generic optimizer explore the space of circuits of a particular depth, with the objective of minimizing the infidelity with U. If the optimizer cannot find a circuit with infidelity below some threshold, it tries again with a circuit of the next larger depth. Altogether, this is similar to what is implemented in NuOp, among other compilation suites. The histograms reported in are the result of sampling over many such U, targeting either the gate set $$S = \left\{XX_{\frac{\pi}{8}}\right\} \text{ or } S = \left\{XX_{\frac{\pi}{12}}\right\}.$$

Both distributions can be shifted left with further optimization of the implementations in some embodiments, but that the multiplicative difference will be at least as large between "optimal" implementations of each synthesis method.

FIG. 9 shows a comparison of the output and wall-time characteristics of the proposed algorithm of some embodiments (in red) and that of a numpy numerical search (in blue), when targeting the two-qubit gate sets gate set $$S = \left\{XX_{\frac{\pi}{8}}\right\} \text{ and } S = \left\{XX_{\frac{\pi}{12}}\right\}.$$

The histograms of wall-times are plotted separately, as numerical search is >200× slower. Numerical search can fall in local wells and produce suboptimal circuits.

It remains to describe how to find the point $p \in \Pi(C)$ which optimizes $C'$ (U, CAN(p)). For a non-approximating cost function, this can be probed directly: if $\Pi(U) \in \Pi(C)$, then take $p=\Pi(U)$, and otherwise reject $\Pi(C)$ entirely. For the approximating cost function defined in Example 6.4, the following more elaborate result is used in some embodiments:

Theorem 6.10. Let P be an XX-circuit polytope, and let F⊆P be an open facet within it. For $p \in \mathfrak{A}_{c_2}$ a fixed positive canonical triple, if b=q is a critical point of the infidelity distance $II_{a=p, b \in F}$ as constrained to F, then q is also a critical point of the Euclidean distance to p as constrained to F.

Proof. Theorem 4.1 gives an explicit enumeration of the available open facets of P, and the optimization problem is approached over each facet separately. See Appendix A.

This result means that the standard procedure used to calculate the nearest point in Euclidean distance can be repurposed in some embodiments to instead find the best approximating canonical triple. Namely, to calculate the nearest point in Euclidean distance, project the point onto the affine subspaces spanned by each facet of the polytope (e.g., by solving a least-squares problem), retain those projections which belong to the polytope, and from that finite set select the point of minimum (infidelity) distance.

Remark 6.11. This is extremely unusual behavior for these two optimization problems and relies on the specific form of the polytopes appearing in Theorem 4.1. For contrast, consider the line passing through the origin with slope $$\left(\frac{\pi}{4}, \frac{\pi}{50}, \frac{\pi}{50}\right)$$

and the off-body point $$\left(\frac{83\pi}{400}, \frac{83\pi}{400}, \frac{83\pi}{400}\right).$$

The fidelity-nearest point appears after traveling for one unit of time, but the Euclidean-nearest point appears after traveling for ≈95% of a unit of time.

Remark 6.12. Numerical experiment indicates that the nearest point under infidelity distance exactly agrees with the nearest point under Euclidean distance—e.g., that the same critical point achieves the minimum value in both of these searches. However, this conjecture yields no algorithmic speedup when producing these minimizers, so there is no motivation to pursue it in some embodiments.

Section 7. Gateset Optimization and Numerical Experiment

In this section, the theory of Section 6 is brought to bear on deciding which native gates are worth bestowing on a device in some embodiments. Even if a device is physically capable of enacting some quantum operation, there is calibration overhead to making that operation available as a reliable user-facing gate. At the same time, the more high-fidelity native interactions are available, the more clever and adaptable the synthesis method of some embodiments can be. Accordingly, one would like to find a small set of XX operations that optimizes certain objective functions which measure synthesis performance. The primary objective of concern is expected cost:

Definition 7.1. For a two-qubit unitary $U \in PU(4)$ and a native gate set $S$, let $C_S$ (U):=$\min_C C_S$ (U, C) be a cost function as in (e.g., Example 6.4 or its non-approximating variant). The expected cost is defined as $$\langle C_S \rangle := \int_{U \in PU(4)} C_S (U) d\mu^{Haar}.$$

For XX-based gate sets $S$ and for favorable cost functions, it is now shown how to compute this value exactly in some embodiments. Starting with the definition $$\langle C_S \rangle = \int_{U \in PU(4)} \min_C C_S(U, C) d\mu^{Haar},$$

separability and non-approximation are used to reduce to the case where U admits an exact model by C:

$$\langle C_S \rangle = \int_{U \in PU(4)} \min_{U=C(\theta)} C''_S(C, \theta) d\mu^{Haar}.$$

By assuming $S$ finite and $C''_S$ locally invariant, the integrand $\min_{U \in C} C''_S(C)$ takes on finitely many values, supported by finitely many choices of C. By sorting the C compatibly with $C''_S(C)$, one may further reduce to $$\langle C_S \rangle = \sum_C \int_{\substack{U \in Image(C) \\ U \notin Image(C') | C' < C}} C''_S(C) d\mu^{Haar}.$$

Since $C''_S(C)$ is constant on each region, each summand is given by the reweighted Haar volume of the corresponding region. Since constant functions pull back from constant functions, these integrals can be pushed forward along $\Pi$ and computed in $\mathfrak{A}_{c_2}$.

$$\langle C_S \rangle = \sum_C C''_S(C) \left( \Pi * \mu^{Haar} \left( \Pi(C) \setminus \bigcup_{C' < C} \Pi(C') \right) \right).$$

Altogether, this reduces the problem in some embodiments to calculating the Haar volume of the polytopes which appear in Theorem 4.1.

Lemma 7.2. The pushforward of the Haar measure is given by $$\Pi * d\mu^{Haar} = \frac{384}{\pi} \prod_{1 \le j < k \le 3} \sin(2c_j + 2c_k) \sin(2c_j - 2c_k).$$

The extra factor of 2 appearing in this formula comes from a different scaling of the coordinate systems. This density function has a unique local maximum at $$\left( \frac{\pi}{4}, \frac{\pi}{8}, 0 \right).$$

Such trigonometric integrals over tetrahedra can be performed exactly. Altogether, this provides a quantitative means in some embodiments by which to study the effect of tuning the inputs to a parametric gate set, e.g., $$S(x) = \left\{ XX_{\frac{\pi}{4}}, XX_x \right\}.$$

A parametric choice of gate set requires a parametric cost function, and the parametric cost function of interest is as follows:

Definition 7.3. In this setting, it is experimentally justified in some embodiments to assume an affine error model: take $XX_x$ to have fidelity cost mx+b for some experimentally determined values of m and b. In one experiment, these were measured $$\frac{\pi}{4} \cdot m \approx 5.76 \times 10^{-3}$$

and b≈1.909×10⁻³. This reported offset b incorporates the average infidelity cost of local post-rotations, so as to better model the total circuit execution cost while maintaining local invariance. From this, a separable, locally invariant, additive cost component can be built by $$C''_S(C) = \sum_{XX_x \in C} (mx + b).$$

Remark 7.4. Someone who would like to account, in the above framework, for the worst-case cost of the interleaved single-qubit operations can absorb that extra amount into the b parameter.

Figure 10:
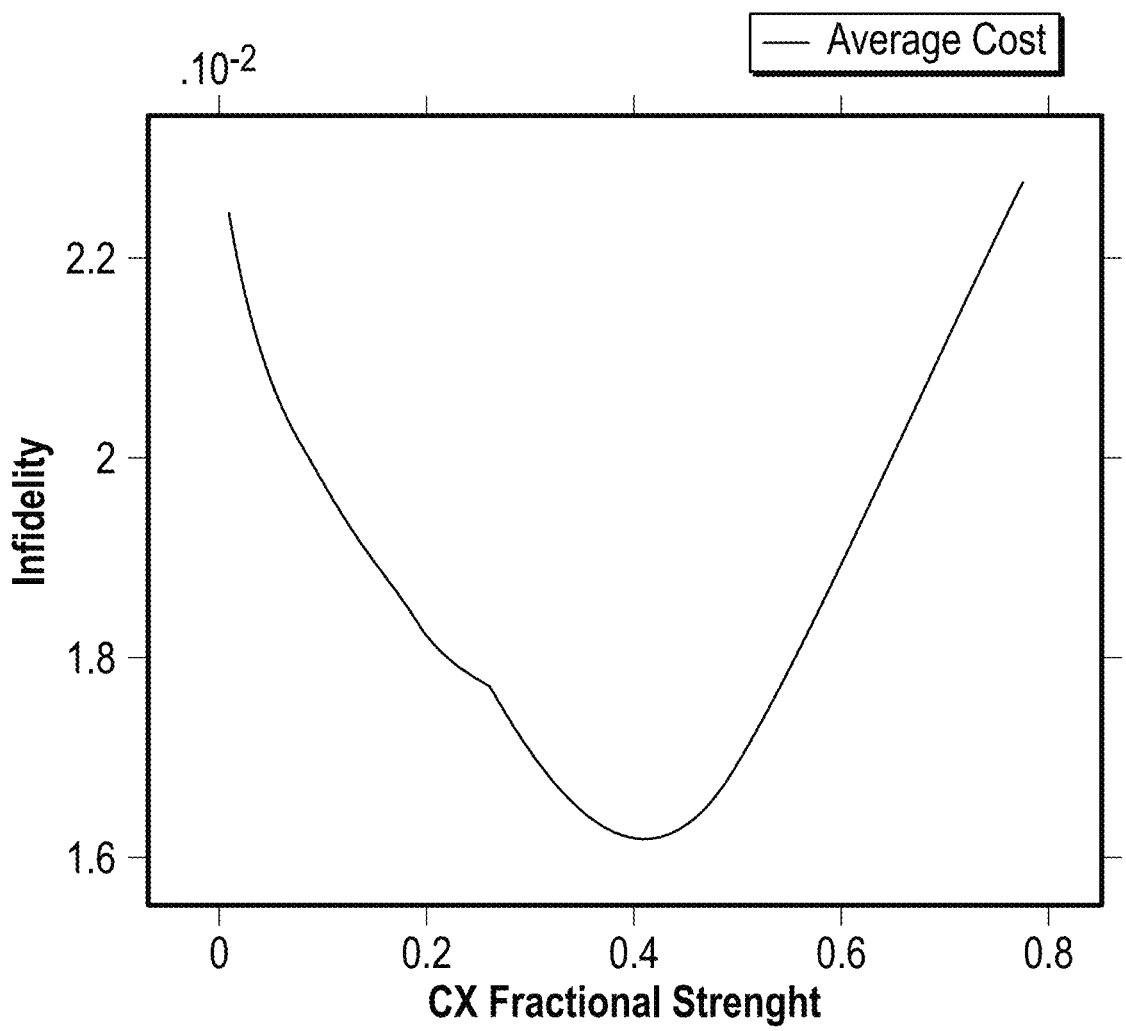
FIG. 10 shows the expected infidelity of a Haar-random operator in some embodiments.

FIG. 10 shows an example of the expected infidelity of a Haar-random operator decomposed exactly into $S(x) = \{CX, XX_x\}$. Uses an additive affine error model with offset b 1.909×10⁻³ and slope $$\frac{\pi}{4} \cdot m = 5.76 \times 10^{-3}.$$

Example 7.5. Consider the gate set $$S = \left\{ XX_{\frac{\pi}{4}}, XX_x \right\}$$

with cost given by the additive affine error model with parameters b≈1.909×10⁻³ and $$\frac{\pi}{4} \cdot m \approx 5.76 \times 10^{-3}.$$

In FIG. 10, an example of the expected infidelity is displayed of synthesizing an $S$-circuit for a Haar-randomly chosen unitary varies with the gate set parameter x. The ends of this curve degenerate to the case of the smaller gate set $$\left\{ XX_{\frac{\pi}{4}} \right\}.$$

Figure 11A:
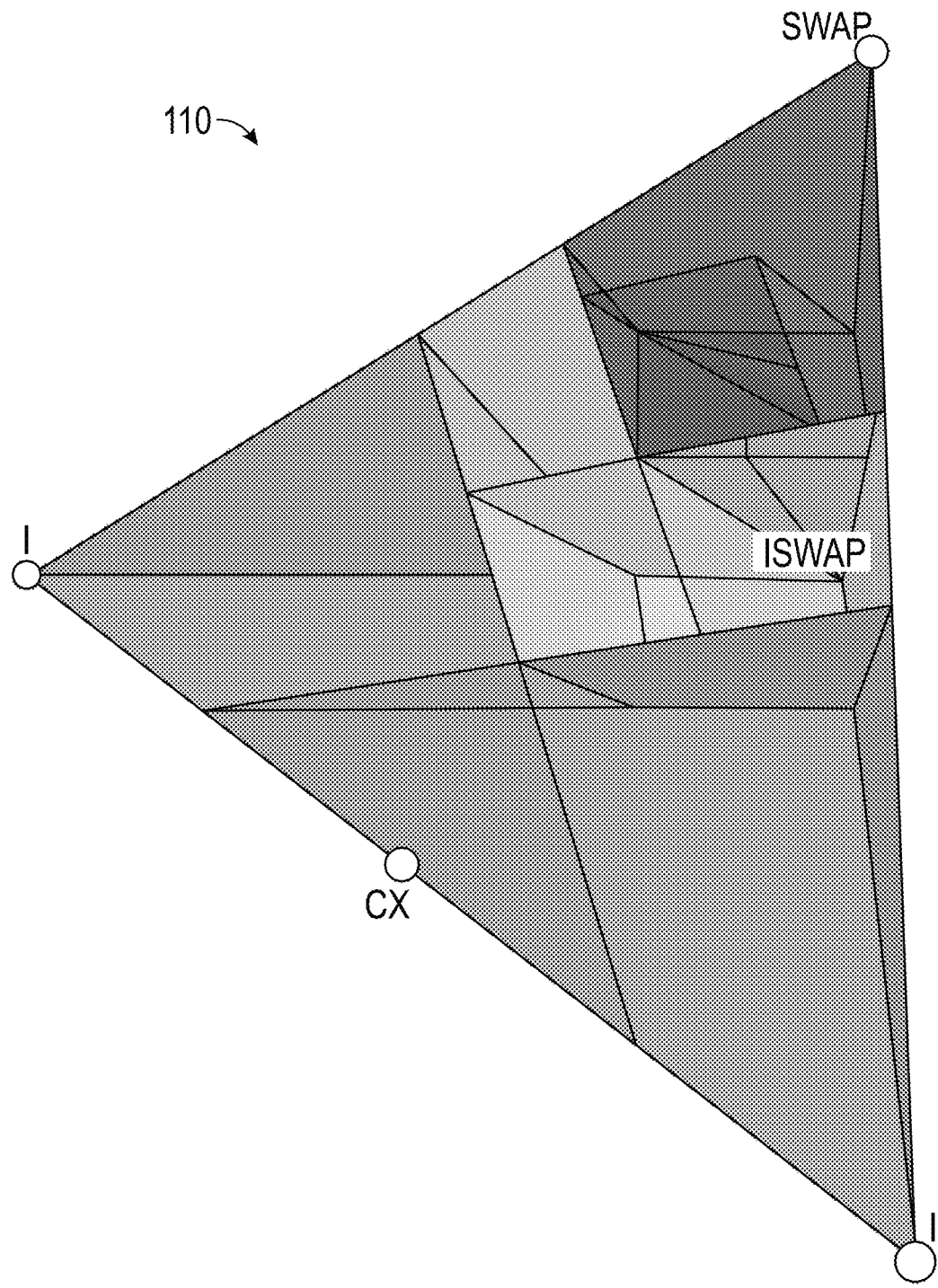
FIG. 11A shows a visualization of an optimal set of $\mathcal{S}$-circuit polytopes for some embodiments.
Figure 11B:
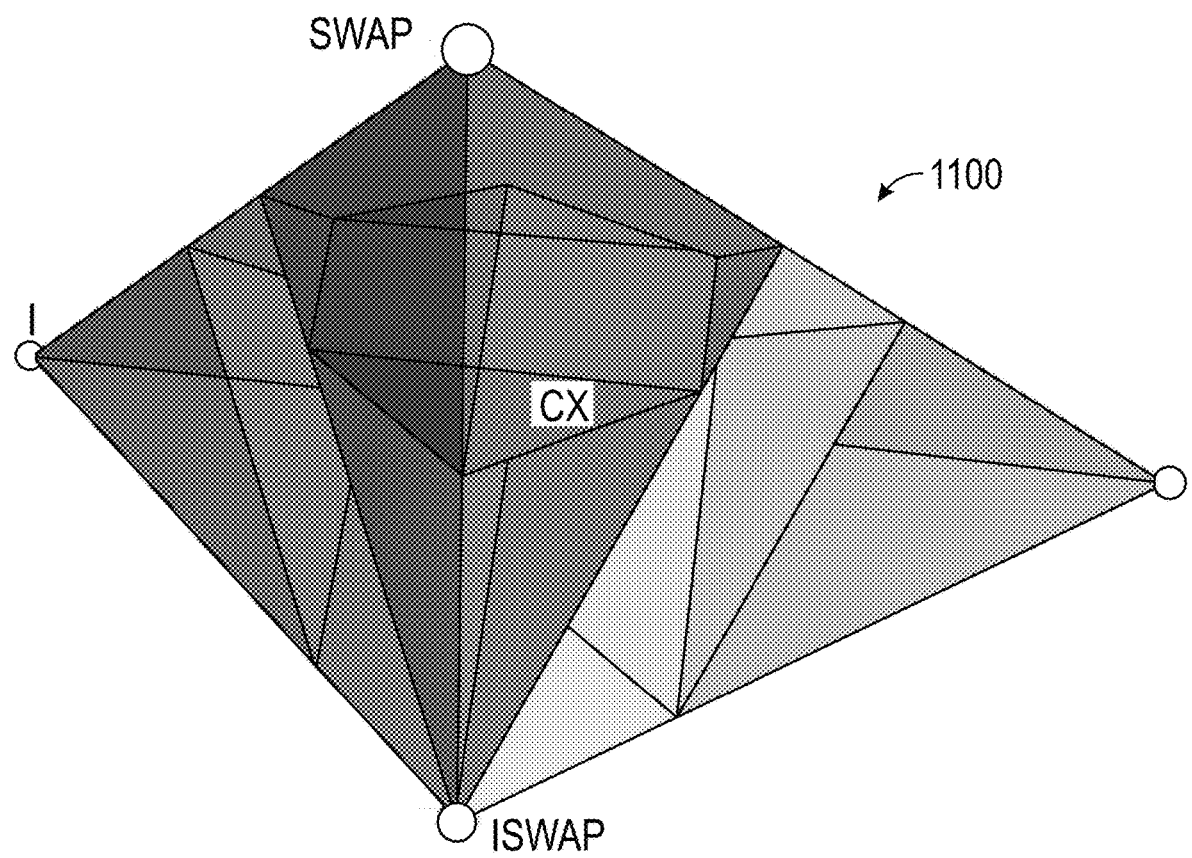
FIG. 11B shows another perspective of the visualization shown in FIG. 11A.

The precise location of the optimum in the middle depends on the ratio m/b; for experimentally realistic error models like the one depicted here, it is located near $$\frac{\pi}{8},$$

achieving an expected infidelity of 1.62×10⁻². One also observes that the basin for this minimum is fairly wide, so that $\frac{\pi}{8}$ is a good choice for inclusion in a native gate set even if the error model varies somewhat over time or across a device. Low-denominator rational multiples of $\frac{\pi}{4}$ are also easier to use in a randomized benchmarking scheme. Finally, in FIGS. 11A and 11B, the optimal synthesis regions within the Weyl alcove are shown for the gate set $\{XX_{\frac{\pi}{4}}, XX_{\frac{\pi}{8}}\}.$ FIGS. 11A and 11B show an optimal set of $\mathcal{S}$-circuit polytopes covering $\mathfrak{A}_{c_2}$ for $\mathcal{S} = \{XX_{\frac{\pi}{4}}, XX_{\frac{\pi}{8}}\}.$ There are six regions depicted:

$\left(\frac{\pi}{8}, \frac{\pi}{8}, \frac{\pi}{8}\right)$ in orange, $\left(\frac{\pi}{8}, \frac{\pi}{8}, \frac{\pi}{4}\right)$ in yellow, $\left(\frac{\pi}{8}, \frac{\pi}{8}, \frac{\pi}{8}, \frac{\pi}{8}\right)$ in green, $\left(\frac{\pi}{8}, \frac{\pi}{4}, \frac{\pi}{4}\right)$ in blue, $\left(\frac{\pi}{8}, \frac{\pi}{8}, \frac{\pi}{8}, \frac{\pi}{4}\right)$ in purple, and $\left(\frac{\pi}{4}, \frac{\pi}{4}, \frac{\pi}{4}\right)$ in red. There are also six legions which have circuit depth at most two, hence they do not contribute volume and are suppressed from the picture.

Figure 12:
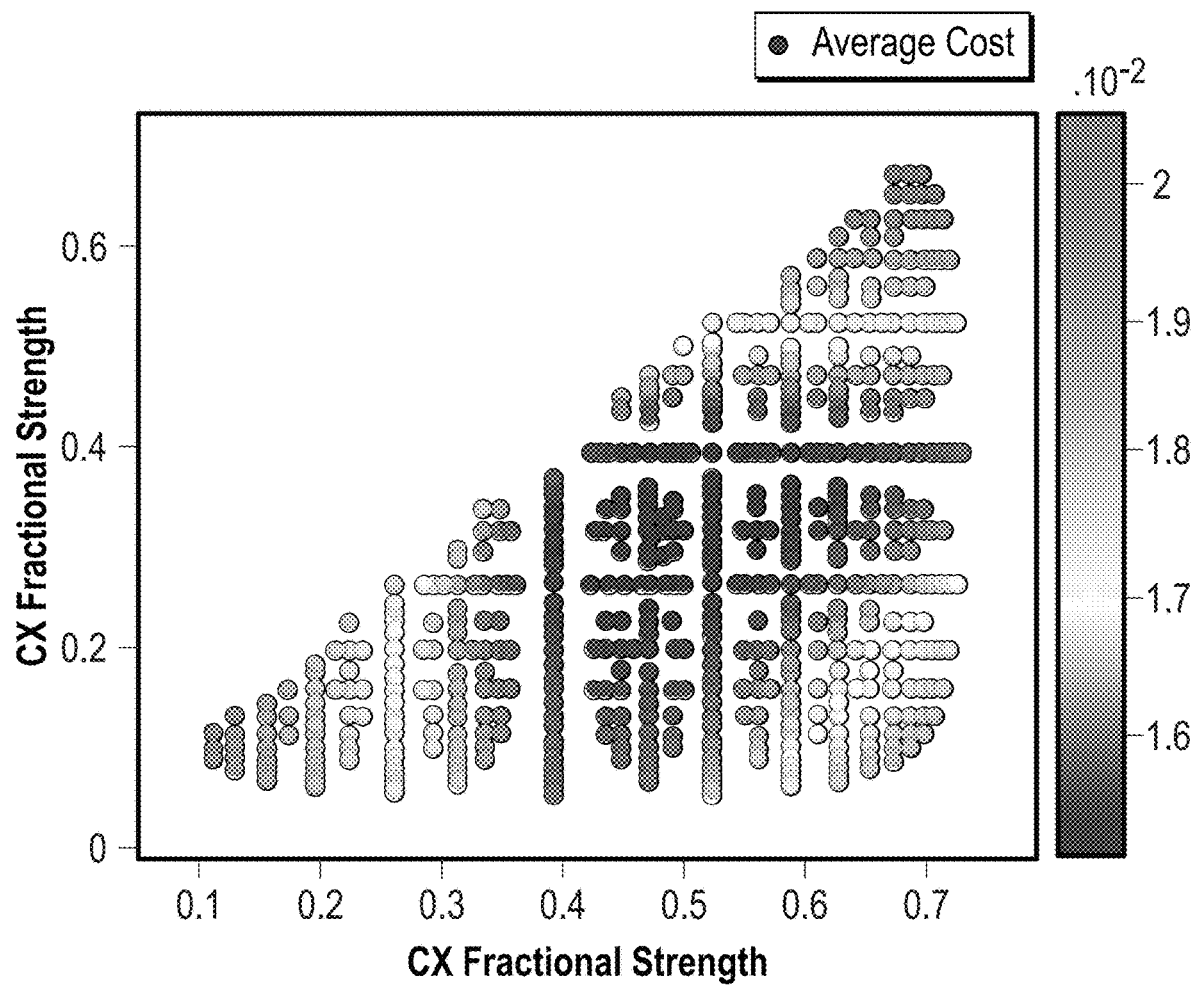
FIG. 12 shows the expected infidelity in some embodiments of synthesizing an $\mathcal{S}$-circuit for a Haar-randomly chosen unitary

Example 7.6. Consider next the gate set $\mathcal{S} = \{XX_{\frac{\pi}{4}}, XX_x, XX_y\}$ with the same cost function. In FIG. 12, an example of the expected infidelity of synthesizing an $\mathcal{S}$-circuit for a Haar-randomly chosen unitary against both parameters x and y is displayed. Specifically, FIG. 12 shows the expected infidelity of a Haar-random operator decomposed exactly into $\mathcal{S}_{x,y}=\{CX, XX_x, XX_y),\}$. Uses an additive affine error model with offset $b \approx 1.909 \times 10^{-3}$ and slope $\frac{\pi}{4} \cdot m \approx 5.76 \times 10^{-3}.$ The edges of the triangular region in FIG. 12 degenerate to the case discussed in Example 7.5 along the lines $x = \frac{\pi}{4},$ y=0, and x=y. As before, the precise location of the optimum in the middle depends on the ratio m/b, but for experimentally realistic error models like the one depicted here, it is located near $(x, y) = \left(\frac{\pi}{8}, \frac{\pi}{12}\right),$ this time achieving an expected infidelity of $1.51 \times 10^{-2}$. Again, the basin is fairly wide and the minimum fairly independent of the value of m/b, so that $\left(\frac{\pi}{8}, \frac{\pi}{12}\right)$ are good choices for inclusion in a native gate set even if the observed error model exhibits mild variation over time or across a device.

Figure 13A:
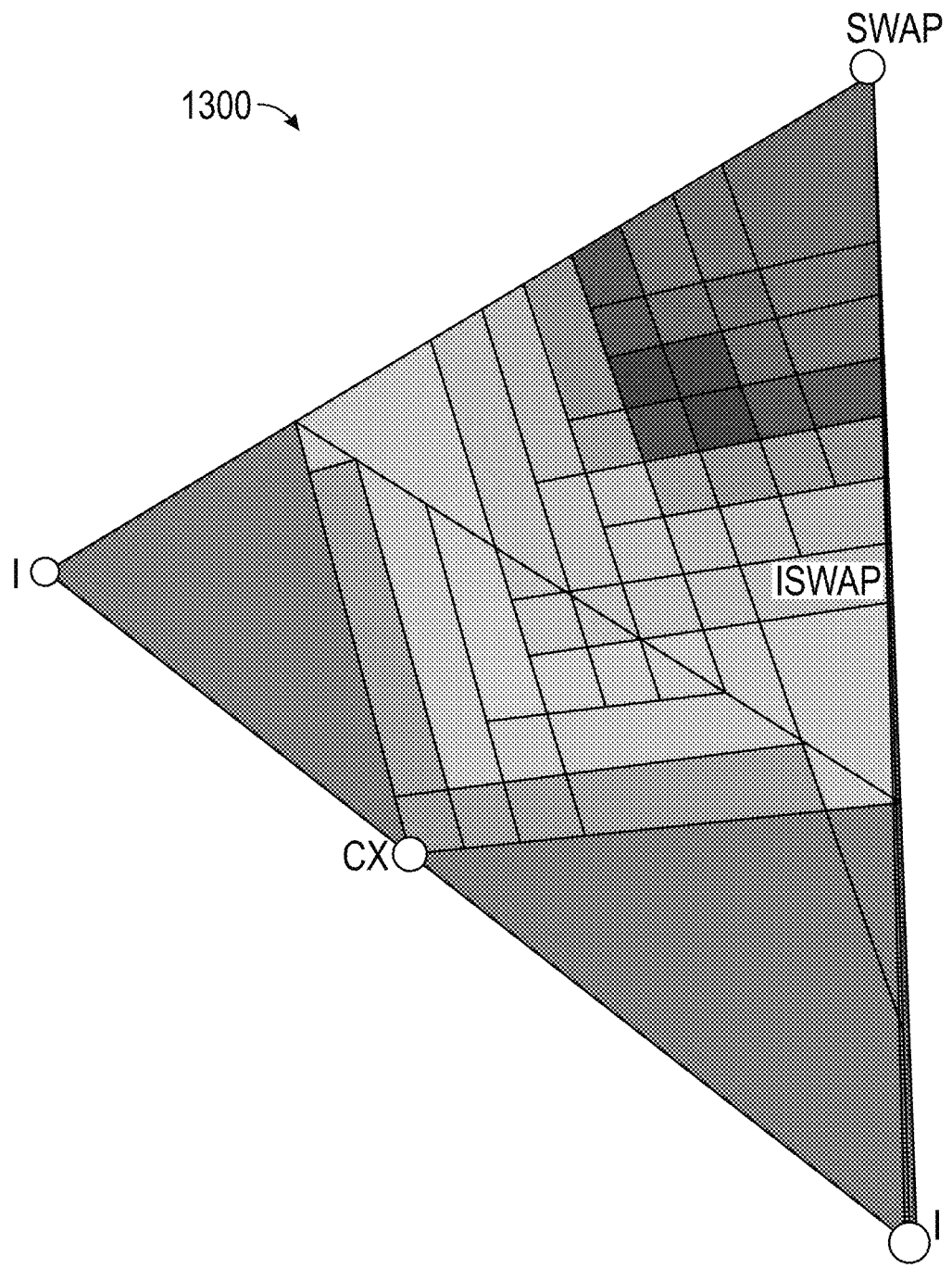
FIG. 13A shows a visualization of an optimal set of $\mathcal{S}$-circuit polytopes for some embodiments.
Figure 13B:
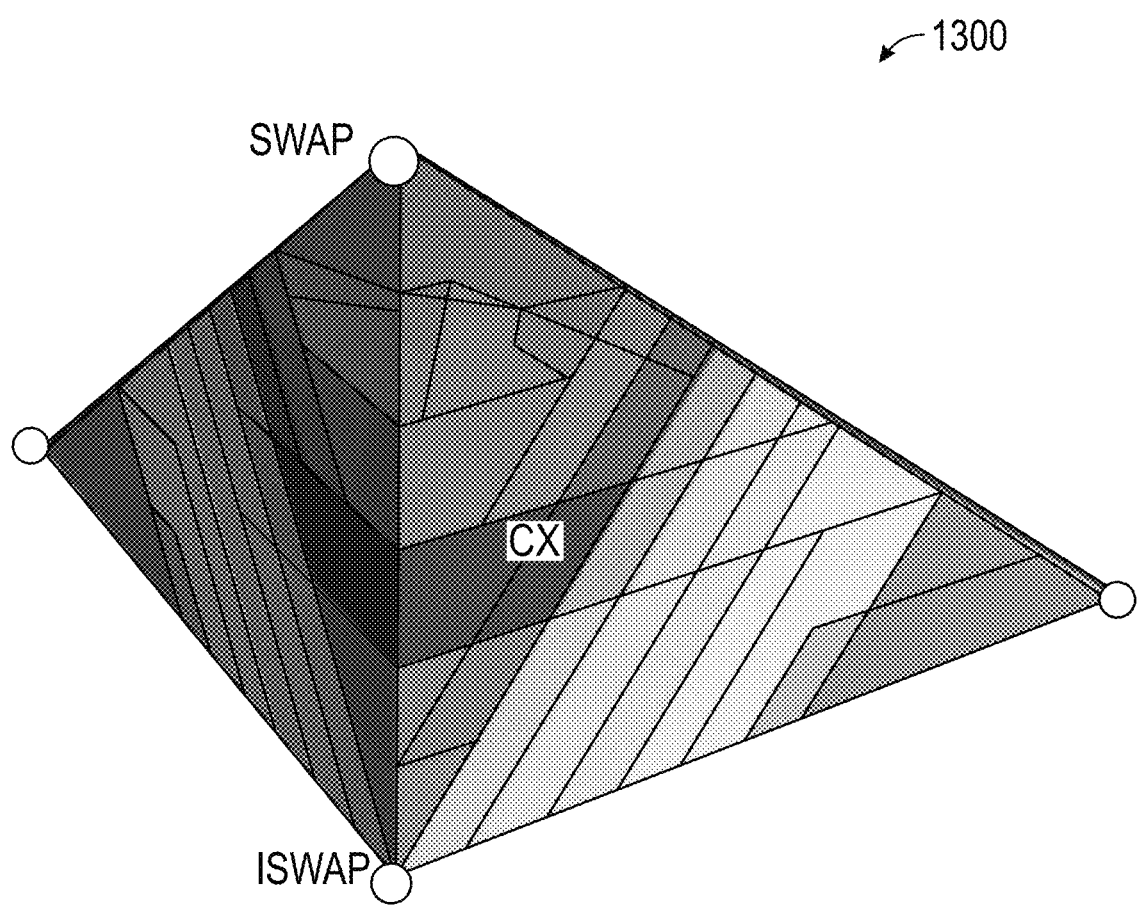
FIG. 13B shows another perspective of the visualization shown in FIG. 13A.

In FIGS. 13A and 13B, an example of the optimal synthesis regions within the Weyl alcove are depicted for the gate set $\{XX_{\frac{\pi}{4}}, XX_{\frac{\pi}{8}}, XX_{\frac{\pi}{12}}\}.$ Specifically, FIGS. 13A and 13B show an optimal set of $\mathcal{S}$-circuit polytopes covering $\mathfrak{A}_{c_2}$ for $\mathcal{S} = \left\{XX_{\frac{\pi}{4}}, XX_{\frac{\pi}{8}}, XX_{\frac{\pi}{12}}\right\}.$ The nineteen regions are too many to name explicitly, but their hues indicate an increasing cost from a minimum at I to a maximum at SWAP. There are also ten regions which have circuit depth at most two, hence they do not contribute volume and are suppressed from the picture.

Figure 15:
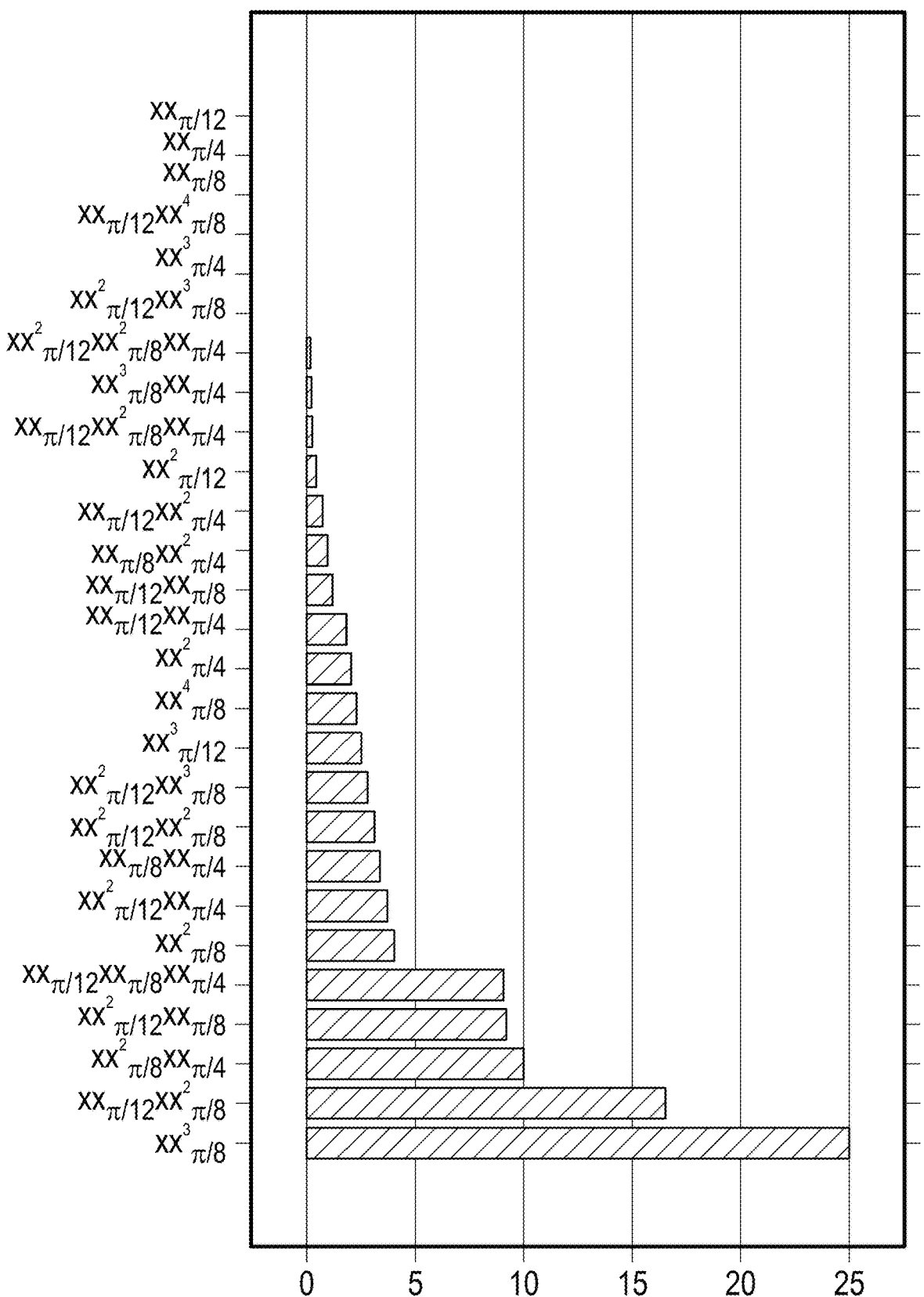
FIG. 15 shows a distribution of circuit types when approximately synthesizing 31,800 Haar-random two-qubit unitaries in some embodiments.

Example 7.7. Taking these results for exact synthesis as inspiration, in some embodiments one can also explore effects introduced by approximate synthesis. The results cannot be so clean, because of losing access to the method for analytic calculation, but one can still perform Monte Carlo experiments to analyze the relationship between $\mathcal{S}_x = \{CX, XX_x\}$ and the expected infidelity. The plot in FIG. 14 shares many of the same qualitative features as FIG. 10 (e.g., the approximate position of the global minimum, and the non-concave kink near $$x = \frac{\pi}{2} \cdot 1/3),$$

with an overall vertical shift coming from the approximation savings. The global optimum for approximate synthesis into $\mathcal{S}_{x,y} = \{CX, XX_x, XX_y\}$ is again near to the global optimum for exact synthesis, so the user-friendly value of $$(x, y) = \left(\frac{\pi}{8}, \frac{\pi}{12}\right)$$

is re-used and FIG. 15 depicts the relative frequencies that these regions are made use of by approximate synthesis of Haar-random operations.

Figure 14:
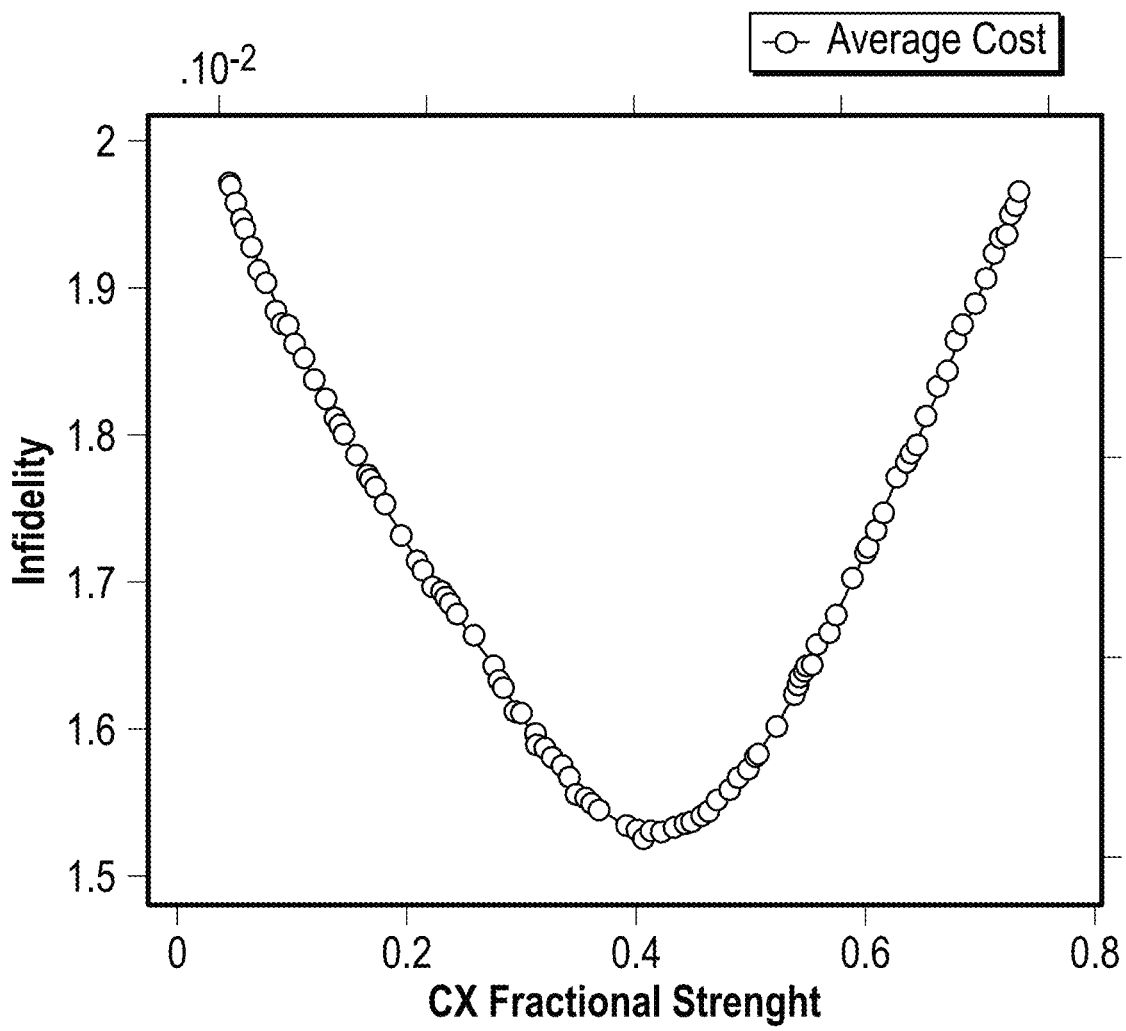
FIG. 14 shows the expected infidelity of a Haar-random operator in some embodiments.

FIG. 14 shows the expected infidelity of a Haar-random operator decomposed approximately into $\mathcal{S}(x) = \{CX, XX_x\}$. Uses an additive affine error model with offset $b \approx 1.909 \times 10^{-3}$ and slope $$\frac{\pi}{4} \cdot m \approx 5.76 \times 10^{-3}.$$

FIG. 15 shows a distribution of circuit types of some embodiments when approximately synthesizing 31,800 Haar-random two-qubit unitaries according to the additive affine error model with offset $b \approx 1.909 \times 10^{-3}$ and slope $$\frac{\pi}{4} \cdot m \approx 5.76 \times 10^{-3}.$$

Remark 7.8. In the limit where $\mathcal{S}$ contains all XX interactions, the most efficient circuit for $CAN(a_1, a_2, a_3)$ is given in some embodiments by a product $$CAN(a_1, a_2, a_3) = CAN(a_1) \cdot CAN(0, a_2) \cdot CAN(0, 0, a_3),$$

where each factor in the product is a Weyl reflection of a single XX gate of the same parameter, and where factors are dropped when the relevant parameter vanishes. Under the assumption of an additive affine error model, this establishes a lower bound for how efficient the circuits may possibly be, as they are assembled from a more restrictive gate set.

Comparing Example 7.5 and Example 7.6, it is observed that there are rapidly diminishing returns to enlarging the native gate set. Specialized to the same error model as in the Examples, the performance lower bound argued above is $$\left(3/2 \cdot \frac{\pi}{4}\right) \cdot m + 3b,$$

resulting in Table

TABLE 3

| Gateset $\mathcal{S}$ | Approx.? | $\operatorname{argmin}/\frac{\pi}{4}$ | $\min\langle \mathscr{E}_{\mathcal{S}} \rangle$ | (%) |
|---|---|---|---|---|
| {CX} | | — | $2.279 \times 10^{-2}$ | (100%) |
| {CX} | ✓ | — | $2.058 \times 10^{-2}$ | (90.3%) |
| {CX, XX$_x$} | | 0.52041 | $1.617 \times 10^{-2}$ | (70.9%) |
| {CX, XX$_x$} | ✓ | 0.51932 | $1.526 \times 10^{-2}$ | (67.0%) |
| {CX, XX$_x$, XX$_y$} | | 0.61856, 0.41872 | $1.510 \times 10^{-2}$ | (66.3%) |
| {CX, XX$_x$, XX$_y$} | ✓ | 0.66362, 0.43004 | $1.445 \times 10^{-2}$ | (63.4%) |
| {XX$_{cts}$} | | — | $1.437 \times 10^{-2}$ | (63.1%) |
| {XX$_{cts}$} | ✓ | — | $1.394 \times 10^{-2}$ | (61.2%) |

Table 3 shows the expected infidelity of a Haar-random operator with optimal decomposition into optimally chosen gate-sets of various sizes. Uses an additive affine error model with offset $b \approx 1.909 \times 10^{-3}$ and slope $$\frac{\pi}{4} \cdot m \approx 5.76 \times 10^{-3}.$$

Note that {XX$_{xcts}$} may be physically unrealistic.

Remark 7.9. For a two-qubit unitary U, its mirror is the gate U•SWAP. The mirror of a canonical gate CAN ($a_1$, $a_2$, $a_3$) is again canonical, given by the formula $$\begin{cases} CAN\left(\frac{\pi}{4} + a_3, \frac{\pi}{4} - a_2, \frac{\pi}{4} - a_1\right) & \text{when } a_1 \leq \frac{\pi}{4}, \\ CAN\left(\frac{\pi}{4} - a_3, \frac{\pi}{4} - a_2, a_1 - \frac{\pi}{4}\right) & \text{otherwise.} \end{cases}$$

Figure 16:
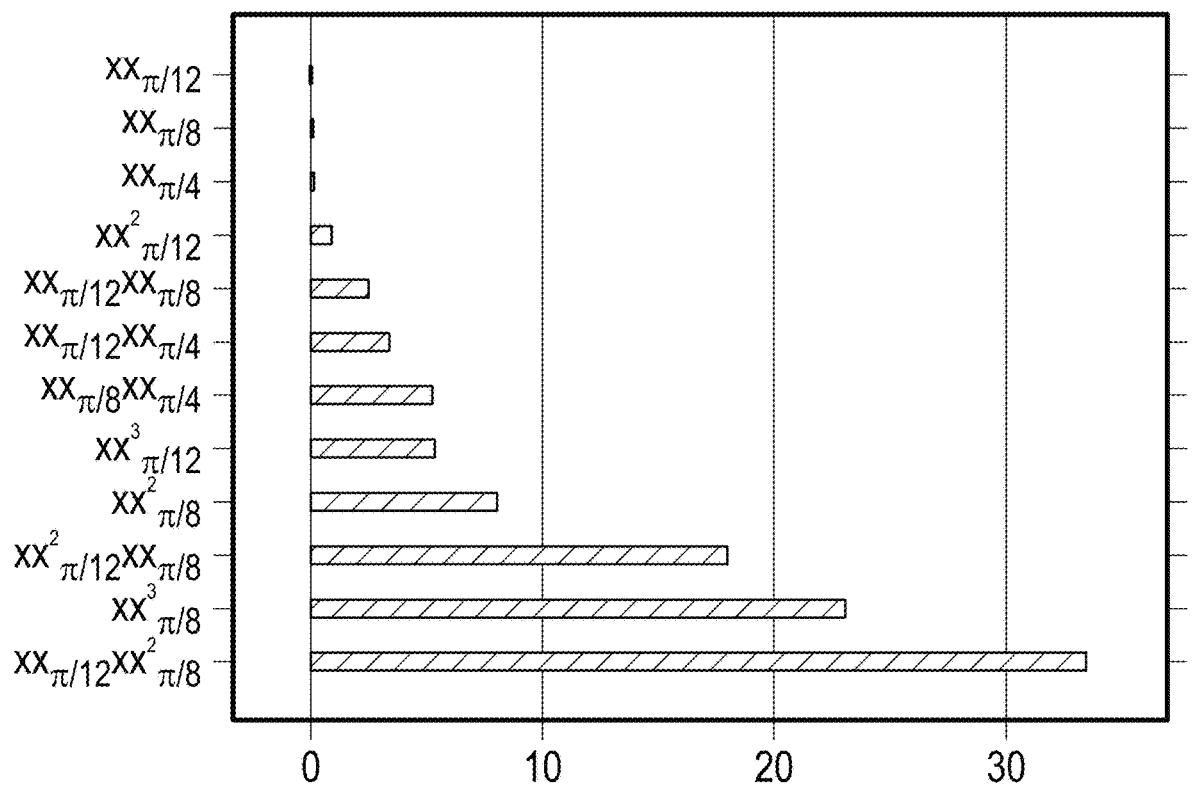
FIG. 16 shows a distribution of circuit types when approximately synthesizing 49,700 Haar-random two-qubit unitaries in some embodiments.

This formula shows that mirroring interchanges the regions of $\mathfrak{A}_{c_2}$ with the most and least infidelity cost, suggesting that the technique of some embodiments may be particularly fruitful at reducing the cost of mirrorable gates. The numerical results are summarized in Table 4, and in FIG. 16 is depicted the relative frequency of different circuit templates when synthesizing up to mirroring.

TABLE 4

| Gateset $\mathcal{S}$ | Approx.? | $\operatorname{argmin}/\frac{\pi}{4}$ | $\min\langle \mathscr{E}_{\mathcal{S}} \rangle$ | (%) |
|---|---|---|---|---|
| {CX} | | — | $2.279 \times 10^{-2}$ | (100%) |
| {CX} | ✓ | — | $1.895 \times 10^{-2}$ | (83.2%) |
| {CX, XX$_x$} | | 0.49970 | $1.437 \times 10^{-2}$ | (63.1%) |
| {CX, XX$_x$} | ✓ | 0.46411 | $1.352 \times 10^{-2}$ | (59.3%) |
| {CX, XX$_x$, XX$_y$} | | 0.49904, 0.24991 | $1.350 \times 10^{-2}$ | (59.2%) |
| {XX$_{cts}$} | | — | $1.304 \times 10^{-2}$ | (57.2%) |
| {CX, XX$_x$, XX$_y$} | ✓ | 0.54244, 0.37083 | $1.300 \times 10^{-2}$ | (57.0%) |
| {XX$_{cts}$} | ✓ | — | $1.241 \times 10^{-2}$ | (54.7%) |

Table 4 shows the expected infidelity of a Haar-random operator or its mirror with optimal decomposition into optimally chosen gate-sets of various sizes. Uses an additive affine error model with offset $b \approx 1.909 \times 10^{-3}$ and slope $$\frac{\pi}{4} \cdot m \approx 5.76 \times 10^{-3}.$$

Note {XX$_{xcts}$} may be physically unrealistic.

FIG. 16 shows a distribution of circuit types of some embodiments when approximately synthesizing 49,700 Haar-random two-qubit unitaries, allowing mirroring, according to the additive affine error model with offset b≈1.909×10$^{-3}$ and slope $$\frac{\pi}{4} \cdot m \approx 5.76 \times 10^{-3}.$$

Example 7.10. The statistics on exact, approximate, and mirrored synthesis are summarized for the gate sets $$\{XX_{\frac{\pi}{4}}\}, \{XX_{\frac{\pi}{4}}, XX_{\frac{\pi}{8}}\}, \text{ and } \{XX_{\frac{\pi}{4}}, XX_{\frac{\pi}{8}}, XX_{\frac{\pi}{12}}\}$$

in Table 5. These are to be compared with the precise optima reported in Table 3 and Table 4.

TABLE 5

| Gateset $\mathcal{S}$ | Approx.? | Mirror? | $\langle \mathscr{E}_{\mathcal{S}} \rangle$ | (%) |
|---|---|---|---|---|
| $\{CX, XX_{\frac{\pi}{8}}\}$ | | | $1.619 \times 10^{-2}$ | (71.0%) |
| " | ✓ | | $1.534 \times 10^{-2}$ | (67.3%) |
| " | | ✓ | $1.437 \times 10^{-2}$ | (63.1%) |
| " | ✓ | ✓ | $1.374 \times 10^{-2}$ | (60.3%) |
| $\{CX, XX_{\frac{\pi}{8}}, XX_{\frac{\pi}{12}}\}$ | | | $1.564 \times 10^{-2}$ | (68.6%) |
| " | ✓ | | $1.483 \times 10^{-2}$ | (65.1%) |
| " | | ✓ | $1.352 \times 10^{-2}$ | (59.3%) |
| " | ✓ | ✓ | $1.304 \times 10^{-2}$ | (57.2%) |

Table 5 shows the expected infidelity of a Haar-random operator with various optimal synthesis methods into a fixed pair of convenient gate sets. Uses an additive affine error model with offset b≈1.909×10$^{-3}$ and slope $$\frac{\pi}{4} \cdot m \approx 5.76 \times 10^{-3}.$$

These expected fidelities may be compared with those advertised in Table 3 and Table 4.

Appendix A: Case-Work for the Approximation Theorem

This Appendix chases out the requisite case work to prove Theorem 6.10, beginning with some reductions.

Lemma A.1. Let $a=(a_1, a_2, a_3)$ be a positive canonical triple, and let $P \subseteq \mathfrak{A}_{c_2}$ be a polyhedron satisfying the reflection-closure property $$P = \left\{ \left(\frac{\pi}{2} - b_1, b_2, b_3\right) \middle| b \in P \right\}.$$

The point $b \in P$ nearest in infidelity distance to the point $a \in \mathfrak{A}_{c_2}$ satisfies $$b_1 \leq \frac{\pi}{4} \text{ if } a_1 \leq \frac{\pi}{4} \text{ and } b_1 \geq \frac{\pi}{4} \text{ if } a_1 \geq \frac{\pi}{4}.$$

Proof. In the expression $$\prod_j \cos^2(a_j - b_j) + \prod_j \sin^2(a_j - b_j),$$

the bounds $0 \leq a_2, b_2, a_3,$ $$b_3 \leq \frac{\pi}{4}$$

entail that the first summand is bounded from below by ¼ $\cos^2(a_1-b_1)$ and the second summand is bounded from above by ¼ $\sin^2(a_1-b_1)$. Notice that replacing b with its reflection $$\left(\frac{\pi}{2} - b_1, b_2, b_3\right)$$

trades the positions in the expression of $\cos^2(a_1-b_1)$ and $\sin^2(a_1-b_1)$. Additionally, notice that the expression is maximized when $\cos^2(a_1-b_1)$ takes on the larger of the two values, e.g., when $\cos^2(a_1-b_1) \geq \frac{1}{2}$. This then holds exactly when the conclusion of the Lemma does.

Corollary A.2. One need only handle the case $$a_1 \leq \frac{\pi}{4}.$$

Proof. Theorem 4.1 shows that XX-circuit polytopes are reflection-invariant, so that the Lemma may be applied. Furthermore, since average infidelity is invariant under replacing both coordinates by their reflections $$(a_1, a_2, a_3) \mapsto \left(\frac{\pi}{2} - a_1, a_2, a_3\right),$$

$$(b_1, b_2, b_3) \mapsto \left(\frac{\pi}{2} - b_1, b_2, b_3\right),$$

one may reduce to one case of the Lemma, and choose the case indicated in the Corollary statement.

From here, the actual casework is considered, walking first over the codimensions of the various facets of some implicitly understood XX-circuit polytope and then over their possible slopes (noting that in each codimension there is a finite set of possibilities). The codimension 0 and 3 (e.g., top- and bottom-dimensional) cases are trivial:

Lemma A.3 (cf. Remark 6.5). The infidelity functional $\mathrm{II}_a$ is extremized on the interior of a codimension 0 facet if and only if a is a member of that facet.

Lemma A.4. The codimension 3 facets contribute a finite set of points at which the restricted infidelity function $\mathrm{II}_a$ may be extremized.

Lemma A.5. The infidelity functional $\mathrm{II}_a$ is extremized on the interior of codimension 1 facets coincident with the outer walls of the Weyl alcove if and only if a is a member of that facet.

Proof. A strategy similar to Remark 4.5 is employed: the choice to restriction attention the alcove $\mathfrak{A}_{c_2}$ is artificial, and it is equivalent to optimize the function $\min_{v,w \in W} \mathrm{I}(v \cdot a, w \cdot b)$ where W denotes the group of Weyl reflections, where the domain of I is suitably extended by reflection beyond $\mathfrak{A}_{c_2}$.

and where $b^w$ is constrained to reside in $U_{w \in W} w \cdot P$, the closure of P under Weyl reflections. This closure is again a (possibly non-convex, possibly disconnected) polyhedron, but now the points $b \in P$ incident on the outer alcove walls belong to the interior of a codimension 0 facet of $U_{w \in W} w \cdot P$. Hence, the optimization condition reduces to that of the codimension 0 facet case.

Lemma A.6. The infidelity functional $II_a$ is extremized on the interior of the codimension 1 facets not coincident with the outer walls of the Weyl alcove exactly at the nearest point in Euclidean distance.

Proof. Each such facet has an associated Lagrange multipliers problem, which is solve in turn. The following abbreviations are used throughout:

$$\partial_j I := \frac{\partial II_a}{\partial b_j}, \; \delta_j := a_j - b_j.$$

The linear constraints on $a, b \in \mathfrak{A}_{c_2}$ describe the following constraints on $\delta$:

$$\delta_1 \in \left[-\frac{\pi}{2}, \frac{\pi}{2}\right], \; \delta_2 \in \left[-\frac{\pi}{4}, \frac{\pi}{4}\right], \; \delta_3 \in \left[-\frac{\pi}{4}, \frac{\pi}{4}\right].$$

Referring to Theorem 4.1, break into cases based on the normal vector of the facet:

(0,0,1): The Lagrange multiplier constraints are $\partial_1 I = 0$ and $\partial_2 I = 0$, which amount to the trigonometric conditions $(c_{2\delta_2} + c_{2\delta_3}) s_{2\delta_1} = 0, (c_{2\delta_1} + c_{2\delta_3}) s_{2\delta_2} = 0.$ Taking into account the domain constraints on $\delta$, the first equation's is satisfied either when a and b both represent the identity unitary or when $\delta_1 = 0$. Taking into account the deduced constraint $\delta_1 = 0$, the second clause is then satisfied only when $\delta_2 = 0$. Finally, $b_3$ is determined by being constrained to the frustrum plane.

(1,1,1): The Lagrange multiplier constraints are $\partial_1 I = \partial_2 I$ and $\partial_2 I = \partial_3 I$, which amount to the trigonometric conditions $(c_{\delta_1 - \delta_2} + c_{\delta_1 + \delta_2} c_{2\delta_3}) s_{\delta_1 - \delta_2} = 0,$ $(c_{\delta_2 - \delta_3} + c_{\delta_2 + \delta_3} c_{2\delta_1}) s_{\delta_2 - \delta_3} = 0,$ These equalities are analyzed similarly to as in the previous case. The first equation is satisfied either when both a and b represent the identity unitary or when $\delta_1 = \delta_2$, and the second equality is similarly dispatched to give $\delta_2 = \delta_3$.

(−1,1,1): The Lagrange multiplier constraints are $-\partial_1 I = \partial_2 I$ and $-\partial_1 I = \partial_3 I$, which amount to the trigonometric conditions $(c_{\delta_1 - \delta_2} + c_{\delta_1 + \delta_2} c_{2\delta_3}) s_{\delta_1 - \delta_2} = 0,$ $(c_{\delta_2 - \delta_3} + c_{\delta_1 + \delta_3} c_{2\delta_2}) s_{\delta_1 - \delta_3} = 0,$ Reasoning identically about the domains, it is concluded that $-\delta_1 = \delta_2$ and $-\delta_1 = \delta_3$.

In each case, the critical points are seen to lie at the Euclidean projections onto the relevant planes.

Lemma A.7. The infidelity functional $II_a$ is extremized on the interior of the codimension 2 facets not coincident with the outer walls of the Weyl alcove exactly at the nearest point in Euclidean distance.

Proof. Again, the task is solving a family of constrained optimization problems. This time, each nondegenerate pair of inner walls intersect at a line with tangent vector v, and will solve along the line for the condition $\nabla II_a \cdot v = 0$. To parameterize the line, select a vertex $b \in \mathfrak{A}_{c_2}$ on it and set $\ell_{(t)} = v \cdot t + b.$ Break v (e.g., the choice of plane pair) into cases.

(−1,−1,0): This tangent vector v arises from the intersection of planes with normal vectors (0,0,1) and (−1,1,1). Expanding $(\nabla II_{a_1, a_2, a_3} \cdot v)$ yields $(c_{\delta_1 - \delta_2 + 2\delta_3} + c_{\delta_1 - \delta_2 - 2\delta_3} + 2c_{1\delta_1 + \delta_2 + 2t}) s_{\delta_1 + \delta_2 + 2t} = 0,$ where t is constrained to $$b_1 - \frac{\pi}{4} \le t \le b_2 - b_3.$$

(1,−1,0): This tangent vector v arises from the intersection of planes with normal vectors (0,0,1) and (1,1,1). Expanding $(\nabla II_{a_1, a_2, a_3} \cdot v)$ yields $(c_{\delta_1 + \delta_2 + 2\delta_3} + c_{\delta_1 + \delta_2 - 2\delta_3} + 2c_{\delta_1 - \delta_2 - 2t}) s_{\delta_1 - \delta_2 - 2t} = 0,$ where t is constrained to $$\frac{1}{2}(b_2 - b_1) \le t \le \min\left\{b_2 - b_3, \frac{\pi}{4} - b_1\right\}.$$

(0,1,−1): This tangent vector v arises from the intersection of planes of normal vectors (1,1,1) and (−1,1,1). Expanding $(\nabla II_{a_1, a_2, a_3} \cdot v)$ yields $(c_{2\delta_1 + \delta_2 + \delta_3} + c_{2\delta_1 - \delta_2 - 2\delta_3} + 2c_{\delta_1 - \delta_3 - 2t}) s_{\delta_1 - \delta_2 - 2t} = 0,$ where t is constrained to $½(b_3 - b_2) \le t \le \min\{b_1 - b_2, b_3\}.$ In each case, the first clause is not satisfiable on the indicated interval, and the second clause contributes at most only the Euclidean critical point.

Lemma A.8. The infidelity functional $II_a$ is extremized on the interior of the codimension 2 facets coincident with the outer walls of the Weyl alcove exactly at the nearest point in Euclidean distance.

Proof. As in Lemma A.7, the intent is to split over the slopes of the plane-plane intersections. Two of these cases are familiar: since the outer alcove wall $b_3 \ge 0$ shares a normal with the frustrum inequality of Theorem 4.1, the tangent vectors (−1,−1,0) and (1,−1,0) both reappear, have already been dispatched in the proof of Lemma A.7. The frustrum inequality contributes one codimension 2 facet not covered by the above: its intersection with the wall $a_2 \ge a_3$ yields a line with tangent vector (1,0,0), and the associated optimization problem is $(c_{2\delta_2} + c_{2\delta_3}) s_{2(\delta_1 - t)} = 0.$ The sine factor contributes the Euclidean critical point, and the cosine factor is independent of t.

The remaining cases correspond to "inner creases" in the Weyl-closed solid $U_{w \in W} w \; P$, and they are treated quite differently. In each case, the strategy is to show that the facet is irrelevant (e.g., has no critical points) unless the outer alcove inequality is tight for the point a, then to use that tightness to simplify the expression further. The strategy for showing irrelevance is to show that, when a is not a member of an outer facet, $\nabla II_a$ has a nonnegative inner product with the inward-facing normal of the codimension 2 facet considered as part of the boundary of the inner codimension 1 facet. Taking this as given, one learns that the extremum then would always lie on the codimension 1 facet, so that one could avoid considering the codimension 2 facet. In fact, this strategy gives a bit more: even without the assumption that a lies off of the outer wall, continuity would show that this conclusion still holds for extrema, since the assumption is only violated at limit points of open regions.

The discussion above is not an argument about critical points but about extrema. Critical points can manifest in some embodiments on a boundary via a sequence of points on the bulk which themselves are merely approximately critical points, without exactly being critical points. However, any such critical point cannot yield a more extreme value than the value achieved by the function on a sequence of values in the bulk which are extrema for the functional constrained to planes parallel to the outer facet.

Thus, in some embodiments one can avoid investigating even the aforementioned simplified expressions, leaving open only the task of exhibiting a positive inner product with the inward-facing normal.

(−2,1,1): This tangent vector v arises from the intersection of the inner wall with normal $n_i=(1,1,1)$ and outer wall with normal $n_o=(0,1,−1)$. Assuming $a_2>a_3$, one would like to show that the following quantity is positive:

$$\nabla fl_a \cdot n_i = (c_{a_2-a_3} + c_{a_2+a_3-2t} c_{2(a_1-b_1+2t)}) s_{a_2-a_3},$$

where $(b_1,0,0)$ lies on the line and t satisfies $0 \le t \le \frac{1}{3} b_1$.

(1,1,−2): This tangent vector v arises from the intersection of the inner wall with normal $n_i=(1,1,1)$ and outer wall with normal $n_o=(1,−1,0)$. Assuming $a_1>a_2$, one would like to show that the following quantity is positive:

$$\nabla fl_a \cdot n_i = (c_{a_1-a_2} + c_{2(a_3-2t)} c_{a_1+a_2-2t}) s_{a_1-a_2},$$

where $(b_1, b_1, 0)$ lies on the line and t satisfies $-\frac{1}{3} b_1 \le t \le 0$.

(−2,−1,−1): This tangent vector v arises from the intersection of the inner wall with normal $n_i=(-1,1,1)$ and outer wall with normal $n_o=(0,1,−1)$. Assuming $a_2>a_3$, we would like to show that the following quantity is positive:

$$\nabla fl_a \cdot n_i = (c_{a_2-a_3} + c_{a_2+a_3-2b_1+2t} c_{2(a_1-b_1+2t)}) s_{a_2-a_3},$$

where $(b_1,0,0)$ lies on the line and t satisfies $$\frac{1}{2} b_1 - \frac{\pi}{8} \le t \le 0.$$

In each case, the domain restrictions cause the arguments to sine and cosine to lie in the positive range.

The above discussion is not about critical points, but is about extrema. Critical points can manifest on a boundary via a sequence of points on the bulk which themselves are merely approximately critical points, without exactly being critical points. However, any such critical point cannot yield a more extreme value than the value achieved by the function on a sequence of values in the bulk which are extrema for the functional constrained to planes parallel to the outer facet.

Appendix B. Inclusion-Exclusion and Incidence Degeneracy

In uncovering the main results, it was invaluable to be able to calculate the volume of a nonconvex polytope. Not only did volume calculations play an outsized role in Section 7, they also underlie primitive operations. For instance, while containment of a polytope P within a convex polytope Q can be checked on vertices, this is not true of two generic polytopes; instead, assuming that P is of constant dimension, $P \subseteq Q$ if and only if $\text{vol}(P)=\text{vol}(P \cap Q)$. For this reason, it is imperative to have a robust and efficient method for volume calculation.

The process of volume calculation cleaves into two parts in some embodiments: reducing to the convex case, and computing the volume of convex components. Both steps admit several approaches in different embodiments: for instance, the former can be accomplished by (joint) triangulation, and the latter can be accomplished by determinant methods. However, it is difficult to come by implementations of these techniques which are open-source, permissively licensed, accurate/exact, and which operate in high dimension. In the setting of some embodiments, one can often get away with the following: for the second step, use the (somewhat computationally expensive) ability of a computer algebra system, such as lrs, to calculate the volume of a single convex polytope; and for the first step, use a variant of inclusion-exclusion.

The naive application of inclusion-exclusion is described by $$\text{vol}\left(\bigcup_{j \in J} P_j\right) = -\sum_{I \subseteq J} (-1)^{|I|} \text{vol}\left(\bigcap_{i \in I} P_i\right)$$

$$= : -\sum_{I \subseteq J} (-1)^{|I|} \text{vol}(P_I).$$

The terms on the right-hand side are all volumes of convex bodies, hence are individually approachable, but there are $2^{|J|}$ such summands. These summands can be culled in two ways:

(1) Terms with vanishing volume are downward-closed: If $\text{vol } P_I=0$, then $\text{vol } P_{I \cup I'}=0$ for any I'.
(2) Containment is downward-closed: If $\text{vol } P_I=\text{vol } P_{j \cup I}$, then $\text{vol } P_{I \cup I'}=\text{vol } P_{I \cup j \cup I'}$ for any I'. For $j \notin I \cup I'$, these pairs of values appear with opposite sign in the larger sum and cancel each other out.

It is simple to cull summands with the first observation: whenever a summand with vanishing volume is encountered, skip all of its descendants. The second observation is trickier: after encountering two pairs $(j_1, I_1)$ and $(j_2, I_2)$ which fit the hypothesis, it is possible to double-count a term as belonging to two canceling pairs.

The following procedure accounts for this wrinkle. Two "skip lists" of indices to ignore will be maintained:

(1) A skip of Type 1 corresponds to an intersection which vanishes exactly, and it is recorded by a single bitmask of the entries which populate I.
(2) A skip of Type 2 corresponds to an intersection which cancels with one of its immediate descendants, and it is recorded by a bitmask of the entries which populate I as well as the index j of the descendant (which does not belong to I).

In some embodiments, the possible depths of intersections are traversed, and at each depth, the possible intersections at that depth are traversed. For each intersection, if it matches either skip list, ignore it and continue to the next intersection at this depth. Otherwise, compute the volume of this intersection. If the volume vanishes, add this index to the Type 1 skip list, then continue as if having done no work at this step. If the volume is equal to one of the immediate predecessors, add to the Type 2 skip list its index and the extra intersection factor j which witnesses as its child, then continue as if having done no work at this step. Otherwise, add the nonzero contribution to the running alternating sum with the appropriate sign. When the possible intersections at this depth are exhausted, if no work has been performed, terminate the iteration altogether; otherwise, proceed to the next depth.

Figure 17:
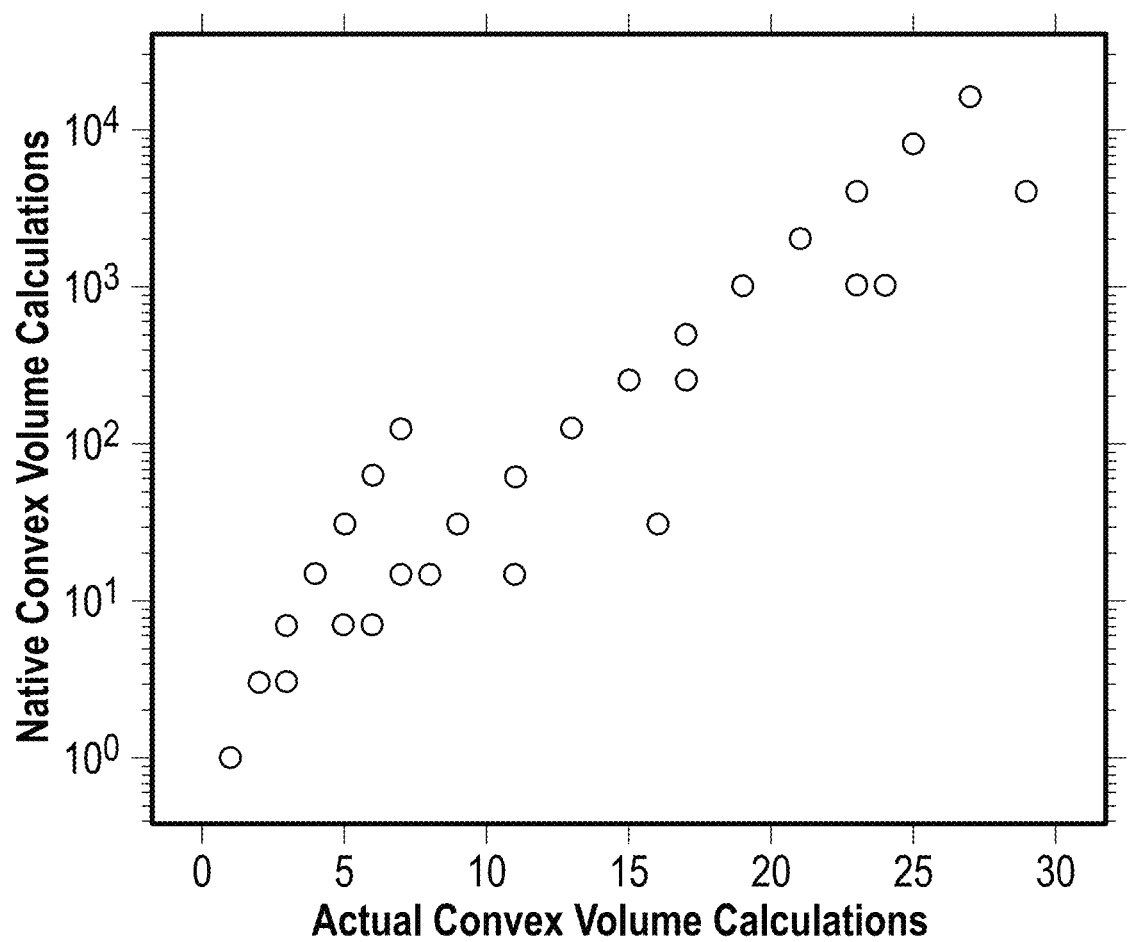
FIG. 17 shows volume computations made during an example gate set exploration exercise.

FIG. 17 shows volume computations made during an example gate set exploration exercise. The vertical coordinate shows the number of convex volume computations required with a naive application of the inclusion-exclusion formula, displayed on a logarithmic scale. The horizontal coordinate shows the number of convex volume computations actually performed when using the method described in Appendix B. Points near the top-left indicate "false complexity" in the convex polytope arrangement, and points near the bottom-right indicate "true complexity".

Now, double back to reintroduce the summands which were previously double-counted, which will be formulated in a way to also avoid double-counting the double-countings. Traversing the Type 2 skip list in the order in which it was created, consider the $t^{th}$ mask and toggle $(I_t, j_t)$, as well as some intermediate $s^{th}$ mask and toggle $(I_s, j_s)$ with s<t and with $j_t \in I_s$. Double-counting occurs for this pair at an intersection I when the following are met:
(1) The $t^{th}$ mask matches $I_t \leq I$.
(2) The $t^{th}$ toggle is disabled: $j_t \in I$.
(3) The $s^{th}$ mask matches after the toggle is enabled: $I_s \leq I \cup \{j_t\}$.
(4) For all earlier s'<s, the $s'^{th}$ mask does not include the $t^{th}$ toggle and additionally does not match I.
(5) For all later s<t'<t, the $t'^{th}$ mask does not match the toggle-on form $I \cup \{j_t\}$.

Whenever these constraints are met, reintroduce the summand at I to the running alternating sum. After iterating over all possible values of s and t, the running sum is the true alternating sum.

For any s<t, the constraints on I described above are quite strong (and often even contradictory), so that iterating over the possible ways to satisfy these constraints, rather than iterating over I and checking satisfaction, frequently results in loops with few to no iterations. In one embodiment "in the wild", this strategy reduced a calculation from $2^{14}-1 \approx 16,000$ convex volume computations to a mere 27 volume computations.

The above discussion describes preferred embodiments that address synthesis of two-qubit operations. However, some embodiments are also applicable as a solution for synthesis of n-qubit operations (n>=3), by performing recursive decomposition into (n−1)-qubit operations, and so on, until only two-qubit operations appear. Some embodiments of the present invention are fruitfully coupled to these recursive methods, such as in the published implementation in Qiskit described above with respect to the discussion of Table 2. In this example, a multi-qubit operator is recursively decomposed into 2-qubit operations, which are then handed off to the described embodiment of the invention for efficient synthesis.

It is to be appreciated that one or more embodiments described herein are inherently and inextricably tied to computer technology and cannot be implemented outside of a hybrid classical/quantum computing environment. For example, one or more processes performed by one or more embodiments described herein can more efficiently provide these parameters as compared to current systems and/or techniques. Systems, computer-implemented methods and/or computer program products facilitating performance of these processes are of great utility in the field of quantum computation and cannot be equally practicably implemented in a sensible way outside of a computing environment.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 20:
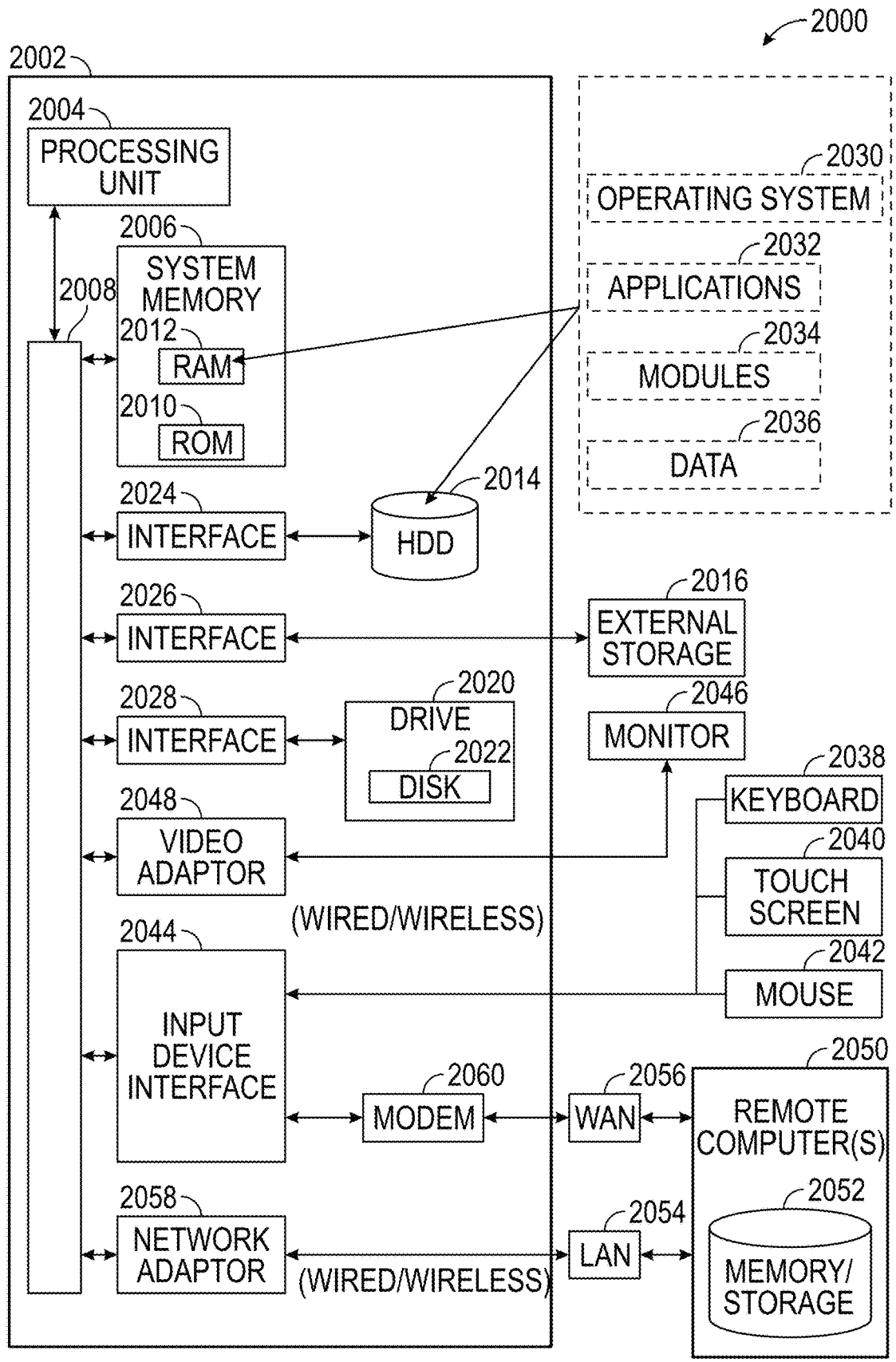
FIG. 20 shows an operating environment of some embodiments.

In order to provide additional context for one or more embodiments described herein, FIG. 20 and the following discussion are intended to provide a brief, general description of a suitable operating environment 2000 in which the one or more embodiments described herein can be implemented. For example, one or more components and/or other aspects of embodiments described herein can be implemented in or be associated with the operating environment 2000. Further, while one or more embodiments have been described above in the general context of computer-executable instructions that can run on one or more computers, those skilled in the art will recognize that the embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 20, the example operating environment 2000 for implementing one or more embodiments of the aspects described herein can include a computer 2002, the computer 2002 including a processing unit 2004, a system memory 2006 and/or a system bus 2008. It will be appreciated that any aspect of the system memory 2006 or processing unit 2004 can be applied to memory 106 or processor 104, respectively of the non-limiting computer system 100 and/or can be implemented in combination and/or alternatively to memory 106 or processor 104, respectively.

Memory 2006 can store one or more computer and/or machine readable, writable and/or executable components and/or instructions that, when executed by processing unit 2004 (e.g., a classical processor, a quantum processor and/or like processor), can facilitate performance of operations defined by the executable component(s) and/or instruction(s). For example, memory 2006 can store computer and/or machine readable, writable and/or executable components and/or instructions that, when executed by processing unit 2004, can facilitate execution of the one or more functions described herein relating to non-limiting computer system 100 and/or unitary matrix implementation system 102, as described herein with or without reference to the one or more figures of the one or more embodiments.

Memory 2006 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 2004 can comprise one or more types of processors and/or electronic circuitry (e.g., a classical processor, a quantum processor and/or like processor) that can implement one or more computer and/or machine readable, writable and/or executable components and/or instructions that can be stored at memory 2006. For example, processing unit 2004 can perform one or more operations that can be specified by computer and/or machine readable, writable and/or executable components and/or instructions including, but not limited to, logic, control, input/output (I/O), arithmetic and/or the like. In one or more embodiments, processing unit 2004 can be any of one or more commercially available processors. In one or more embodiments, processing unit 2004 can comprise one or more central processing unit, multi-core processor, microprocessor, dual microprocessors, microcontroller, System on a Chip (SOC), array processor, vector processor, quantum processor and/or another type of processor. The examples of processing unit 2004 can be employed to implement any one or more embodiments described herein.

The system bus 2008 can couple system components including, but not limited to, the system memory 2006 to the processing unit 2004. The system bus 2008 can be any of several types of bus structure that can further interconnect to a memory bus (with or without a memory controller), a peripheral bus and/or a local bus using any of a variety of commercially available bus architectures. The system memory 2006 can include ROM 2010 and/or RAM 2012. A basic input/output system (BIOS) can be stored in a non-volatile memory such as ROM, erasable programmable read only memory (EPROM) and/or EEPROM, which BIOS contains the basic routines that help to transfer information among elements within the computer 2002, such as during startup. The RAM 2012 can include a high-speed RAM, such as static RAM for caching data.

The computer 2002 can include an internal hard disk drive (HDD) 2014 (e.g., EIDE, SATA), one or more external storage devices 2016 (e.g., a magnetic floppy disk drive (FDD), a memory stick or flash drive reader, a memory card reader and/or the like) and/or a drive 2020, e.g., such as a solid state drive or an optical disk drive, which can read or write from a disk 2022, such as a CD-ROM disc, a DVD, a BD and/or the like. Additionally and/or alternatively, where a solid state drive is involved, disk 2022 could not be included, unless separate. While the internal HDD 2014 is illustrated as located within the computer 2002, the internal HDD 2014 can also be configured for external use in a suitable chassis (not shown). Additionally, while not shown in operating environment 2000, a solid state drive (SSD) can be used in addition to, or in place of, an HDD 2014. The HDD 2014, external storage device(s) 2016 and drive 2020 can be connected to the system bus 2008 by an HDD interface 2024, an external storage interface 2026 and a drive interface 2028, respectively. The HDD interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 2012, including an operating system 2030, one or more applications 2032, other program modules 2034 and/or program data 2036. All or portions of the operating system, applications, modules and/or data can also be cached in the RAM 2012. The systems and/or methods described herein can be implemented utilizing one or more commercially available operating systems and/or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In a related embodiment, operating system 2030 can comprise one virtual machine (VM) of multiple VMs hosted at computer 2002. Furthermore, operating system 2030 can provide runtime environments, such as the JAVA runtime environment or the .NET framework, for applications 2032. Runtime environments are consistent execution environments that can allow applications 2032 to run on any operating system that includes the runtime environment. Similarly, operating system 2030 can support containers, and applications 2032 can be in the form of containers, which are lightweight, standalone, executable packages of software that include, e.g., code, runtime, system tools, system libraries and/or settings for an application.

Further, computer 2002 can be enabled with a security module, such as a trusted processing module (TPM). For instance, with a TPM, boot components hash next in time boot components and wait for a match of results to secured values before loading a next boot component. This process can take place at any layer in the code execution stack of computer 2002, e.g., applied at application execution level and/or at operating system (OS) kernel level, thereby enabling security at any level of code execution.

An entity can enter and/or transmit commands and/or information into the computer 2002 through one or more wired/wireless input devices, e.g., a keyboard 2038, a touch screen 2040 and/or a pointing device, such as a mouse 2042. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface and/or the like.

A monitor 2046 or other type of display device can be alternatively and/or additionally connected to the system bus 2008 via an interface, such as a video adapter 2048. In addition to the monitor 2046, a computer typically includes other peripheral output devices (not shown), such as speakers, printers and/or the like.

The computer 2002 can operate in a networked environment using logical connections via wired and/or wireless communications to one or more remote computers, such as a remote computer(s) 2050. The remote computer(s) 2050 can be a workstation, a server computer, a router, a personal computer, portable computer, microprocessor-based entertainment appliance, a peer device and/or other common network node, and typically includes many or all of the elements described relative to the computer 2002, although, for purposes of brevity, only a memory/storage device 2052 is illustrated. Additionally and/or alternatively, the computer 2002 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 2054 and/or larger networks, e.g., a wide area network (WAN) 2056. LAN and WAN networking environments can be commonplace in offices and companies and can facilitate enterprise-wide computer networks, such as intranets, all of which can connect to a global communications network, e.g., the Internet.

When used in a LAN networking environment, the computer 2002 can be connected to the local network 2054 through a wired and/or wireless communication network interface or adapter 2058. The adapter 2058 can facilitate wired and/or wireless communication to the LAN 2054, which can also include a wireless access point (AP) disposed thereon for communicating with the adapter 2058 in a wireless mode.

When used in a WAN networking environment, the computer 2002 can include a modem 2060 and/or can be connected to a communications server on the WAN 2056 via other means for establishing communications over the WAN 2056, such as by way of the Internet. The modem 2060, which can be internal and/or external and a wired and/or wireless device, can be connected to the system bus 2008 via the input device interface 2044. In a networked environment, program modules depicted relative to the computer 2002 or portions thereof can be stored in the remote memory/storage device 2052. It will be appreciated that the network connections shown are merely exemplary and one or more other means of establishing a communications link among the computers can be used.

When used in either a LAN or WAN networking environment, the computer 2002 can access cloud storage systems or other network-based storage systems in addition to, and/or in place of, external storage devices 2016 as described above, such as but not limited to, a network virtual machine providing one or more aspects of storage and/or processing of information. Generally, a connection between the computer 2002 and a cloud storage system can be established over a LAN 2054 or WAN 2056 e.g., by the adapter 2058 or modem 2060, respectively. Upon connecting the computer 2002 to an associated cloud storage system, the external storage interface 2026 can, such as with the aid of the adapter 2058 and/or modem 2060, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 21, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 2150 described below with reference to FIG. 21, and/or with reference to the one or more functional abstraction layers (e.g., quantum software and/or the like) described below with reference to FIG. 22, to execute one or more operations in accordance with one or more embodiments described herein. For example, cloud computing environment 2150 and/or one or more of the functional abstraction layers 2260, 2270, 2280 and/or 2290 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting computer system 100 and/or the example operating environment 2000 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting computer system 100 and/or example operating environment 2000 can be employed to use hardware and/or software to solve problems that are highly technical in nature, that are not abstract and/or that cannot be performed as a set of mental acts by a human.

Figure 21:
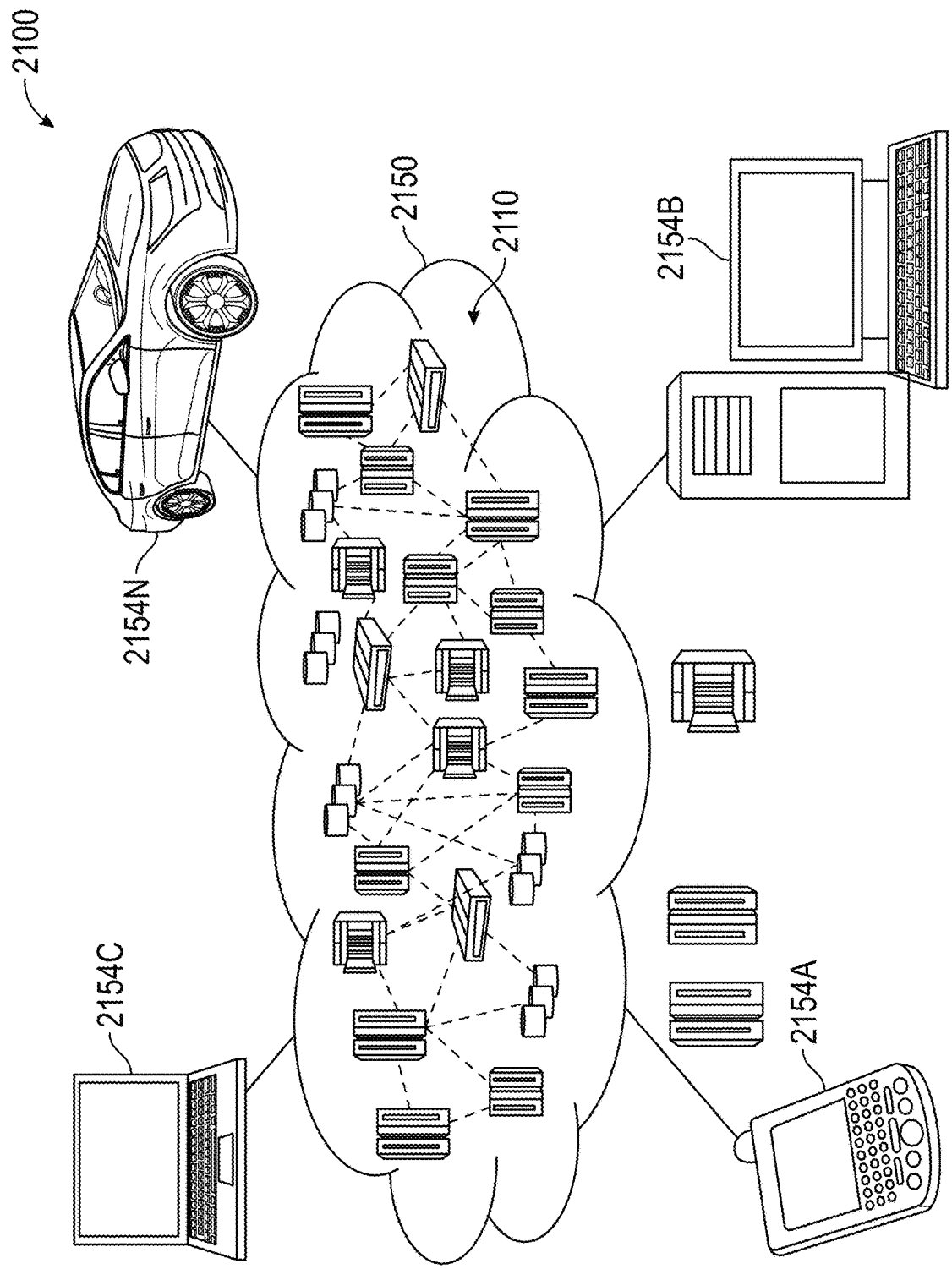
FIG. 21 shows a distributed computing environment (e.g., a cloud computing environment) of some embodiments.

Referring now to details of one or more aspects illustrated at FIG. 21, the illustrative cloud computing environment 2150 is depicted. As shown, cloud computing environment 2150 includes one or more cloud computing nodes 2110 with which local computing devices used by cloud consumers, such as, for example, personal digital assistant (PDA) or cellular telephone 2154A, desktop computer 2154B, laptop computer 2154C and/or automobile computer system 2154N can communicate. Although not illustrated in FIG. 21, cloud computing nodes 2110 can further comprise a quantum platform (e.g., quantum computer, quantum hardware, quantum software and/or the like) with which local computing devices used by cloud consumers can communicate. Cloud computing nodes 2110 can communicate with one another. They can be grouped (not shown) physically or virtually, in one or more networks, such as Private, Community, Public, or Hybrid clouds as described hereinabove, or a combination thereof. This allows cloud computing environment 2150 to offer infrastructure, platforms and/or software as services for which a cloud consumer does not need to maintain resources on a local computing device. It is understood that the types of computing devices 2154A-N shown in FIG. 21 are intended to be illustrative only and that cloud computing nodes 2110 and cloud computing environment 2150 can communicate with any type of computerized device over any type of network and/or network addressable connection (e.g., using a web browser).

Figure 22:
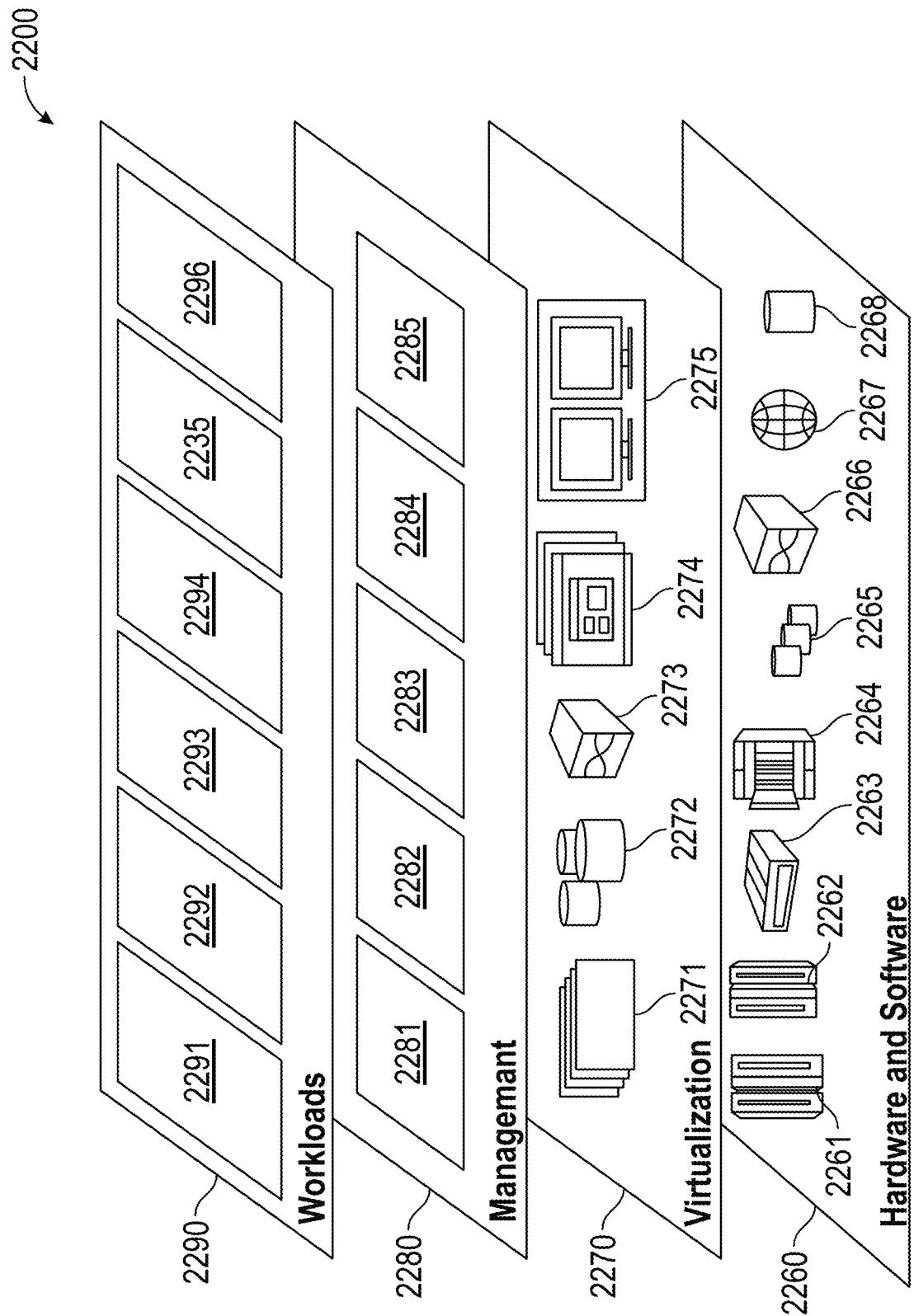
FIG. 22 shows a set of functional abstraction layers of some embodiments, such as provided by the distributed computing environment depicted in FIG. 21.

Referring now to details of one or more aspects illustrated at FIG. 22, a set of functional abstraction layers is shown, such as provided by cloud computing environment 2150 (FIG. 21). One or more embodiments described herein can be associated with one or more functional abstraction layers described below with reference to FIG. 22 (e.g., hardware and software layer 2260, virtualization layer 2270, management layer 2280 and/or workloads layer 2290). It should be understood in advance that the components, layers and/or functions shown in FIG. 22 are intended to be illustrative only and embodiments described herein are not limited thereto. As depicted, the following layers and/or corresponding functions are provided:

Hardware and software layer 2260 can include hardware and software components. Examples of hardware components include: mainframes 2261; RISC (Reduced Instruction Set Computer) architecture-based servers 2262; servers 2263; blade servers 2264; storage devices 2265; and/or networks and/or networking components 2266. In some embodiments, software components can include network application server software 2267, quantum platform routing software 2268; and/or quantum software (not illustrated in FIG. 22).

Virtualization layer 2270 can provide an abstraction layer from which the following examples of virtual entities can be provided: virtual servers 2271; virtual storage 2272; virtual networks 2273, including virtual private networks; virtual applications and/or operating systems 2274; and/or virtual clients 2275.

In one example, management layer 2280 can provide the functions described below. Resource provisioning 2281 can provide dynamic procurement of computing resources and other resources that can be utilized to perform tasks within the cloud computing environment. Metering and Pricing 2282 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 2283 can provide access to the cloud computing environment for consumers and system administrators. Service level management 2284 can provide cloud computing resource allocation and/or management such that required service levels are met. Service Level Agreement (SLA) planning and fulfillment 2285 can provide pre-arrangement for, and procurement of, cloud computing resources for which a future requirement is anticipated in accordance with an SLA.

Workloads layer 2290 can provide examples of functionality for which the cloud computing environment can be utilized. Non-limiting examples of workloads and functions which can be provided from this layer include: mapping and navigation 2291; software development and lifecycle management 2292; virtual classroom education delivery 2293; data analytics processing 2294; transaction processing 2295; and/or application transformation software 2296.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the native inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive nor are the general concepts of the current invention intended to be limited to only the particular embodiments described herein. Many modifications and variations will be apparent to those of ordinary skill in the art without departing from the scope and spirit of the described embodiments. The terminology used herein was chosen to explain some principles of the embodiments, some practical applications and/or technical improvements over technologies found in the marketplace, and/or to enable others of ordinary skill in the art to understand some concepts described herein.

We claim:

1. A method for synthesizing a quantum circuit for use on a quantum computational device, comprising:
   receiving, on a classical computer, information for a target operation to be implemented on said quantum computational device;
   receiving, on said classical computer, information regarding native qubit gates that are available on said quantum computational device to be used to implement said quantum circuit;
   determining, on said classical computer, each of a plurality of quantum circuits formed from said native qubit gates such that each of said plurality of quantum circuits will perform a function substantially equivalent to said target operation when implemented on the quantum computational device;
   selecting, on said classical computer, one of said plurality of quantum circuits formed from said native qubit gates based on a performance criterion of said quantum computational device,
   wherein said target operation is a unitary operator comprising one-qubit and two-qubit operations,
   wherein said native qubit gates are one-qubit and XX-type gates, and
   wherein said performance criterion is based on operating parameters of said quantum computational device.

2. The method of claim 1, further comprising providing the selected one of the plurality of quantum circuits to the quantum computational device for implementation thereon.

3. The method of claim 1, wherein selecting one of the plurality of quantum circuits based on the performance criterion comprises optimizing a cost function associated with each of the plurality of quantum circuits.

4. The method of claim 3, wherein the cost function is one of an average infidelity of each of the plurality of quantum circuits relative to the target operation, an operation count of native qubit gates in each of the plurality of quantum circuits, a diamond norm of each of the plurality of quantum circuits relative to the target operation, and a Hilbert-Schmidt distance of each of the plurality of quantum circuits relative to the target operation.

5. The method of claim 3, wherein the cost function is separable, locally invariant, and monotonic.

6. The method of claim 1, wherein determining the plurality of quantum circuits formed from the native qubit gates comprises applying a projection formula.

7. The method of claim 1, wherein the XX-type gates comprise an $XX_0$ gate, an $XX_{90}$ gate, and at least one of an $XX_{15}$ gate, an $XX_{22.5}$ gate, an $XX_{30}$ gate, and an $XX_{45}$ gate.

8. A computer program product for synthesizing a quantum circuit for use on a quantum computational device, the computer program product comprising a computer readable medium having non-transient program instructions embodied therewith, the program instructions executable by a classical computer to cause the classical computer to:
   receive information for a target operation to be implemented on said quantum computational device;
   receive information regarding native qubit gates that are available on said quantum computational device to be used to implement said quantum circuit;
   determine each of a plurality of quantum circuits formed from said native qubit gates such that each of said plurality of quantum circuits will perform a function substantially equivalent to said target operation when implemented on the quantum computational device;
   select one of said plurality of quantum circuits formed from said native qubit gates based on a performance criterion of said quantum computational device,
   wherein said target operation is a unitary operator comprising one-qubit and two-qubit operations,
   wherein said native qubit gates are one-qubit and XX-type gates, and
   wherein said performance criterion is based on operating parameters of said quantum computational device.

9. The computer program product of claim 8, wherein the program instructions executable by a classical computer further cause the classical computer to provide the selected one of the plurality of quantum circuits to the quantum computational device for implementation thereon.

10. The computer program product of claim 8, wherein said classical computer selects one of the plurality of quantum circuits based on the performance criterion by optimizing a cost function associated with each of the plurality of quantum circuits.

11. The computer program product of claim 10, wherein the cost function is one of an average infidelity of each of the plurality of quantum circuits relative to the target operation, an operation count of native qubit gates in each of the plurality of quantum circuits, a diamond norm of each of the plurality of quantum circuits relative to the target operation, and a Hilbert-Schmidt distance of each of the plurality of quantum circuits relative to the target operation.

12. The computer program product of claim 10, wherein the cost function is separable, locally invariant, and monotonic.

13. The computer program product of claim 8, wherein said classical computer determines the plurality of quantum circuits formed from the native qubit gates by applying a projection formula.

14. The computer program product of claim 8, wherein the XX-type gates comprise an $XX_0$ gate, an $XX_{90}$ gate, and at least one of an $XX_{15}$ gate, an $XX_{22.5}$ gate, an $XX_{30}$ gate, and an $XX_{45}$ gate.

15. A computer system, comprising:
a quantum computational device, comprising a plurality of native qubit gates that are used to implement quantum circuits; and
a classical computer communicatively coupled to the quantum computational device, the classical computer comprising:
   a processor configured to receive information for a target operation to be implemented on said quantum computational device, and configured to receive information regarding the plurality of native qubit gates that are available on said quantum computational device;
   a synthesis component configured to determine each of a plurality of quantum circuits formed from said plurality of native qubit gates such that each of said plurality of quantum circuits will perform a function substantially equivalent to said target operation when implemented on the quantum computational device, and select one of said plurality of quantum circuits formed from said plurality of native qubit gates based on a performance criterion of said quantum computational device; and
   an output component configured to provide the selected one of the plurality of quantum circuits to the quantum computational device for implementation thereon,
wherein said target operation is a unitary operator comprising one-qubit and two-qubit operations,
wherein said plurality of native qubit gates are one-qubit and XX-type gates, and
wherein said performance criterion is based on operating parameters of said quantum computational device.

16. The computer system of claim 15, wherein the synthesis component is further configured to select one of the plurality of quantum circuits by optimizing a cost function associated with each of the plurality of quantum circuits.

17. The computer system of claim 16, wherein the cost function is one of an average infidelity of each of the plurality of quantum circuits relative to the target operation, an operation count of native qubit gates in each of the plurality of quantum circuits, a diamond norm of each of the plurality of quantum circuits relative to the target operation, and a Hilbert-Schmidt distance of each of the plurality of quantum circuits relative to the target operation.

18. The computer system of claim 16, wherein the cost function is separable, locally invariant, and monotonic.

19. The computer system of claim 15, wherein the synthesis component is further configured to determine the plurality of quantum circuits by applying a projection formula.

20. The computer system of claim 15, wherein the XX-type gates comprise an $XX_0$ gate, an $XX_{90}$ gate, and at least one of an $XX_{15}$ gate, an $XX_{22.5}$ gate, an $XX_{30}$ gate, and an $XX_{45}$ gate.

* * * * *